US012171219B2

(12) United States Patent
Johnson et al.

(10) Patent No.: US 12,171,219 B2
(45) Date of Patent: Dec. 24, 2024

(54) BAG FOR EASY DRAINAGE AND MANIPULATION

(71) Applicant: W. L. Gore & Associates, Inc., Newark, DE (US)

(72) Inventors: Matthew A. Johnson, Newark, DE (US); Shannon L. Levy, Newark, DE (US)

(73) Assignee: W. L. Gore & Associates, Newark, DE (US)

( * ) Notice: Subject to any disclaimer, the term of this patent is extended or adjusted under 35 U.S.C. 154(b) by 139 days.

(21) Appl. No.: 18/006,107

(22) PCT Filed: Jul. 21, 2021

(86) PCT No.: PCT/US2021/042631
§ 371 (c)(1),
(2) Date: Jan. 19, 2023

(87) PCT Pub. No.: WO2022/020512
PCT Pub. Date: Jan. 27, 2022

(65) Prior Publication Data
US 2023/0270102 A1    Aug. 31, 2023

Related U.S. Application Data

(60) Provisional application No. 63/054,735, filed on Jul. 21, 2020, provisional application No. 63/081,573, filed on Sep. 22, 2020.

(51) Int. Cl.
*A01N 1/02* (2006.01)
*B65D 33/01* (2006.01)
(Continued)

(52) U.S. Cl.
CPC ........... *A01N 1/0268* (2013.01); *B65D 33/01* (2013.01); *A61J 1/10* (2013.01); *A61J 1/1468* (2015.05); *A61J 1/1475* (2013.01)

(58) Field of Classification Search
CPC ..... A01N 1/0268; B65D 33/01; A61J 1/1468; A61J 1/10; A61J 1/1475
(Continued)

(56) References Cited

U.S. PATENT DOCUMENTS 5,462,526 A * 10/1995 Barney .................... B32B 27/08
604/82
7,243,787 B2 * 7/2007 Iwasa ....................... B32B 3/02
206/219

(Continued)

FOREIGN PATENT DOCUMENTS

KR    20100040315 A  *  4/2010
WO    WO-2014104281 A1 *  7/2014  ............... A61J 1/10
WO    WO-2016025847 A1 *  2/2016  ........... A01N 1/0268

OTHER PUBLICATIONS

Origen: "CryoStore Conical Freezing Bag", Apr. 5, 2018 (Apr. 15, 2018), XP055858491, Retrieved from the Internet: URL:http://www.origen.com/products/Cryopreservation/CryoStore [retrieved on Nov. 7, 2021].

(Continued)

*Primary Examiner* — Jes F Pascua
(74) *Attorney, Agent, or Firm* — GREENBERG TRAURIG, LLP

(57) ABSTRACT

A storage bag (100) includes a main tube (102) extending from a first end to a second end and defining a first inner surface and outer surface. The main tube includes a first angled edge (128) and a second angled edge (132) extending from the first end of the main tube and forming a first angled interface. The storage bag also includes a port tube (104) extending from a first end to a second end and defining a second inner surface and outer surface. The second end of the port tube includes a third angled edge and a fourth angled edge extending from the second end of the port tube, forming a second angled interface. The second angled (Continued)

interface of the port tube is positioned over the first angled interface of the main tube. A portion of the port tube not overlapping the main tube is sealed to itself to form an angled drainage area (182).

12 Claims, 83 Drawing Sheets

(51) Int. Cl.
*A61J 1/10* (2006.01)
*A61J 1/14* (2023.01)

(58) Field of Classification Search
USPC .......................................................... 383/41
See application file for complete search history.

(56) References Cited

U.S. PATENT DOCUMENTS

2008/0255535 A1  10/2008  Katsuyuki
2020/0113780 A1   4/2020  Snyder et al.

OTHER PUBLICATIONS

Origen: 11 CryoStore Freezing Bag Apr. 2, 2018 (Apr. 22, 2018), XP055858490, Retrieved from the Internet: URL:http://www.origen.com/products/Cryopreservation/CryoStore [retrieved on Nov. 7, 2021] the whole document.
International Search Report and Written Opinion from International Application No. PCT/US2021/042631 dated Nov. 18, 2021.

\* cited by examiner

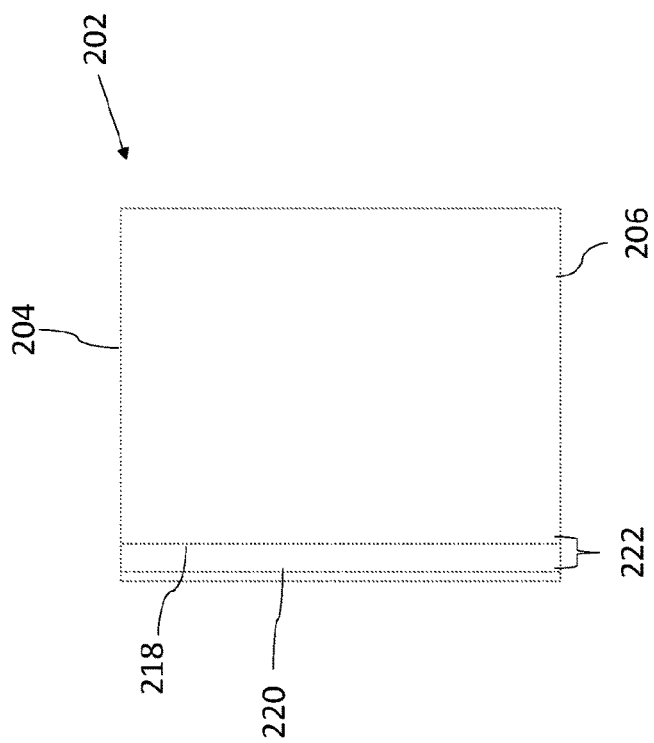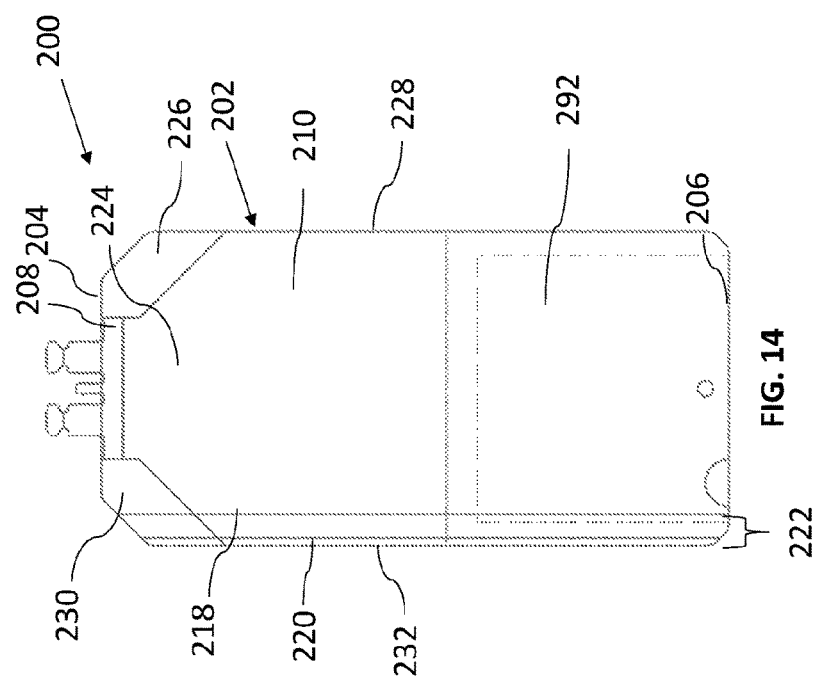

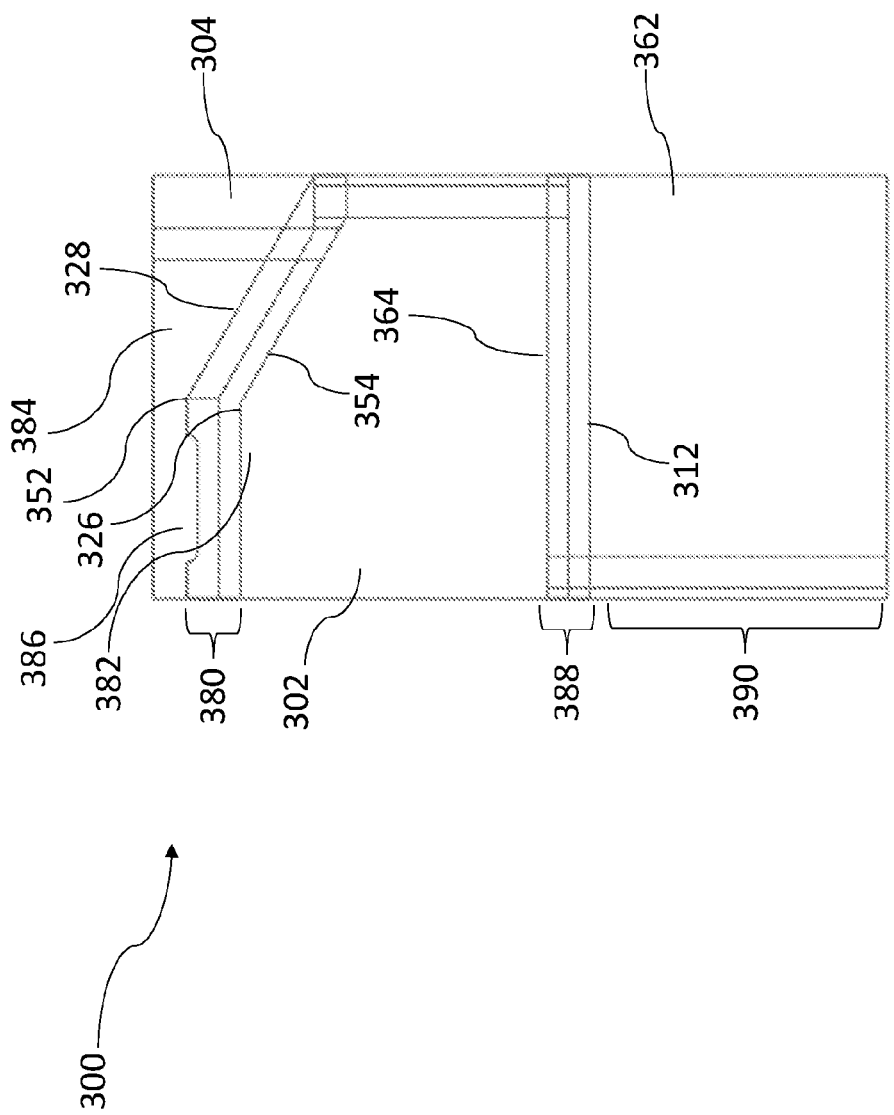

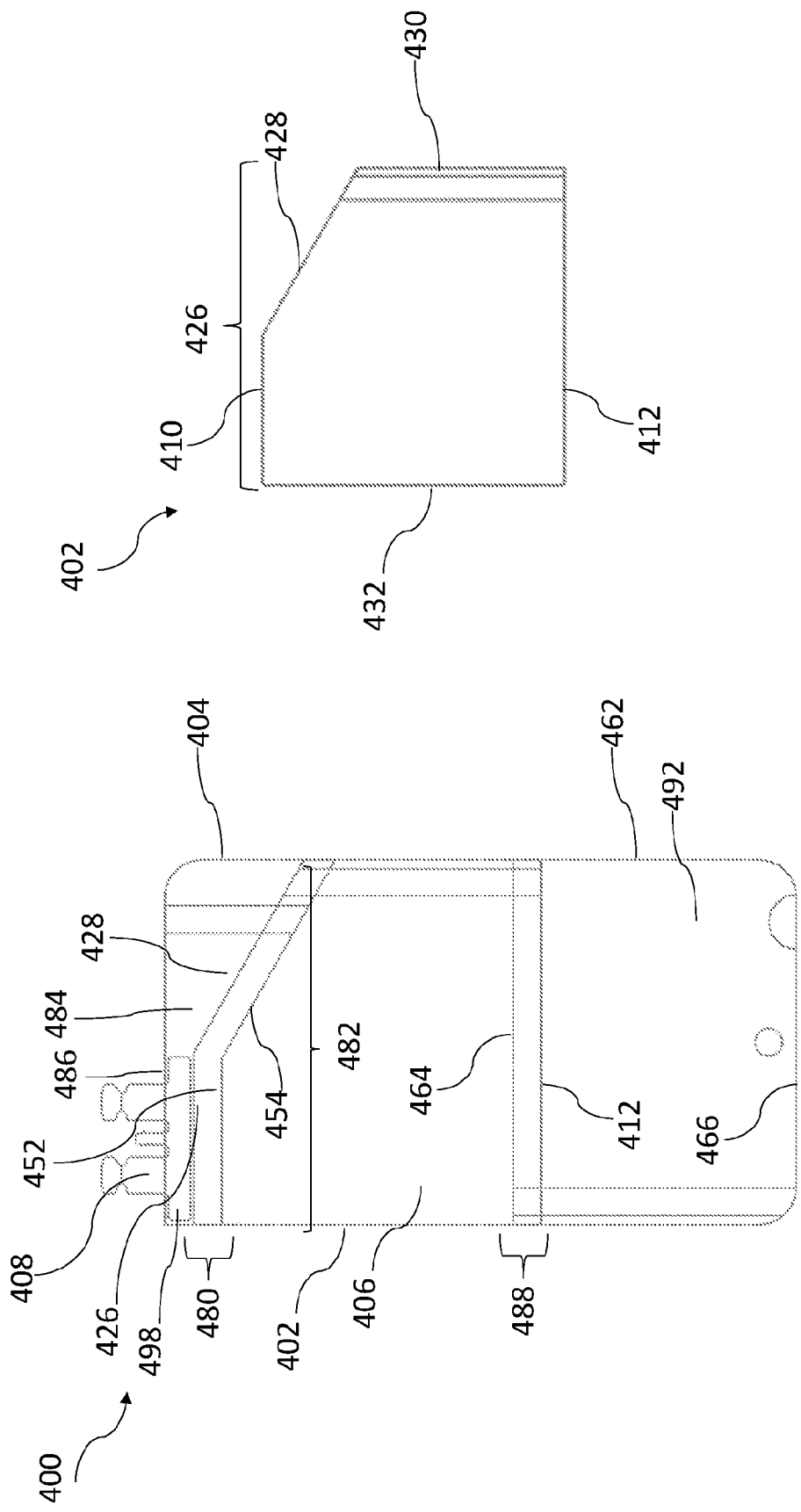

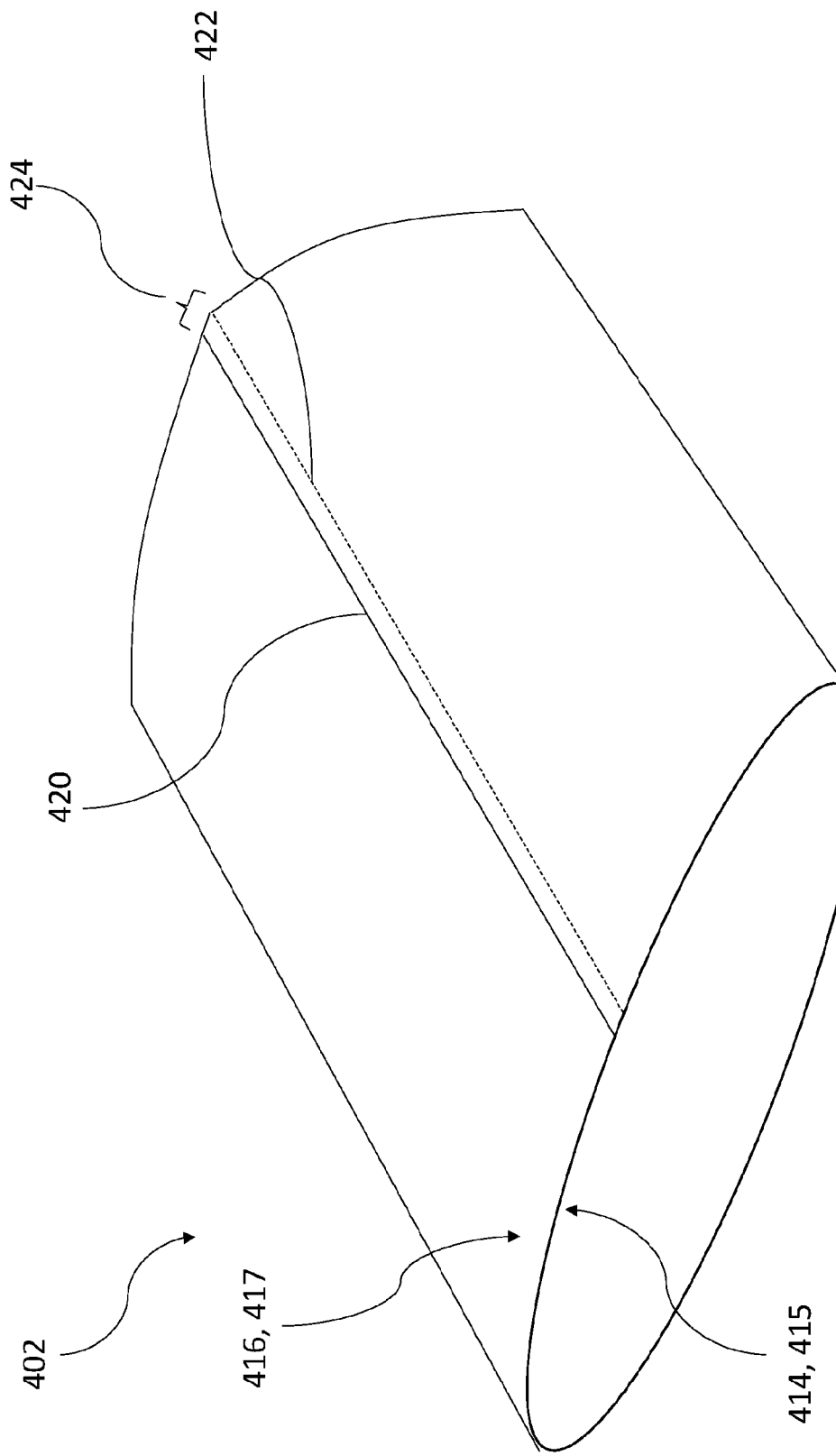

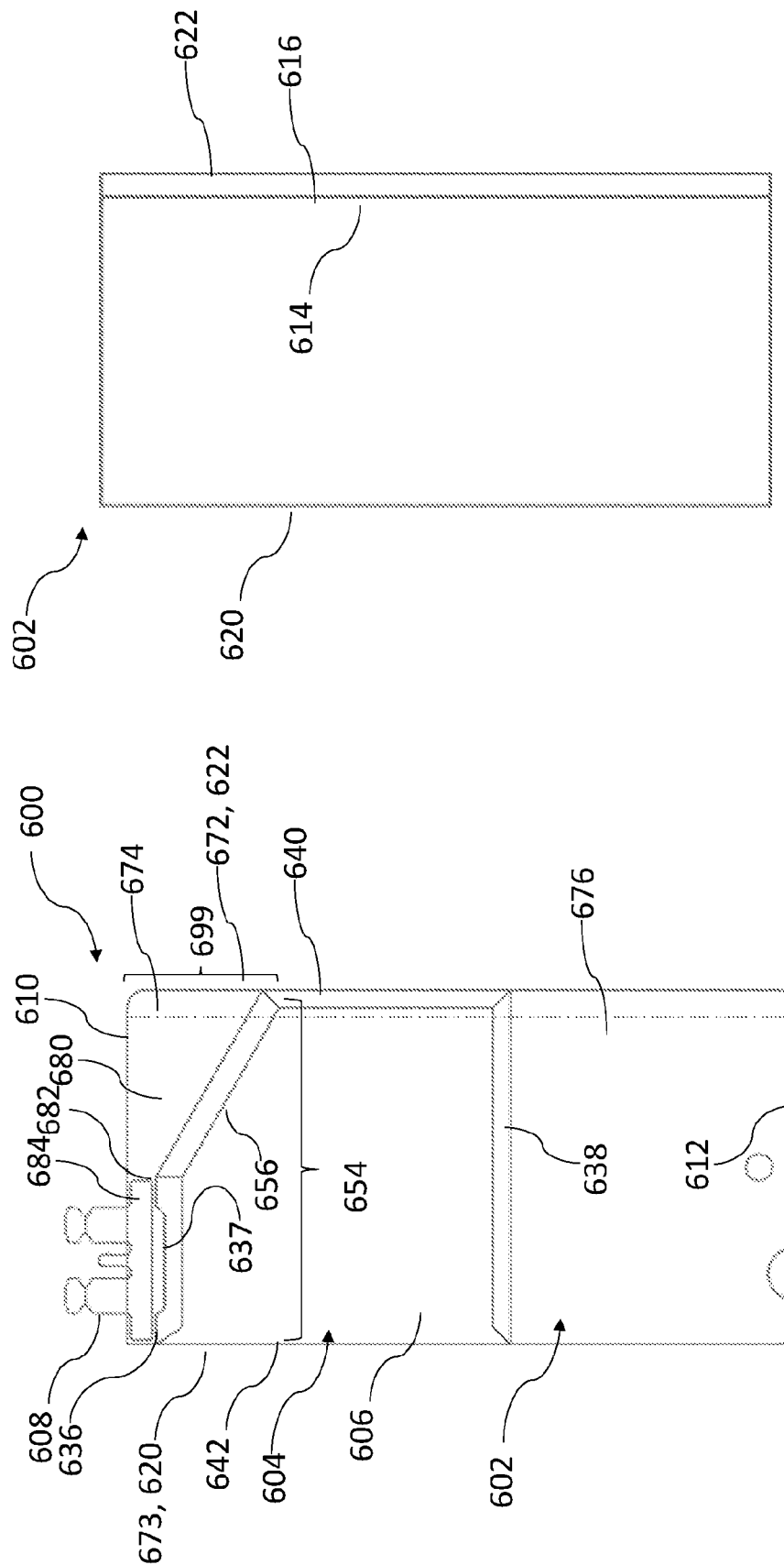

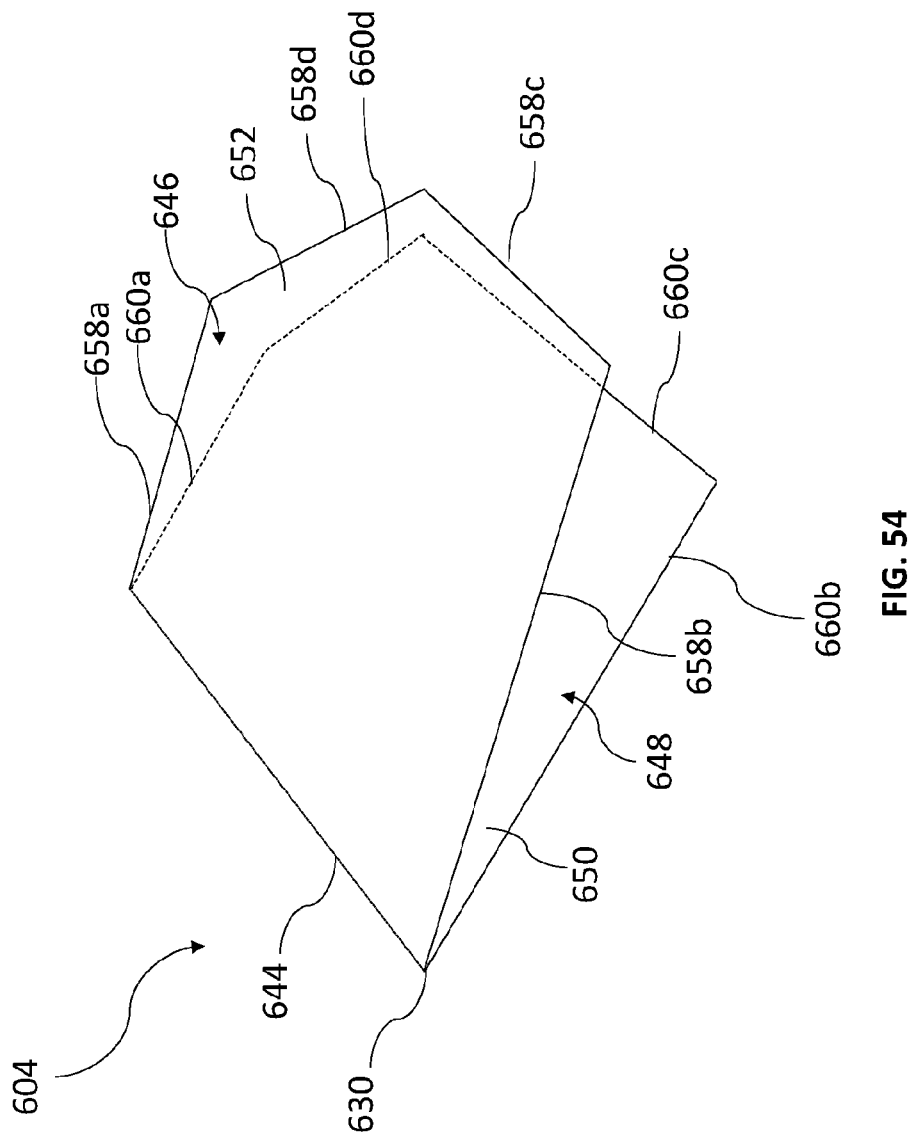

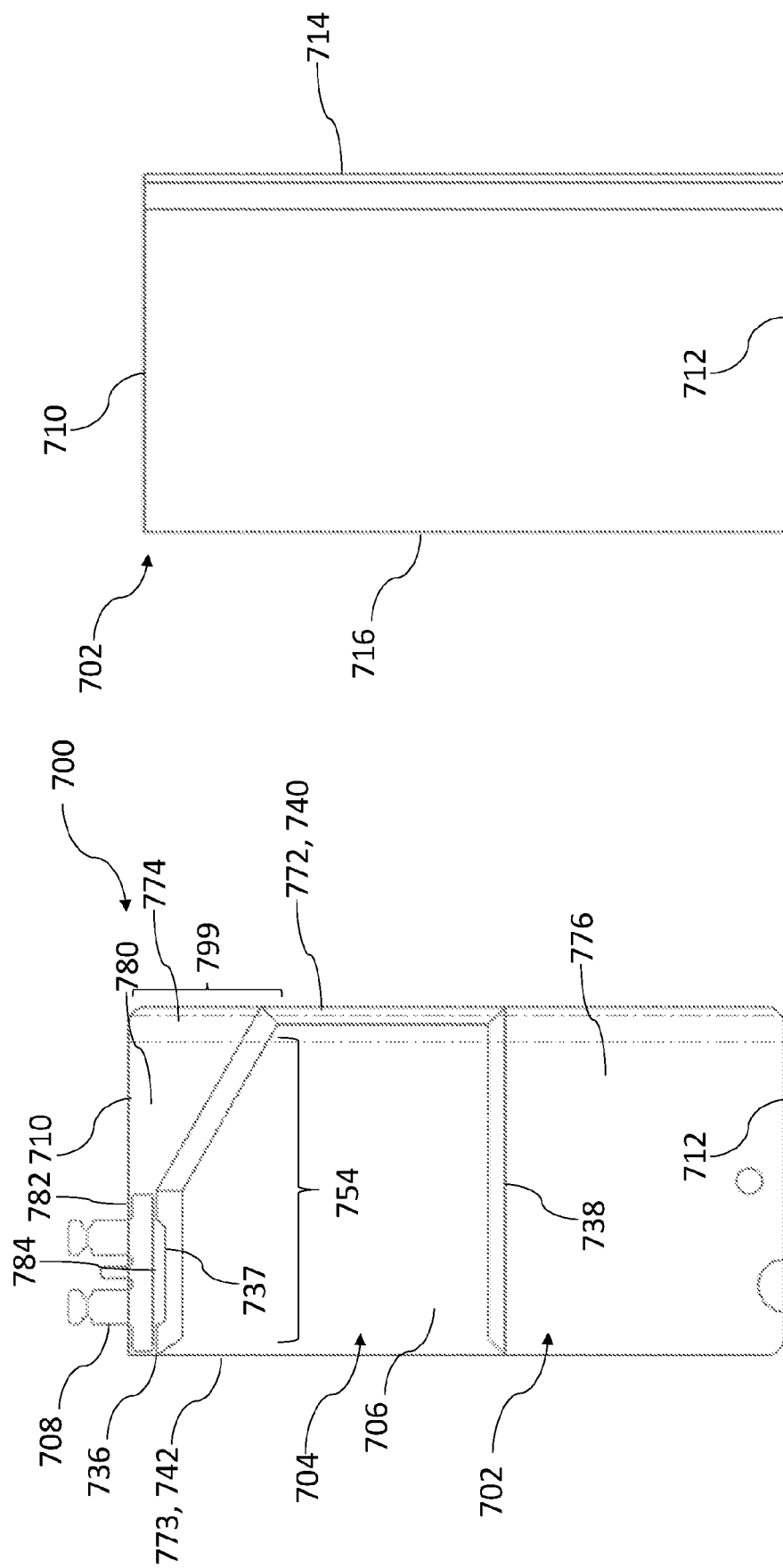

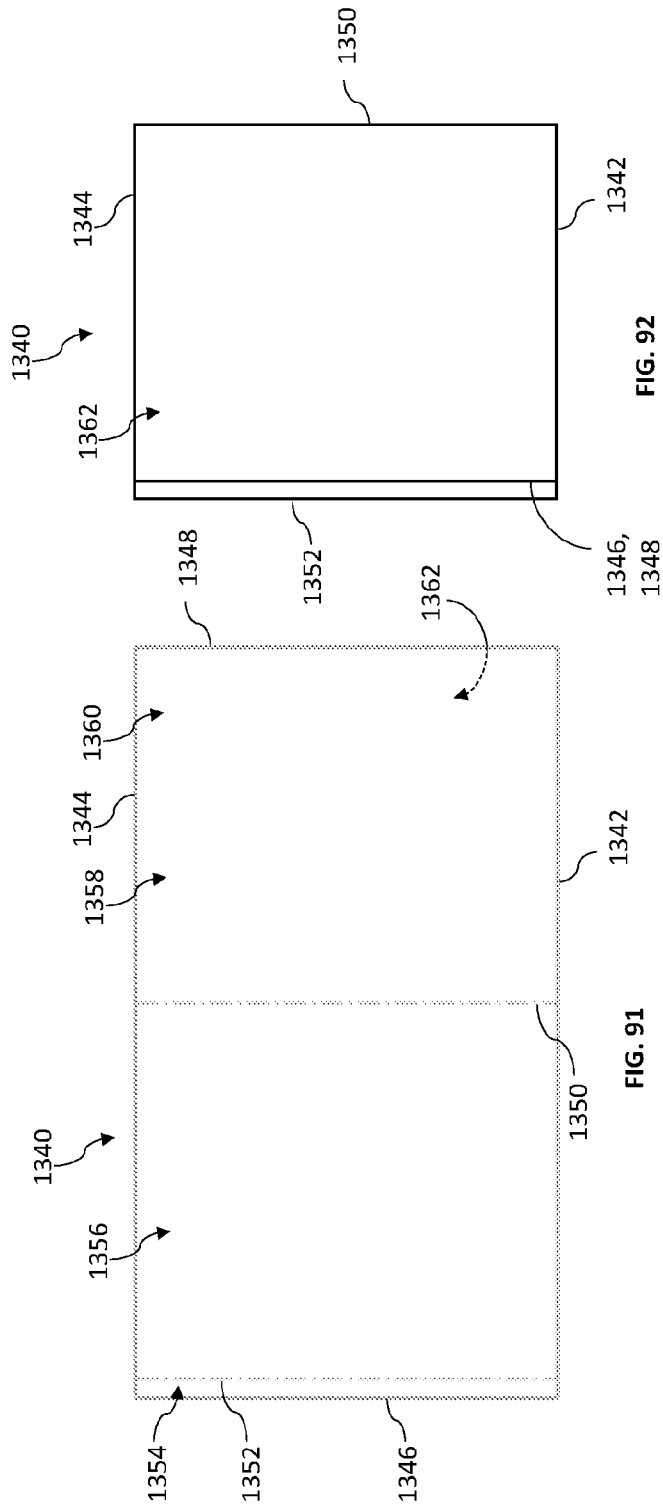

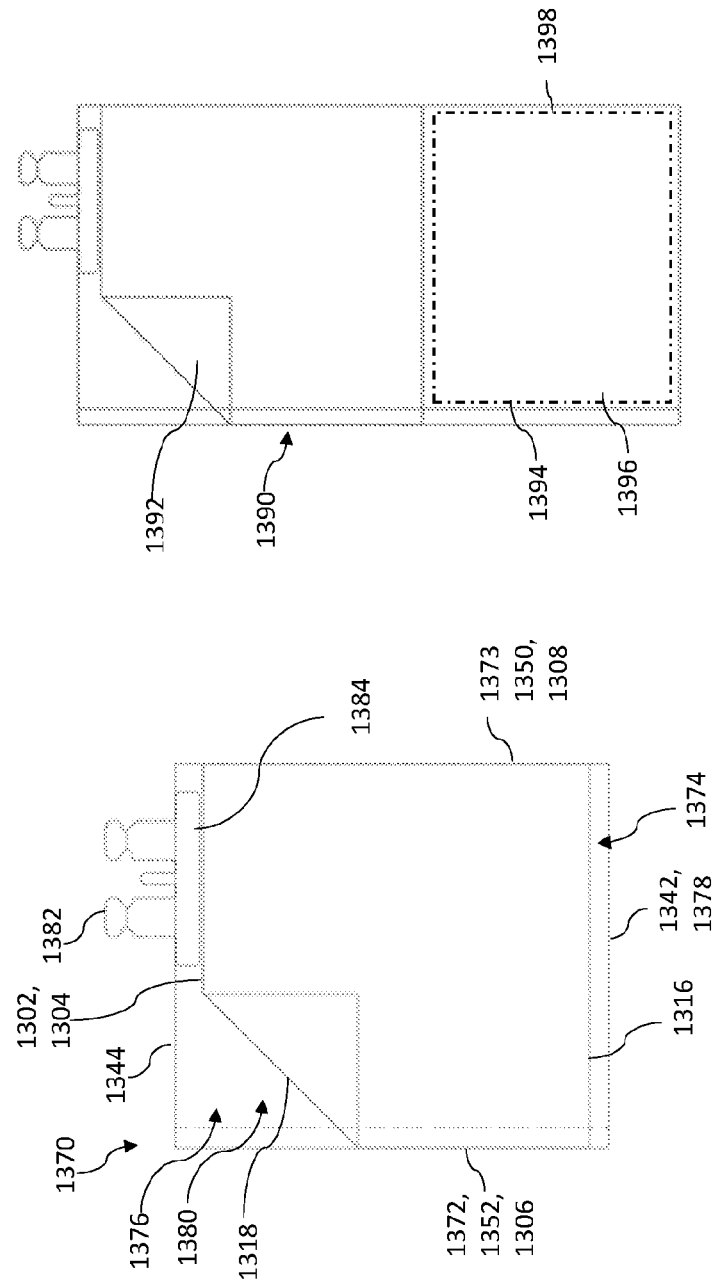

BAG FOR EASY DRAINAGE AND MANIPULATION

FIELD

The present disclosure relates to storage bags, and more particularly, to cryopreservation bags with improved drainage and manipulation without compromising clarity for visualization of product contained therein.

BACKGROUND

Single-use flexible containers are used for transportation, administration and storage of materials such as biologics. Such single-use containers are flexible bags that are typically made out of a plastic film. The bags may be used for storage, particularly in cryopreservation applications. The bags are typically disposable and intended to reduce risk of cross contamination and the need for cleaning validation.

In the cryopreservation application, cell and gene therapies are stored and transported frozen in the storage bags. This maintains protein or cell stability over the storage time. Current bags have certain drawbacks, including durability at freezing temperatures and during warm-up and usage of the bags. Additionally, some cryopreservation bags are difficult to drain and tend to have leakage problems, particularly at the ends and corners of the bags. Often, reinforcing the storage bags results in decreased visibility through the bag and decreased flexibility for bag manipulation.

SUMMARY

The summary is a high-level overview of various aspects of the invention and introduces some of the concepts that are further detailed in the Detailed Description section below. This summary is not intended to identify key or essential features of the claimed subject matter, nor is it intended to be used in isolation to determine the scope of the claimed subject matter. The subject matter should be understood by reference to the appropriate portions of the entire specification, any or all drawings, and each claim.

Embodiments of the present disclosure relate to storage bags including a main tube extending longitudinally from a first end to a second end, the main tube defining a first inner surface and a first outer surface. The first inner surface includes a first higher melting polymer and the first outer surface includes a first lower melting polymer. A portion of the first inner surface overlaps a portion of the first outer surface to form a first lap seam. The main tube includes a first angled edge and a second angled edge extending from the first end of the main tube and forming a first angled interface. The storage bag also includes a port tube extending from a first end to a second end, the port tube defining a second inner surface and a second outer surface. The second inner surface includes a second lower melting polymer and the second outer surface includes a second higher melting polymer. A portion of the second inner surface overlaps a portion of the second outer surface to form a second lap seam. The second end of the port tube includes a third angled edge and a fourth angled edge extending from the second end of the port tube, forming a second angled interface. The second angled interface of the port tube is positioned over the first angled interface of the main tube such that the third angled edge overlaps the first angled edge, and the fourth angled edge overlaps the second angled edge, with the second inner surface engaging the first outer surface. At least a portion of the port tube not overlapping the main tube is sealed to itself such that at least a portion of the port tube, the main tube, or both the port tube and the main tube is shaped so as to form an angled drainage area.

In some embodiments, the first angled edge extends from a first lateral side of the main tube to the first and the second angled edge extends from a second lateral side to the first end.

In some embodiments, the storage bag is a cryopreservation bag.

In some embodiments, the storage bag also includes an end tube extending from a first end to a second end, the end tube defining a third inner surface and a third outer surface. The third inner surface comprises a lower melting polymer and the third outer surface comprises a higher melting polymer. The first end of the end tube is positioned over the second end of the main tube with the third inner surface engaging the first outer surface. A portion of the end tube not overlapping the main tube is sealed to itself to seal the storage bag.

In some embodiments, the storage bag includes a port at the first end of the port tube.

In some embodiments, the higher melting polymer is a non-melt-processable polymer.

In some embodiments, (a) the higher melting polymer is a fluoropolymer, (b) the lower melting polymer is a fluoropolymer, or (c) both the higher melting polymer and the lower melting polymer are fluoropolymers.

In some embodiments, the higher melting polymer is polytetrafluoroethylene.

In some embodiments, the higher melting polymer is polyimide.

In some embodiments, the lower melting polymer is a melt-processable polymer.

In some embodiments, the lower melting polymer is FEP.

In some embodiments, the end tube comprises a label compartment.

BRIEF DESCRIPTION OF THE FIGURES

The accompanying drawings are included to provide a further understanding of the disclosure and are incorporated in and constitute a part of this specification, illustrate embodiments, and together with the description serve to explain the principles of the present disclosure.

FIG. 14 is a top view of a storage bag in accordance with some embodiments herein;

FIG. 15 is a top view of a composite tube of a storage bag in accordance with some embodiments herein;

FIG. 30 is a top view of the main tube, port tube and end tube of the storage bag in accordance with some embodiments herein;

FIG. 31 is a top view of a storage bag in accordance with some embodiments herein;

FIG. 32 is a top view of a main tube of the storage bag in accordance with some embodiments herein;

FIG. 33 is a perspective view of the main tube of the storage bag in accordance with some embodiments herein;

FIG. 48 is a top view of a storage bag in accordance with some embodiments herein;

FIG. 49 is a top view of a main tube of the storage bag in accordance with some embodiments herein;

FIG. 54 is a perspective view of the insert of the storage bag in accordance with some embodiments herein;

FIG. 55 is a top view of a storage bag in accordance with some embodiments herein;

FIG. 56 is a top view of a main tube of the storage bag in accordance with some embodiments herein;

FIG. 91 is a top view of an unfolded outer composite sheet of the storage bag in accordance with some embodiments herein;

FIG. 92 is a top view of the folded outer composite sheet of the storage bag in accordance with some embodiments herein;

FIG. 93 is a top view of a storage bag in accordance with some embodiments herein; and FIG. 94 is a top view of a storage bag in accordance with some embodiments herein.

DETAILED DESCRIPTION

Persons skilled in the art will readily appreciate that various aspects of the present disclosure can be realized by any number of methods and apparatus configured to perform the intended functions. It should also be noted that the accompanying figures referred to herein are not necessarily drawn to scale, but may be exaggerated to illustrate various aspects of the present disclosure, and in that regard, the figures should not be construed as limiting.

Described herein are durable cryopreservation storage bags for bulk protein storage, as well as cell and gene therapy apheresis, intermediate processing and primary packaging. Also described herein are methods for forming the storage bags so as to improve drainage and manipulation thereof. In some embodiments, the storage bag has an angled interface between a main compartment of the storage bag and a port. In some embodiments, the angled interface is formed by cutting the main tube at an angle instead of folding. In some embodiments, the construction of the storage bag improves visibility and flexibility of the storage bag. In some embodiments, methods for forming the storage bags so as to improve durability at freezing temperatures, with low plastic extractables and reduced leakage are also described herein. In some embodiments, the cryopreservation storage bags are crack and impact resistant at freezing temperatures.

Figure 1:
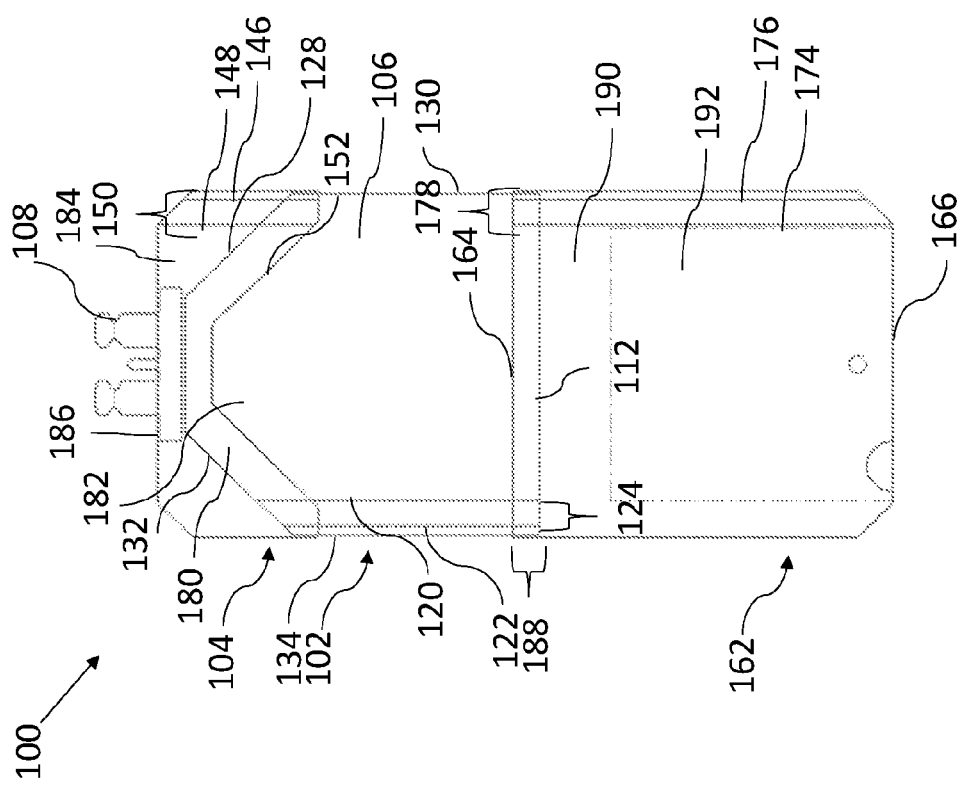
FIG. 1 is a top view of a storage bag in accordance with some embodiments herein.

FIG. 1 depicts a storage bag 100, according to some embodiments of the present disclosure. In some embodiments, the storage bag 100 is a cryopreservation bag. A cryopreservation bag, as defined herein, is a storage bag that protects biologic solutions at cryogenic temperatures during freeze, storage, transport and thaw. Cryogenic temperatures, as defined herein, are temperatures less than −80 degrees Celsius. The storage bag 100 includes a main tube 102 defining a compartment 106 therein, a port tube 104, and an end tube 162. In some embodiments, the port tube 104 is configured to receive a sealable port 108 such that the port 108 is in fluid communication with the compartment 106 of the main tube 102.

Figure 2:
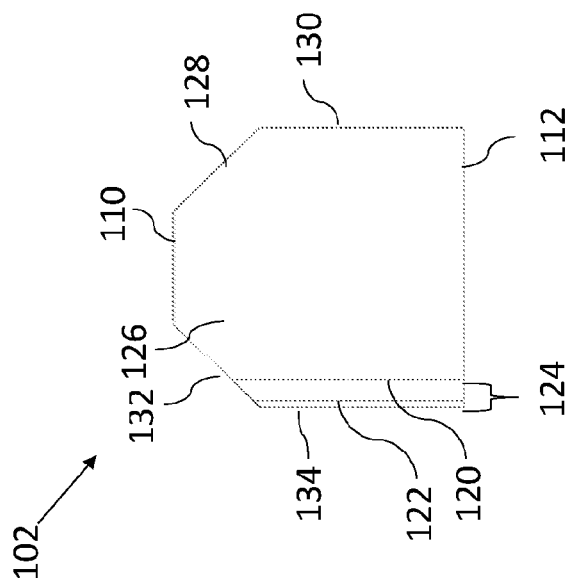
FIG. 2 is a top view of a main tube a storage bag in accordance with some embodiments herein.
Figure 3:
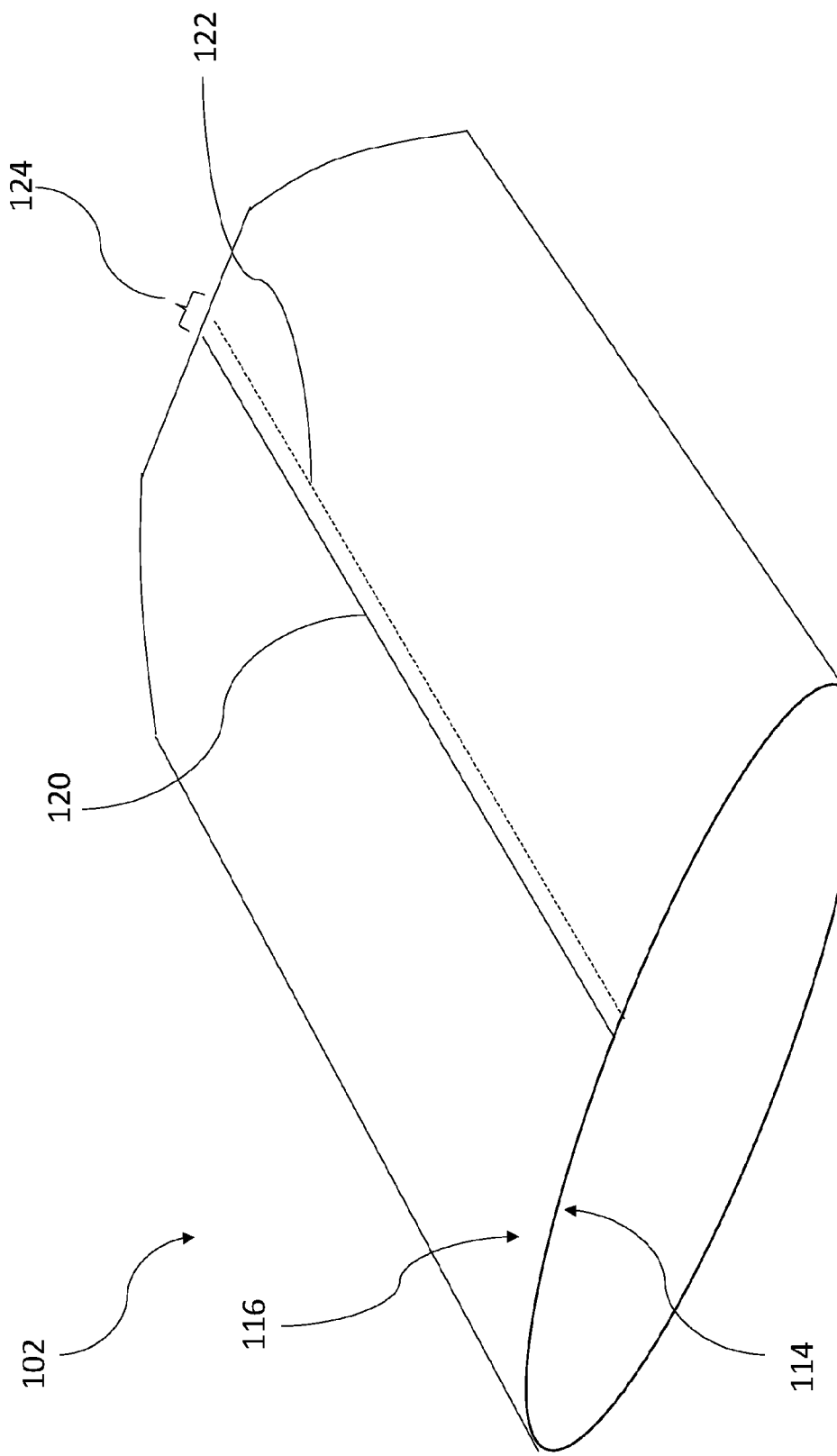
FIG. 3 is a perspective view of a main tube of a storage bag in accordance with some embodiments herein.

In some embodiments, the main tube 102 extends from a first end 110 to a second end 112, as depicted in FIGS. 2-3. In some embodiments, the main tube 102 defines an inner surface 114, which faces the compartment 106, and an outer surface 116, which faces the exterior of the storage bag 100.

Figure 4:
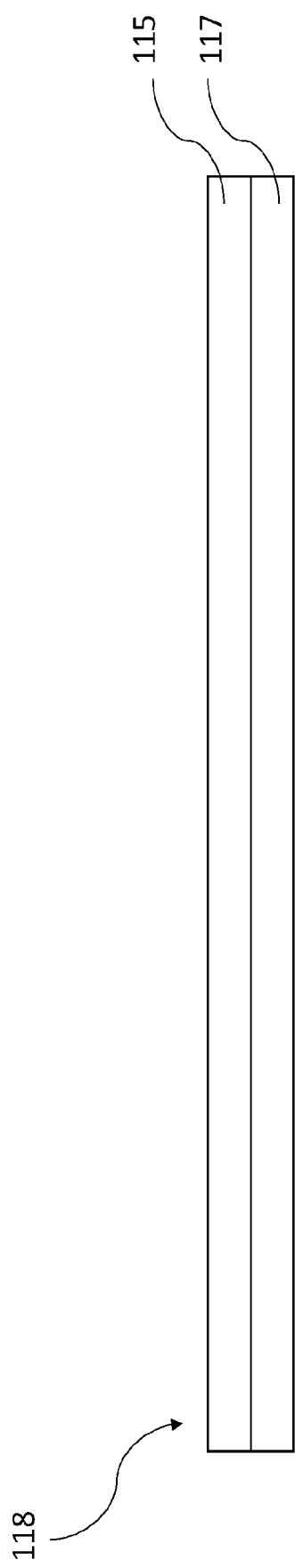
FIG. 4 is a cross-sectional view of a composite sheet of the main tube in accordance with some embodiments herein.

In some embodiments, the main tube 102 is formed from a composite sheet 118. A "composite sheet" is defined herein as a sheet formed of at least two different polymers. For example, in some embodiments, the composite sheet may be formed by layering at least two polymers and applying heat and/or pressure so as to result in the layers of the resultant composite sheet not being removable from each other. In an embodiment, the composite sheet includes a first polymer 115 and a second polymer 117, as depicted in FIG. 4. In some embodiments, the first polymer 115 is a higher melting polymer and the second polymer 117 is a lower melting polymer. As used herein "higher melting polymer" means a polymer having a melting point of at least 30° C., at least 40° C. or at least 50° C. above the "lower melting polymer," and "lower melting polymer" means a polymer having a melting point at least 30° C., at least 40° C. or at least 50° C. below that of the higher melting polymer.

In some embodiments, the higher melting polymer, the lower melting polymer, or both the higher melting polymer and lower melting polymer is a fluoropolymer.

In some embodiments, the higher melting polymer, the lower melting polymer, or both the higher melting polymer and the lower melting polymer includes, but is not limited to, the following materials: fluorinated ethylene-propylene (FEP), tetrafluoroethylene (TFE), modified polytetrafluoroethylene, perfluoroalkoxy (PFA), polyvinyl fluoride (PVF), polyvinylidene fluoride (PVDF), polychlorotrifluoroethylene (PCTFE), polyethylenetetrafluroethylene (ETFE), chlorotrifluoroethlyenevinylidene fluoride (FPM/FKM), polyethylenechlorotrifluoroethylene (ECTFE), perfluoroelastomer (FFPM/FFLM), perfluoropolyether (PFPE), tetrafluoroethylene and perfluoromethyl vinylether copolymer (MFA), chlorotrifluoroethylenevinylidene fluoride copolymer (FTFE/VDF), and any combination thereof.

Expanded polytetrafluoroethylene (ePTFE) is referred to herein for ease of discussion, but it is to be appreciated that expanded modified polytetrafluoroethylene (PTFE), expanded blends of PTFE, expanded copolymers of PTFE, and PTFE homopolymers are all considered to be within the purview of the invention. Patents have been issued on expandable blends of PTFE, expandable modified PTFE, and expanded copolymers of PTFE, such as, for example, U.S. Pat. No. 5,708,044 to Branca; U.S. Pat. No. 6,541,589 to Baillie; U.S. Pat. No. 7,531,611 to Sabol et al.; U.S. Pat. No. 8,647,144 to Ford; and U.S. Pat. No. 9,139,669 to Xu et al.

In some embodiments, the higher melting polymer or the lower melting polymer includes expanded polytetrafluoroethylene (ePTFE).

In some embodiments, the higher melting polymer includes densified polytetrafluoroethylene (ePTFE).

In some embodiments, the higher melting polymer or the lower melting polymer includes densified expanded polytetrafluoroethylene (ePTFE).

In some embodiments, the higher melting polymer is a non-melt-processable polymer.

In some embodiments, the higher melting polymer is PTFE.

In some embodiments, the higher melting polymer is polyimide.

In some embodiments, the lower melting polymer is a melt-processable polymer.

In some embodiments, the higher melting polymer is a non-melt processable polymer such as polytetrafluoroethylene or a polyimide such as Kapton®, and the lower melting polymer is a melt processable polymer such as fluorinated ethylene-propylene ("FEP").

In some embodiments, the main tube 102 is formed by creating a tube from the composite sheet 118, as illustrated in FIG. 3, such that the inner surface 114 is the first polymer 115 of the composite sheet 118 and the outer surface 116 is the second polymer 117 of the composite sheet 118. Thus, when the main tube 102 is formed, the outer surface 116 of the main tube 102 is the lower melting polymer 117 and the inner surface 114 is the higher melting polymer 115. In some embodiments, the main tube 102 is formed by overlapping a first lateral edge 120 of the composite sheet 118 over a second lateral edge 122 of the composite sheet 118 such that the inner surface 114 overlaps a portion of the outer surface 116, as depicted in FIG. 3. The higher melting polymer of the inner surface 114 and the lower melting polymer of the outer surface 116 are then heat sealed together such that the lower melting polymer bonds with the higher melting polymer, creating a lap seam 124.

In some embodiments, the corners at the first end 110 of the main tube 102 are cut to form a main tube angled interface 126 configured for engagement with the port tube 104. For example, as depicted in FIG. 2, in some embodiments, the main tube 102 includes a first angled edge 128 extending from a first lateral side 130 of the main tube 102 toward the first end 110. In some embodiments, the main tube 102 also includes second angled edge 132 extending from a second lateral side 134 of the main tube 102, opposite the first lateral side 130, toward the first end 110. As shown in FIG. 2, the first end 110 extends between the first angled edge 128 and the second angled edge 132. The first angled edge 128, the second angled edge 132 and the first end 110, in combination, make up the main tube angled interface 126 that engages with the port tube 104.

Figure 5:
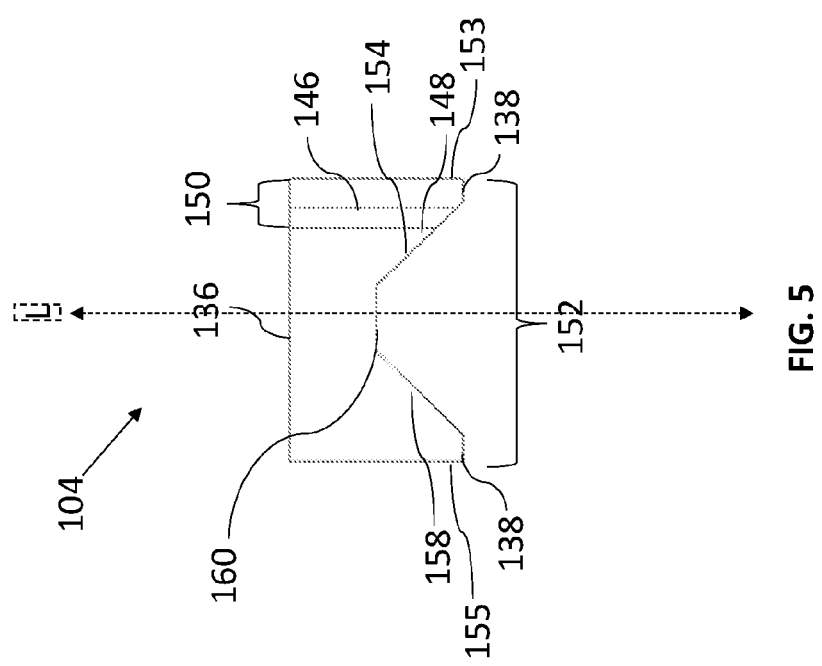
FIG. 5 is a top view of a port tube of a storage bag in accordance with some embodiments herein.

In some embodiments, as depicted in FIG. 5, the port tube 104 extends from a first end 136 to a second end 138. In some embodiments, the port tube 104 defines an inner surface, which faces an inside of the port tube 104, and an outer surface, which faces the exterior of the storage bag 100.

Figure 6:
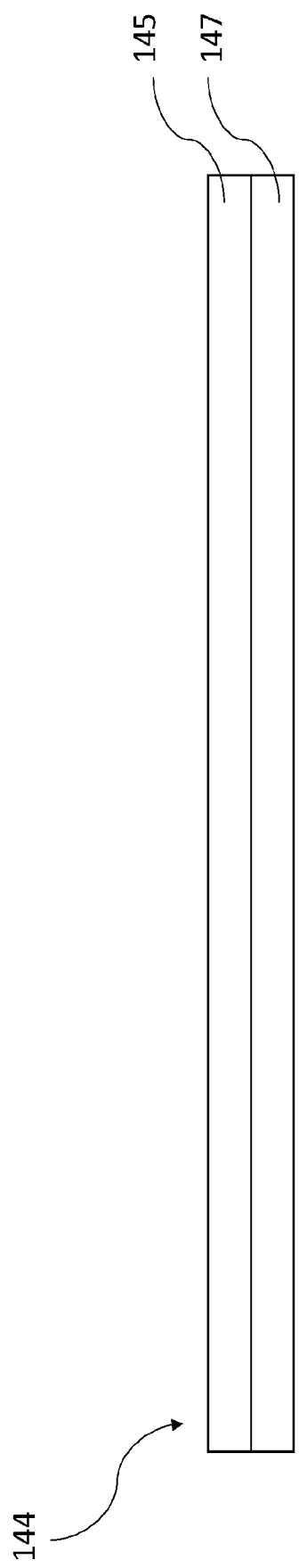
FIG. 6 is a cross-sectional view of a composite sheet of the port tube in accordance with some embodiments herein.

In some embodiments, the port tube 104 is formed in substantially the same manner as the main tube 102. In some embodiments, the port tube 104 is formed from a composite sheet 144 including a first polymer 145 and a second polymer 147, as depicted in FIG. 6. However, in some embodiments, the first polymer 145 is a lower melting polymer and the second polymer 147 is a higher melting polymer. In some embodiments, the first polymer 145 and the second polymer 147 of the port tube 104 are formed from any of the materials listed above with regard to the main tube 102.

Figure 7:
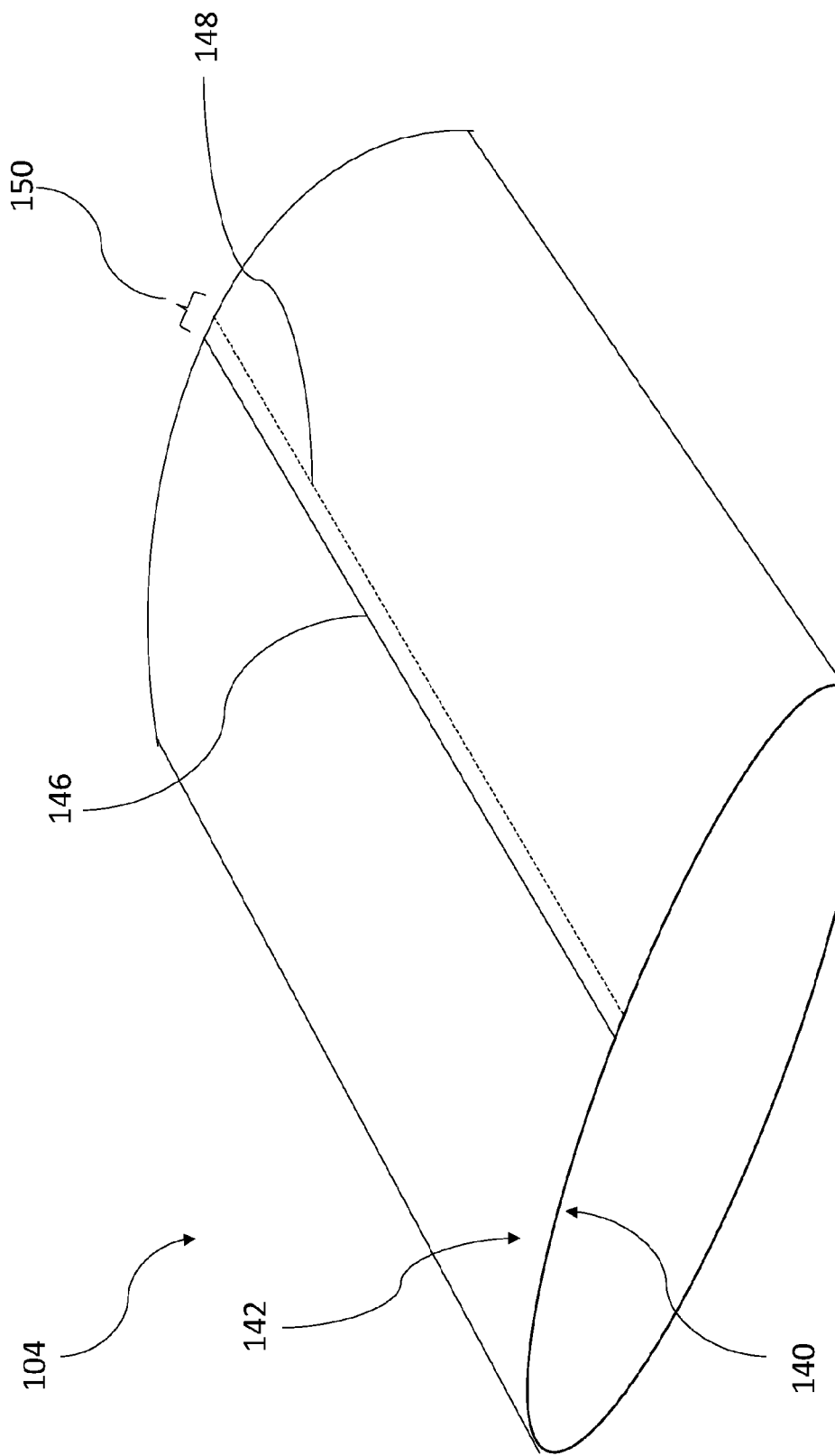
FIG. 7 is a perspective view of a port tube of a storage bag in accordance with some embodiments herein.

In some embodiments, as depicted in FIG. 7, the port tube 104 is formed by creating a tube from the composite sheet 144 such that the inner surface 140 is the first polymer 145 of the composite sheet 144 and the outer surface 142 is the second polymer 147 of the composite sheet 144. Thus, when the port tube 104 is formed, the outer surface 142 of the port tube 104 is the higher melting polymer and the inner surface 140 is the lower melting polymer. In some embodiments, the port tube 104 is formed by overlapping a first lateral edge 146 of the composite sheet 144 over a second lateral edge 148 of the composite sheet 144 such that the inner surface 140 overlaps a portion of the outer surface 142 to form a port tube lap seam 150, as depicted in FIG. 7. The lower melting polymer of the inner surface 140 and the higher melting polymer of the outer surface 142 are then heat sealed together such that the lower melting polymer bonds with the higher melting polymer, creating a port tube lap seam 150.

In some embodiments, a central portion of the second end 138 of the port tube 104 is cut to form an angled interface 152 configured for engagement with the angled interface 126 of the main tube 102. As depicted in FIG. 5, in some embodiments, the port tube 104 includes a first angled edge 154 extending from the second end 138 toward a central longitudinal axis L. The port tube 104 also includes second angled edge 158 extending from the second end 138 toward the central longitudinal axis L. A horizontal edge 160 extends from, and connects, the first angled edge 154 to the second angled edge 158. As shown in FIG. 5, the second end 138 extends between a first lateral side 153 and the first angled edge 154 and between a second lateral side 155 and the second angled edge 158. The first angled edge 154, the second angled edge 158, the horizontal edge 160, and the second end 138, in combination, make up the angled interface 152 that engages with the main tube 102.

Figure 8:
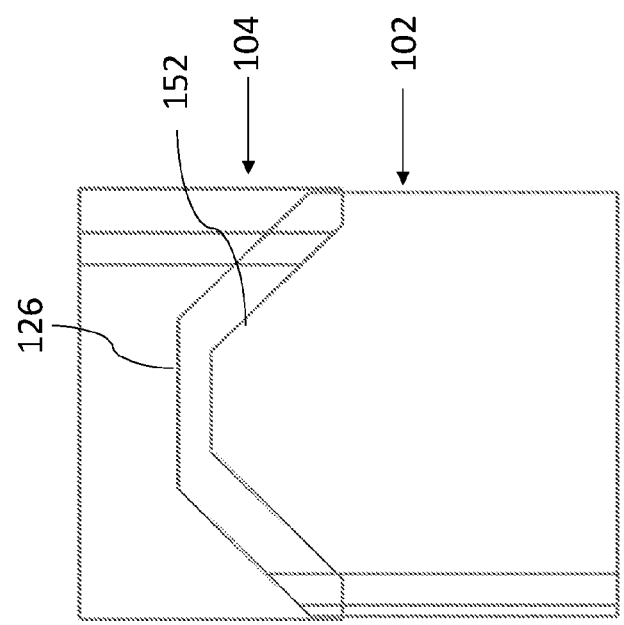
FIG. 8 is a top view of a main tube and a port tube of a storage bag in accordance with some embodiments herein.

As depicted in FIG. 8, the angled interface 152 of the port tube 104 has a profile that is substantially the same as the angled interface 126 of the main tube 102 so that, when the angled interface 152 of the port tube 104 overlaps the angled interface 126 of the main tube 102, portions of the storage bag 100 that have two layers of composite sheets are reduced or minimized. Reducing or minimizing the overlap of the composite sheets 118, 144 of the respective tubes improves visualization and manipulation of the storage bag 100, as will be discussed in further detail below.

Figure 9:
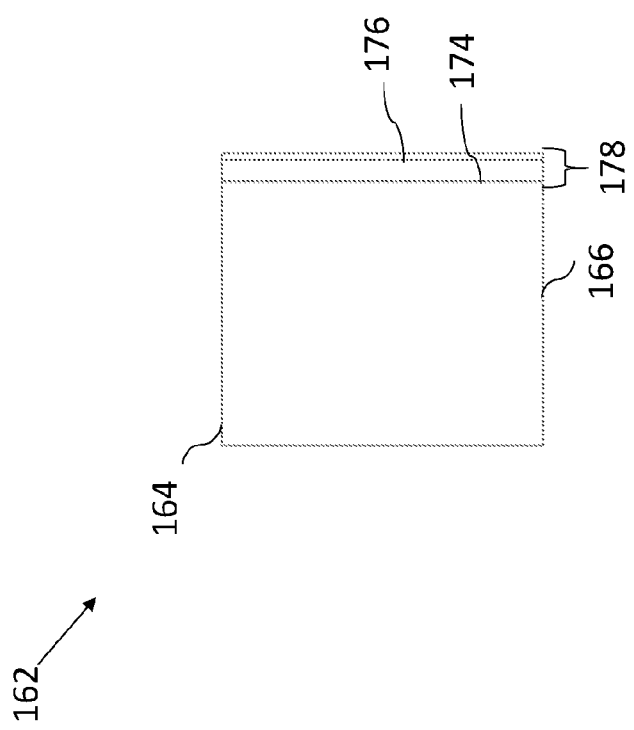
FIG. 9 is a top view of an end tube of a storage bag in accordance with some embodiments herein.
Figure 10:
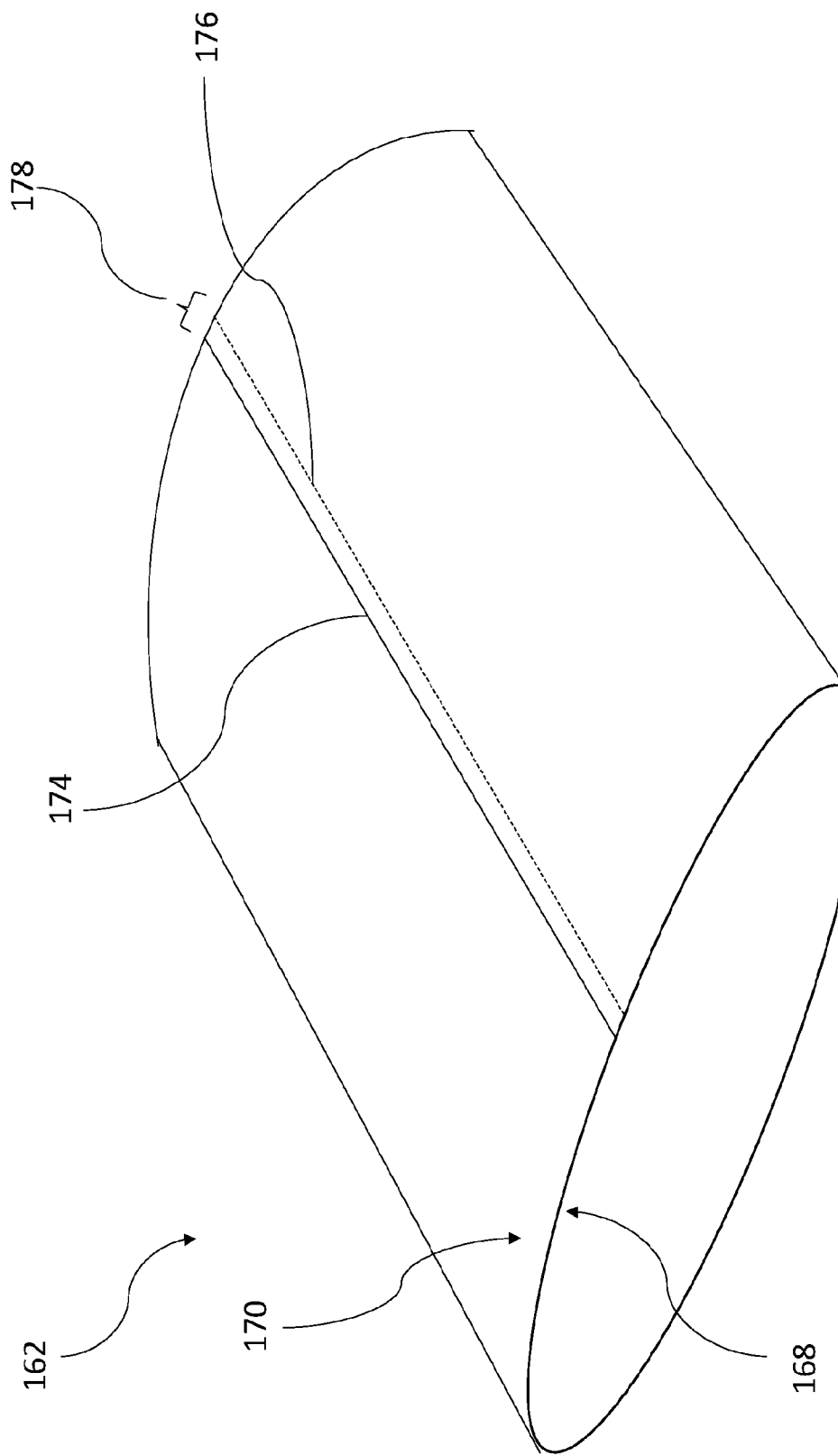
FIG. 10 is a perspective view of an end tube of a storage bag in accordance with some embodiments herein.

In some embodiments, the storage bag 100 also includes an end tube 162, depicted in FIGS. 1 and 9, that is positioned over the second end 112 of the main tube 102 to seal the storage bag 100. In some embodiments, the end tube 162 extends from a first end 164 to a second end 166. In some embodiments, the end tube 162 defines an inner surface 168, which faces an inside of the end tube 162, and an outer surface 170, which faces the exterior of the storage bag 100, as depicted in FIG. 10.

Figure 11:
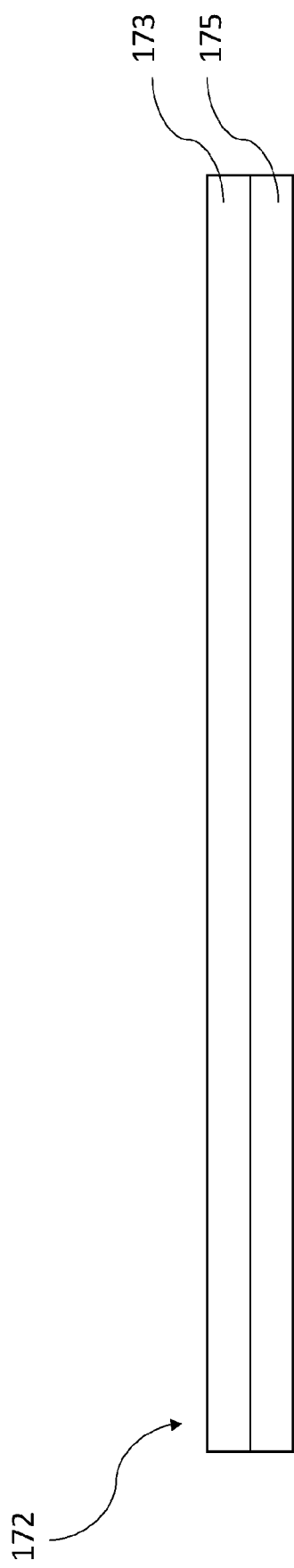
FIG. 11 is a cross-sectional view of a composite sheet of the end tube in accordance with some embodiments herein.

In some embodiments, the end tube 162 is formed in substantially the same manner as the port tube 104. Specifically, in some embodiments, the end tube 162 is formed from a composite sheet 172 including a first polymer 173 and a second polymer 175, as depicted in FIG. 11. In some embodiments, the first polymer 173 is a lower melting polymer and the second polymer 175 is a higher melting polymer. In some embodiments, the first polymer 173 and the second polymer 175 of the end tube 162 are formed from any of the materials listed above with regard to the main tube 102.

In some embodiments, the end tube 162 is formed by creating a tube from the composite sheet 172 such that the inner surface 168 is the first polymer 173 of the composite sheet 172 and the outer surface 170 is the second polymer 175 of the composite sheet 172. Thus, when the end tube 162 is formed, the outer surface 170 of the end tube 162 is the higher melting polymer and the inner surface 168 is the lower melting polymer. In some embodiments, the end tube 162 is formed by overlapping a first lateral edge 174 of the composite sheet 172 over a second lateral edge 176 of the composite sheet 172 such that the inner surface 168 overlaps a portion of the outer surface 170, as depicted in FIG. 10. The lower melting polymer of the inner surface 168 and the higher melting polymer of the outer surface 170 are then heat sealed together such that the lower melting polymer bonds with the higher melting polymer, creating an end tube lap seam 178.

The storage bag 100 is formed by inserting the angled interface 126 of the main tube 102 into the angled interface 152 of the port tube 104 such that the first angled edge 154 of the port tube 104 overlaps the first angled edge 128 of the main tube 102 and the second angled edge 158 of the port tube 104 overlaps the second angled edge 132 of the main tube 102, as depicted in FIG. 8. In this configuration, the lower melting polymer of the inner surface 140 of the port tube 104 is adjacent to the lower melting polymer of the outer surface 116 of the main tube 102. The port tube 104 and the main tube 102 are heat sealed together such that the lower melting polymer of the main tube 102 bonds with the lower melting polymer of the port tube 104, creating a lap seam 180.

In some embodiments, an angled drainage area 182 is then formed by sealing at least a portion 184 of the port tube 104 not overlapping the main tube 102 to itself. A port insertion area 186 of the port tube 104 is left unsealed and open to the compartment 106 so that the port 108 can be inserted therein.

The angled drainage area 182 enhances drainage from the compartment 106 to and through the port 108. In some embodiments, the angled drainage area 182 results in at least 85% drainage from the compartment 106. In other embodiments, the angled drainage area 182 results in at least 90% drainage from the compartment 106. In other embodiments, the angled drainage area 182 results in at least 95% drainage from the compartment 106. In other embodiments, the angled drainage area 182 results in at least 99% drainage from the compartment 106.

The angled drainage area 182 also increases cell retrieval from the gene therapies contained within the storage bag 100, as compared to conventional storage bags without angled drainage areas. Additionally, because the angled drainage area 182 is formed such that the inner surface 114 of the main tube 102 faces the gene therapies contained within the bag, cell retrieval is also increased by low cellular adhesion to the fluoropolymer of the inner surface 114, as compared to conventional storage bags that do not have fluoropolymer inner surfaces.

Because the angled drainage area 182 is angled, liquid contained within the compartment 106 is directed toward the port 108. In some embodiments, the angle of the drainage area 182 is optimized to improve flow of liquids contained in the compartment 106 toward the port 108. Furthermore, the elimination of corners having about a 90 degree angle in the compartment 106 minimizes liquid being caught in the compartment 106. Additionally, the elimination of corners in the compartment 106 helps facilitate air removal from the storage bag 100. Air can be detrimental to the contents of the bag due to potential changes in pH.

To seal the second end 112 of the main tube 102, the second end 112 of the main tube 102 is partially inserted into the first end 164 of the end tube 162 such that the lower melting polymer of the inner surface 168 of the end tube 162 is adjacent to the lower melting polymer of the outer surface 116 of the main tube 102. The main tube 102 and the end tube 162 are heat sealed together such that the lower melting polymer of the main tube 102 bonds with the lower melting polymer of the end tube 162, creating a lap seam 188. In some embodiments, the storage bag 100 is then sealed by sealing the portion 190 of the end tube 162 that does not overlap the main tube 102 to itself.

In some embodiments, the end tube 162 is selectively sealed to itself to form various compartments therein. Thus, the size and shape of the end tube 162 may be predetermined to accommodate the various compartments to be formed therein. For example, in one embodiment, depicted in FIG. 1, the end tube 162 is sized and shaped for formation of a label compartment 192. In this embodiment, the end tube 162 is selectively sealed to itself around the desired label area, leaving the second end 166 open so that a label may be slid into the label compartment 192. In other embodiments, the end tube 162 is formed with two or more label compartments for insertion of multiple labels.

Figure 12:
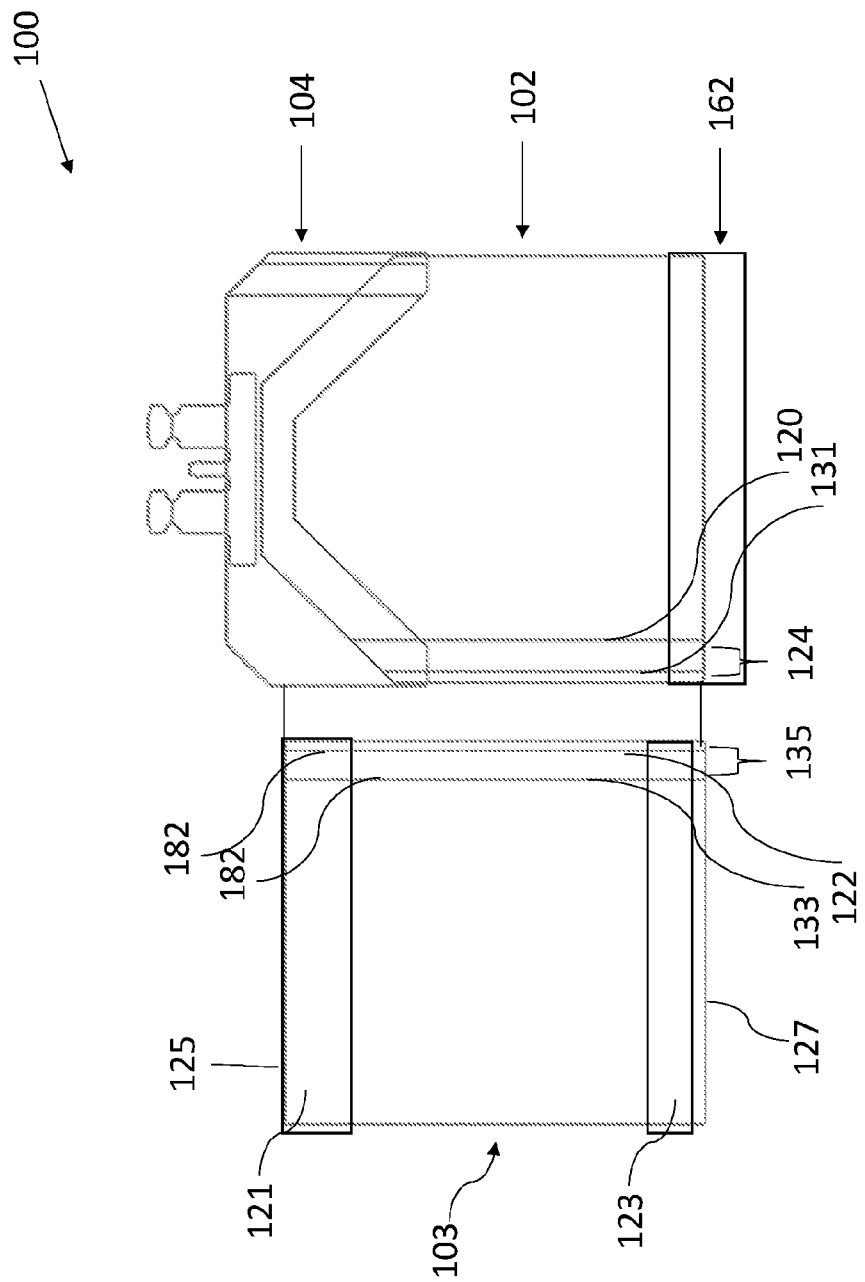
FIG. 12 is a top view of a storage bag with a label tube in accordance with some embodiments herein.
Figure 13:
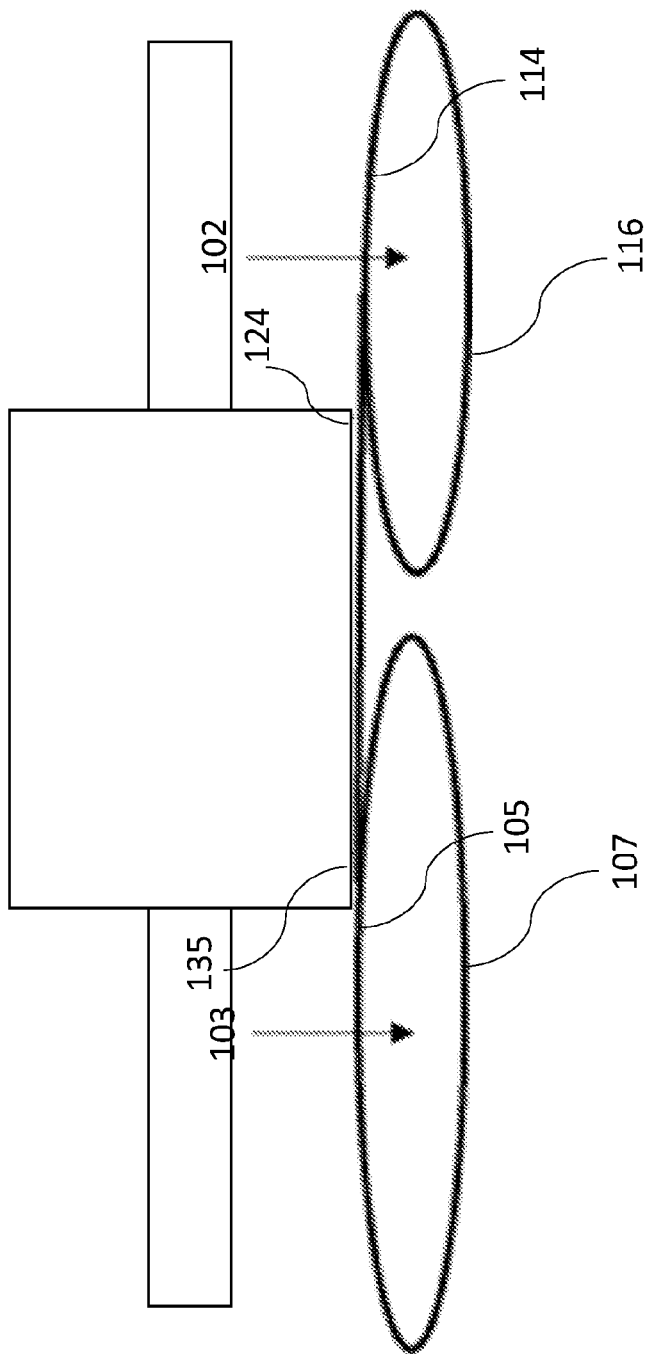
FIG. 13 is a side view of a main tube and a label tube in accordance with some embodiments herein.

In some embodiments, the storage bag 100 includes a label tube 103 laterally positioned relative to the main tube 102, as depicted in FIGS. 12 and 13. In this embodiment, the composite sheet is 118 formed into two adjacent tubes—the main tube 102 and the label tube 103. The main tube 102 is constructed as described above, except that the first lateral edge 120 overlaps a first medial portion 131 of the composite sheet 118 such that the inner surface 114 overlaps a portion of the outer surface 116. The higher melting polymer of the inner surface 114 and the lower melting polymer of the outer surface 116 are then heat sealed together such that the lower melting polymer bonds with the higher melting polymer, creating the lap seam 124.

The label tube is also formed such that an inner surface 105 thereof is the first polymer 115 of the composite sheet 118 and an outer surface 107 thereof is the second polymer 117 of the composite sheet 118. Thus, when the label tube 103 is formed, the outer surface 107 of the label tube 103 is the lower melting polymer and the inner surface 105 is the higher melting polymer. In some embodiments, the label tube 103 is formed by overlapping the second lateral edge 122 of the composite sheet 118 over second medial portion 133 of the composite sheet 118, adjacent the first medial portion 131, such that the inner surface 105 overlaps a portion of the outer surface 107, as depicted in FIG. 13. The higher melting polymer of the inner surface 105 and the lower melting polymer of the outer surface 107 are then heat sealed together such that the lower melting polymer bonds with the higher melting polymer, creating a lap seam 135.

In some embodiments, the main tube 102 is then combined with the port tube 104 and the end tube 162, as described above. In some embodiments, the label tube 103 is sealed via a first flap 121 at a first end 125 of the label tube 103, and a second flap 123 at a second end 127 of the label tube 103. In some embodiments, the first flap 121 is folded over the open first end 125 and sealed to the outer surface 107 of the label tube 103. Once a label is positioned within the label tube 103, the second flap 123 is folded over the open second end 127, and sealed to the outer surface 107, to seal the label tube 103.

In another embodiment, the label tube 103 is formed by overlapping the outer surface 116 of the main tube 102 over the second lateral edge 122 of the composite sheet 118. In some embodiments, the second lateral edge 122 is inverted so that the lower melting polymer of the composite sheet 118 is adjacent to the lower melting polymer of the outer surface 116 of the main tube 102. The lower melting polymer of the outer surface 116 and the lower melting polymer of the second lateral edge 122 are then heat sealed together such that the lower melting polymer bonds with the lower melting polymer, creating a lap seam 137.

As discussed above, the design of the storage bag 100 minimizes overlapping of the composite sheets of the main tube 102, the port tube 104 and the end tube 162, allowing for enhanced flexibility of the storage bag 100 and visibility through the storage bag 100, as compared to conventional storage bags designs, which require multiple layers of composite sheets. At the same time, the lap seams formed to create the main tube 102, the port tube 104, and the end tube 162, as well the lap seams formed between the main tube 102, the port tube 104 and end tube 162 provide a highly durable construction for cryopreservation. Thus, the exemplary designs discussed above result in a highly durable storage bag with increased drainage, visibility and manipulation as compared to conventional storage bags.

FIG. 14 depicts a storage bag 200, according to some embodiments of the present disclosure. In some embodiments, the storage bag 200 is a cryopreservation bag. The storage bag 200 includes a composite tube 202 defining a compartment 210 therein. In some embodiments, the composite tube 202 extends from a first end 204 to a second end 206, as depicted in FIG. 15. In an embodiment, the first end 204 is a port end configured to receive at least one sealable port 208 such that the port 208 is in fluid communication with the compartment 210, as depicted in FIG. 14. In some embodiments, the composite tube 202 defines an inner surface 212, facing the compartment 210, and an outer surface 214, facing an exterior of the storage bag 200, as depicted in FIG. 16.

Figure 17:
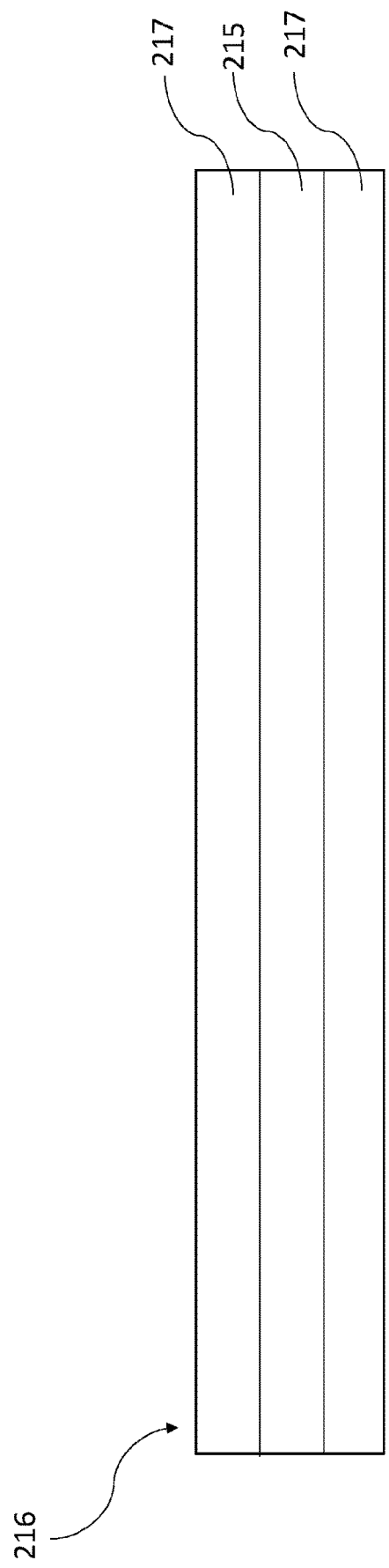
FIG. 17 is a cross-sectional view of a composite sheet of the composite tube in accordance with some embodiments herein.

In some embodiments, the composite tube 202 is formed from a composite sheet 216. In an embodiment, the composite sheet 216 is a three-layer composite that includes a first polymer 215 and a second polymer 217. In some embodiments, a layer of the first polymer 215 is positioned between two layers of the second polymer to form the three-layer composite sheet 216, as depicted in FIG. 17. In some embodiments, the first polymer 215 is a higher melting polymer and the second polymer 217 is a lower melting polymer. As discussed above, a "higher melting polymer" means a polymer having a melting point at least 30° C., at least 40° C., or at least 50° C. above the "lower melting polymer," and "lower melting polymer" correspondingly means a polymer having a melting point at least 30° C., at least 40° C., or at least 50° C. below that of the higher melting polymer. In some embodiments, the first polymer 215 and the second polymer 217 of the composite tube 202 are formed from any of the materials listed above with regard to the main tube 102.

Figure 16:
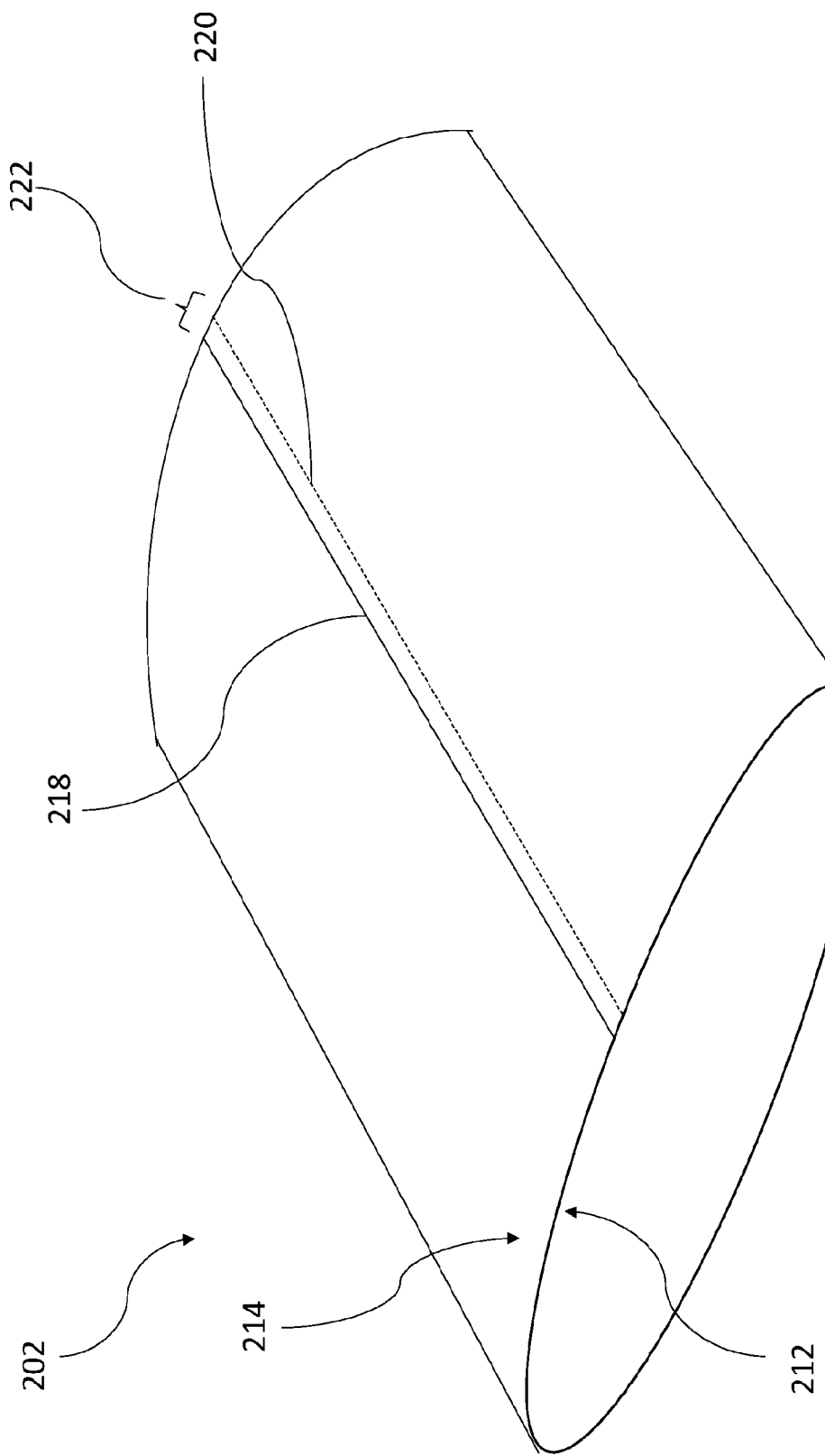
FIG. 16 is a perspective view of a composite tube of a storage bag in accordance with some embodiments herein.

In some embodiments, the composite tube 202 is formed by creating a tube from the composite sheet 216, as illustrated in FIG. 16, such that both the inner surface 212 and the outer surface 214 is the second polymer 217 of the composite sheet 216. Thus, when the composite tube 202 is formed, both the inner surface 212 and the outer surface 214 of the composite tube 202 is the lower melting polymer. In some embodiments, the composite tube 202 is formed by overlapping a first lateral edge 218 of the composite sheet 216 over a second lateral edge 220 of the composite sheet 216 such that the inner surface 212 overlaps a portion of the outer surface 214. The lower melting polymer of the inner surface 212 and the lower melting polymer of the outer surface 214 are then heat sealed together such that the lower melting polymer of 212 bonds with the lower melting polymer of 214, creating a lap seam 222.

Figure 18:
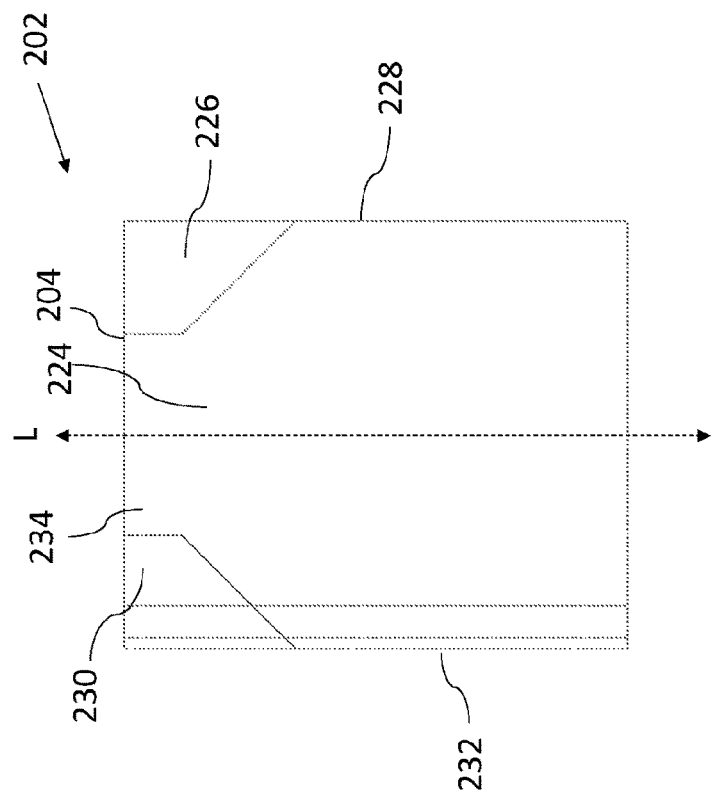
FIG. 18 is a top view of a composite tube with an angled drainage area in accordance with some embodiments herein.

In some embodiments, an angled drainage area 224 is formed in the composite tube 202 by sealing the corners at the first end 204 of the composite tube 202 to themselves. Specifically, the lower melting polymer of the inner surface 212 of the composite tube 202 is sealed to itself to form the angled drainage area 224, as depicted in FIG. 18. As depicted in the figure, a first portion 226 of the composite tube 202, extending from a first lateral edge 228 of the composite tube 202 toward the first end 204, and angled toward a central longitudinal axis L of the storage bag 200, is sealed to itself. Similarly, a second portion 230 of the composite tube 202, extending from a second lateral edge 232 of the composite tube 202 toward the first end 204, and angled toward the central longitudinal axis L of the storage bag 200, is sealed to itself. As shown in FIG. 18, the composite tube 202 also includes a port passage 234, where the composite tube 202 is not sealed to itself, at the first end 204. The port passage 234 is positioned between the first angled portion 226 and the second angled portion 230 and is configured for insertion of the port 208 therethrough. The first angled portion 226, the second angled portion 230, and the port passage 234 form the angled drainage area 224.

The angled drainage area 224 enhances drainage from the compartment 210 to and through the port 208. In some embodiments, the angled drainage area 224 results in at least 85% drainage from the compartment 210. In other embodiments, the angled drainage area 224 results in at least 90% drainage from the compartment 210. In other embodiments, the angled drainage area 224 results in at least 95% drainage from the compartment 210. In other embodiments, the angled drainage area 224 results in at least 99% drainage from the compartment 210.

The angled drainage area 224 also increases cell retrieval from the gene therapies contained within the storage bag 200, as compared to conventional storage bags without angled drainage areas. Additionally, because the angled drainage area 224 is formed such that the inner surface 212 of the composite tube 202 faces the gene therapies contained within the bag, cell retrieval is also increased by low cellular adhesion to the fluoropolymer of the inner surface 212, as compared to conventional storage bags that do not have fluoropolymer inner surfaces.

Furthermore, because the angled drainage area 224 is angled, liquid contained within the compartment 210 is directed toward the port 208. In some embodiments, the angle of the drainage area 224 is optimized to improve flow of liquids contained in the compartment 210 toward the port 208. The elimination of corners having about a 90 degree angle in the compartment 210 minimizes liquid being caught in the compartment 210. Additionally, the elimination of corners in the compartment 210 facilitates air removal from the storage bag 200. Air can be detrimental to the contents of the bag due to potential changes in pH.

Figure 19:
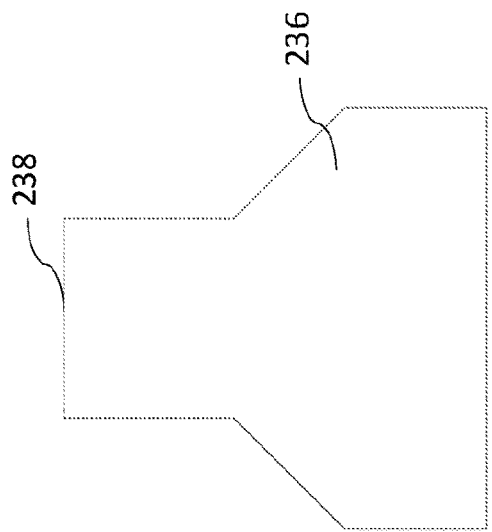
FIG. 19 is a top view of an insert for formation of an angled drainage are in accordance with some embodiments herein.

In some embodiments, an insert 236 is used to form the compartment 210 and angled drainage area 224. For example, the insert 236, in some embodiments, is formed of a non-sealing material and is positioned within the compartment 210 of the composite tube 202 prior to sealing. In some embodiments, the insert 236 is sized and shaped such that a first end 238 thereof, closest to the first end 204 of the composite tube 202 has a profile of the desired angled drainage area 224, as shown in FIG. 19. Once the insert 236 is positioned in the compartment 210, the composite tube 202 is heat-sealed to itself around the insert 236 to seal the first end 204, forming the angled drainage area 224. The insert 236 is then removed from the compartment 210 via the second end 206.

In some embodiments, the storage bag 200 is sealed by sealing the second end 206 to itself.

In some embodiments, the storage bag 200 includes a label compartment 292. In this embodiment, the composite tube 202 is selectively sealed to itself to close the compartment 210, as well as around a desired label area, leaving the second end 206 open so that a label may be slid into the label compartment 292. In other embodiments, the composite tube 202 is formed with two or more label compartments for insertion of multiple labels.

As with storage bag 100, the angled drainage area 224 enhances drainage from the compartment 210 to and through the port 208 of the storage bag 200. Because the angled drainage area 224 is angled, liquid contained within the compartment 210 is directed toward the port 208. Furthermore, the elimination of corners in the compartment 210 minimizes liquid being caught within the compartment 210.

The use of a single composite sheet 216 to form the storage bag 200 minimizes overlapping of multiple separate composite sheets in the formation of the storage bag 200, allowing for enhanced flexibility of the storage bag 200 and visibility through the storage bag 200, as compared to conventional storage bag designs, which require multiple layers of composite sheets. At the same time, the lap seam formed to create the composite tube 202 provides a highly durable construction for cryopreservation. Thus, the exemplary designs discussed above result in a highly durable storage bag with increased drainage, visibility and manipulation as compared to conventional storage bags.

Figure 20:
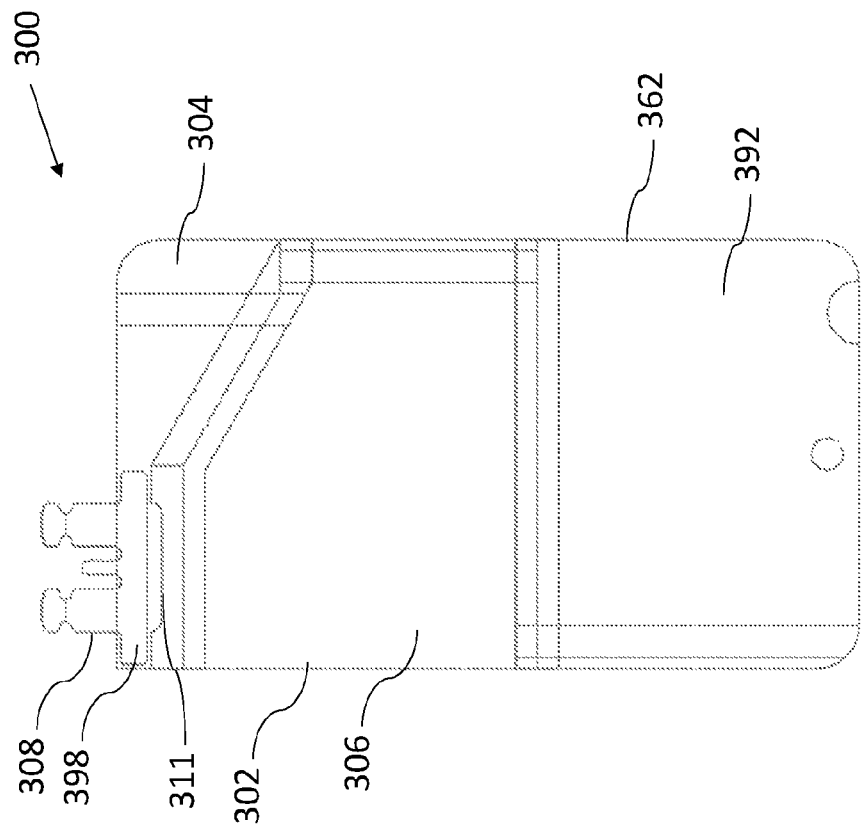
FIG. 20 is a top view of a storage bag in accordance with some embodiments herein.

FIG. 20 depicts a storage bag 300, according to some embodiments of the present disclosure. In some embodiments, the storage bag 300 is a cryopreservation bag. The storage bag 300 includes a body 302, a port tube 304, and an end tube 362. In some embodiments, the port tube 304 is configured to receive at least one sealable port 308 such that the port 308 is in fluid communication with a compartment 306 of the storage bag 300.

Figure 22:
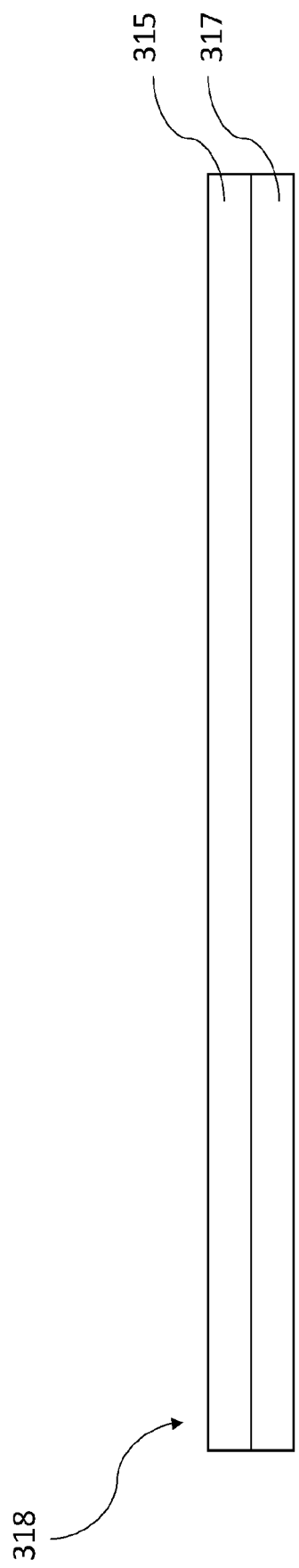
FIG. 22 is a cross-sectional view of a composite sheet of the body tube in accordance with some embodiments herein.

In some embodiments, the body 302 is formed from a composite sheet 318. In an embodiment, the composite sheet includes a first polymer 315 and a second polymer 317, as depicted in FIG. 22. In some embodiments, the first polymer 315 is a higher melting polymer and the second polymer 317 is a lower melting polymer, as per the definitions provided above. In some embodiments, the first polymer 315 and the second polymer 317 of the body 302 are formed from any of the materials listed above with regard to the main tube 102.

Figure 21:
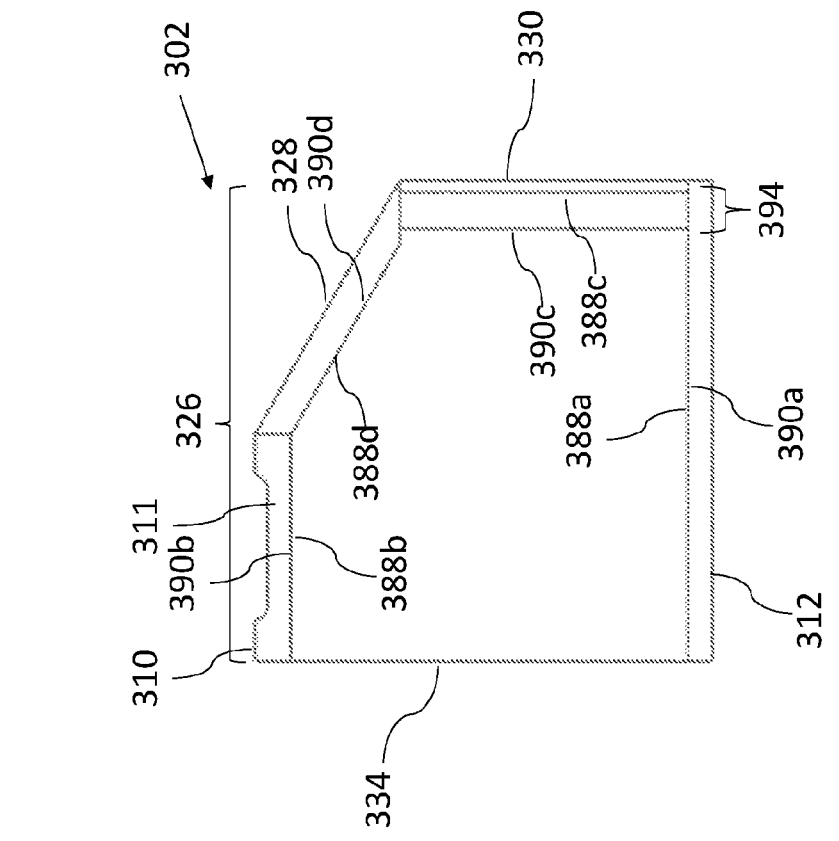
FIG. 21 is a top view of a body tube of the storage bag in accordance with some embodiments herein.
Figure 23:
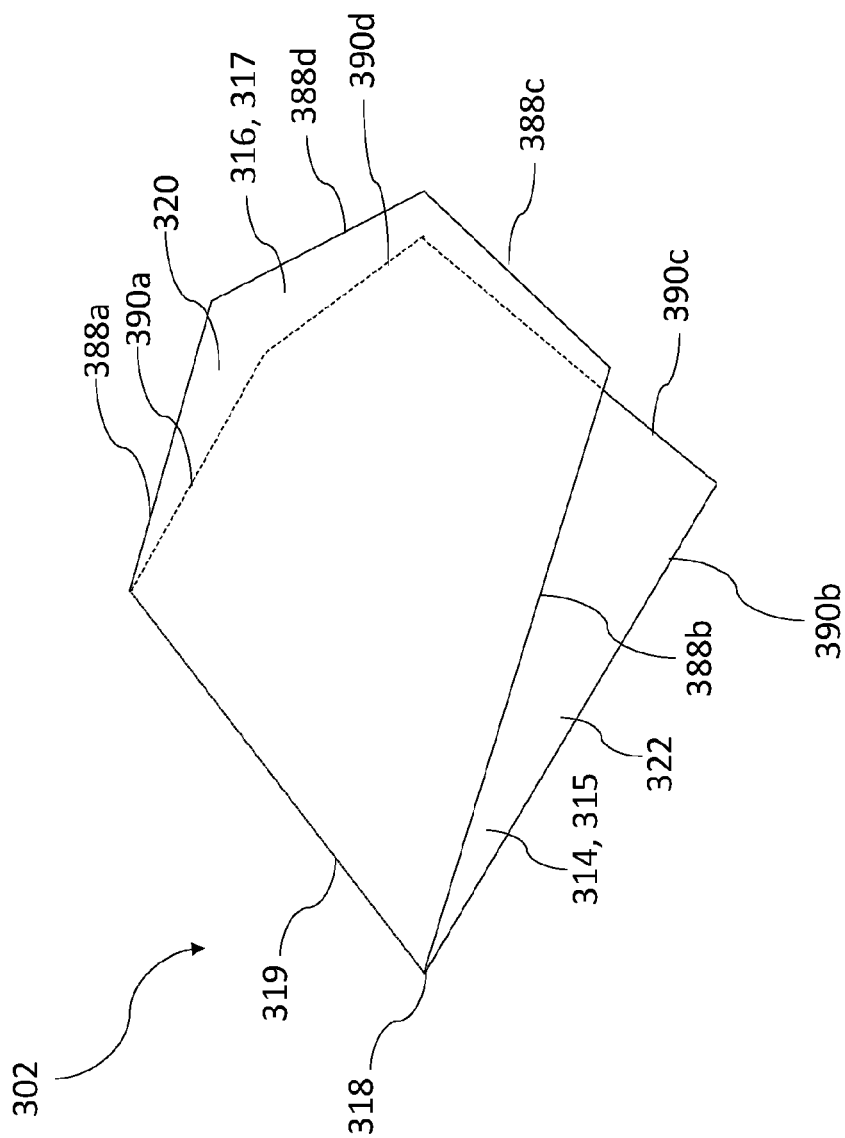
FIG. 23 is a perspective view of the body tube of the storage bag in accordance with some embodiments herein.

In some embodiments, the body 302 extends from a first end 310 to a second end 312 and from a first lateral side 330 to a second side 334, as depicted in FIG. 21. In some embodiments, the body 302 is formed by folding the composite sheet 318 along a fold line 319 to define a first portion 320 and a second portion 322, as depicted in FIG. 23. In some embodiments, the body 302 defines an inner surface 314, which faces the compartment 306, and an outer surface 316, which faces the exterior of the storage bag 300. In some embodiments, the composite sheet 318 is folded such that the inner surface 314 is the first polymer 315 of the composite sheet 318 and the outer surface 316 is the second polymer 317 of the composite sheet 318.

In some embodiments, a corner at the first side 330 of the body 302 is cut to form a body angled interface 326 configured for engagement with the port tube 304. For example, as depicted in FIG. 21, in some embodiments, the body 302 includes an angled edge 328 extending from a first lateral side 330 of the body 302 toward the first end 310. As depicted in FIG. 21, the first end 310 extends between the angled edge 328 and a second lateral side 334 of the body 302. The angled edge 328 and the first end 310 make up a body angled interface 326 that engages with the port tube 304. In some embodiments, the first end 310 includes a cutout 311, depicted in FIG. 21, configured to receive an insertion portion of the port 308, as will be described in further detail below.

In some embodiments, when folded to form the body 302, the first portion 320 of the composite sheet 318 includes four open edges: a first end edge 388a, a second end edge 388b, a first lateral side edge 388c and an angled edge 388d. In some embodiments, the second portion 322 also includes four open edges: a first end edge 390a, a second end edge 390b, a first side edge 390c and an angled edge 390d. In some embodiments, each of the second portion edges 390a-d includes extends past the associated one of the first portion edges 388a-d. In some embodiments, the body 302 is formed by first folding the first end edge 390a, the second end edge 390b and the angled edge 390c of the second portion toward the respective first end edge 388a, second end edge 388b and angled edge 388d of the first portion such that the first portion edges 388a,b,d and the second portion edges 390a,b,d abut, but do not overlap, one another. In some embodiments, as a result of such folding, the first polymer 315 contacts itself on the inside of the folded composite sheet 318, and the second polymer 317 faces outward. In some embodiments, the first side edge 390c of the second portion 322 is overlapped over the first side edge 388c of the first portion 320 such that the inner surface 314 overlaps a portion of the outer surface 316 to form a first side lap seam 394, as depicted in FIG. 21. The lower melting polymer of the inner surface 314 and the higher melting polymer of the outer surface 316 are then heat sealed together such that the lower melting polymer bonds with the higher melting polymer, creating the first side lap seam 394.

Figure 24:
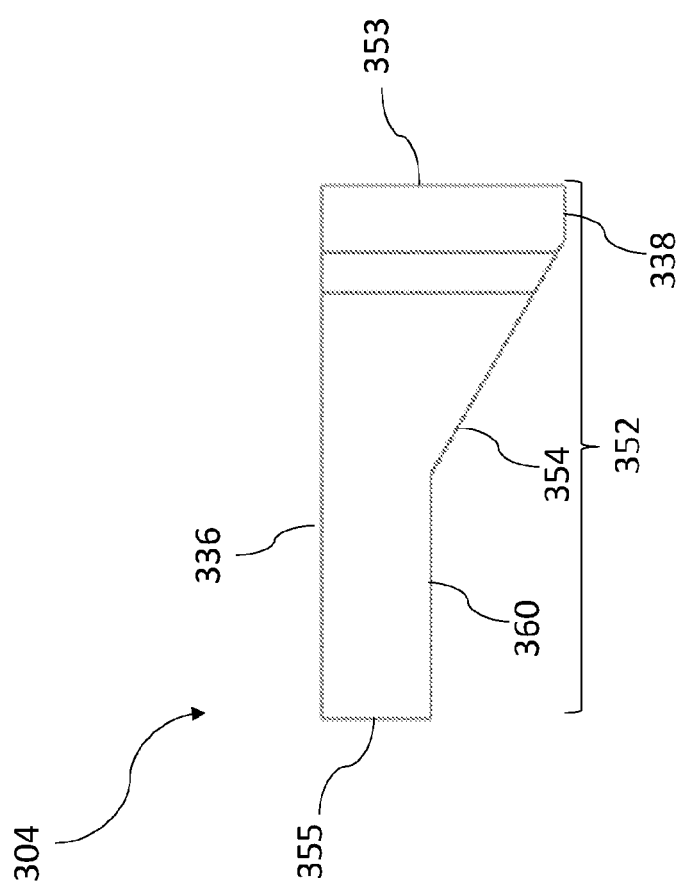
FIG. 24 is a top view of a port tube of the storage bag in accordance with some embodiments herein.

In some embodiments, as depicted in FIG. 24, the port tube 304 extends from a first end 336 to a second end 338. In some embodiments, the port tube 304 defines an inner surface, which faces an inside of the port tube 304, and an outer surface, which faces the exterior of the storage bag 300.

Figure 25:
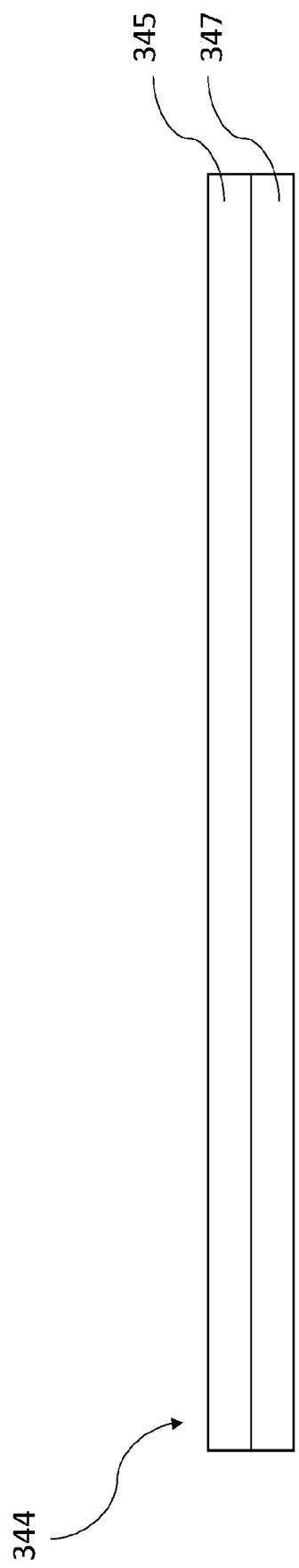
FIG. 25 is a cross-sectional view of a composite sheet of the port tube in accordance with some embodiments herein.

In some embodiments, the port tube 304 is formed from a composite sheet 344 including a first polymer 345 and a second polymer 347, as depicted in FIG. 25. However, in some embodiments, the first polymer 345 is a lower melting polymer and the second polymer 347 is a higher melting polymer. In some embodiments, the first polymer 345 and the second polymer 347 of the port tube 304 are formed from any of the materials listed above with regard to the main tube 102.

In some embodiments, a portion of the second end 338 of the port tube 304 is cut to form an angled interface 352 configured for engagement with the angled interface 326 of the body 302. As depicted in FIG. 24, in some embodiments, the port tube 304 includes an angled edge 354 extending from the second end 338 toward a horizontal edge 360. As shown in FIG. 24, the second end 338 extends between a first lateral side 353 and the angled edge 354. The horizontal edge 360 extends from, and connects, the angled edge 354 to a second lateral side 355. The second end, 338, the angled edge 354 and the horizontal edge 360, in combination, make up the angled interface 352 that engages with the body 302.

Figure 26:
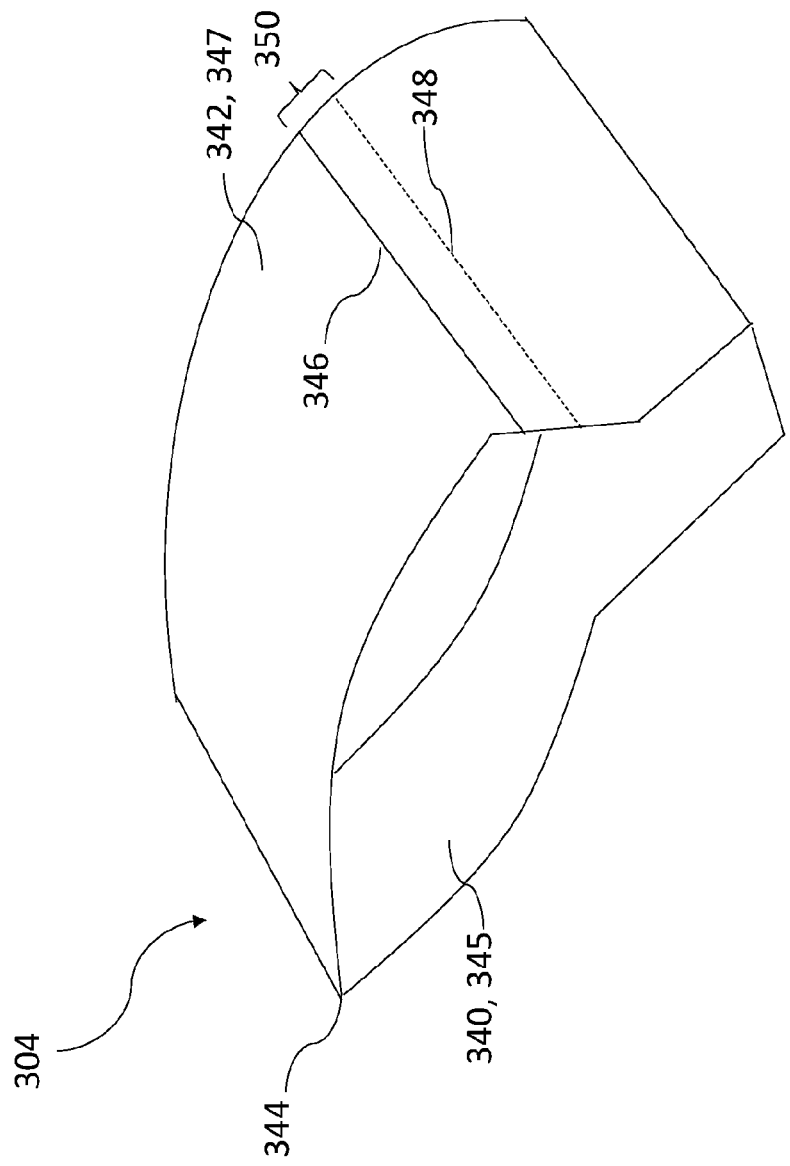
FIG. 26 is a perspective view of the port tube of the storage bag in accordance with some embodiments herein.

In some embodiments, as depicted in FIG. 26, the port tube 304 is formed by creating a tube from the composite sheet 344 such that an inner surface 340 is the first polymer 345 of the composite sheet 344 and an outer surface 342 is the second polymer 347 of the composite sheet 344. Thus, when the port tube 304 is formed, the outer surface 342 of the port tube 304 is the higher melting polymer and the inner surface 340 is the lower melting polymer. In some embodiments, the port tube 304 is formed by overlapping a first lateral edge 346 of the composite sheet 344 over a second lateral edge 348 of the composite sheet 344 such that the inner surface 340 overlaps a portion of the outer surface 342 to form a port tube lap seam 350, as depicted in FIG. 26. The lower melting polymer of the inner surface 340 and the higher melting polymer of the outer surface 342 are then heat sealed together such that the lower melting polymer bonds with the higher melting polymer, creating the port tube lap seam 350.

Figure 27:
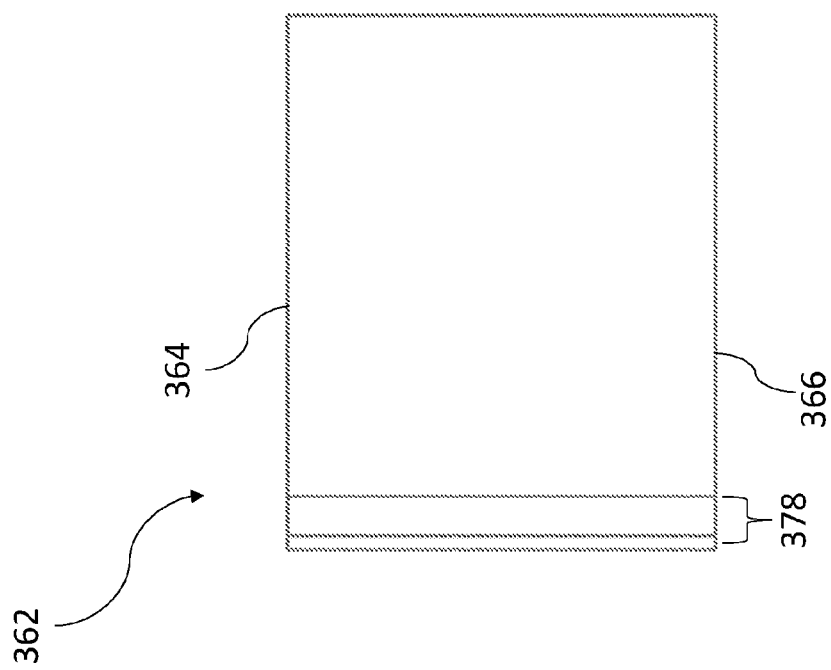
FIG. 27 is a top view of an end tube of the storage bag in accordance with some embodiments herein.
Figure 28:
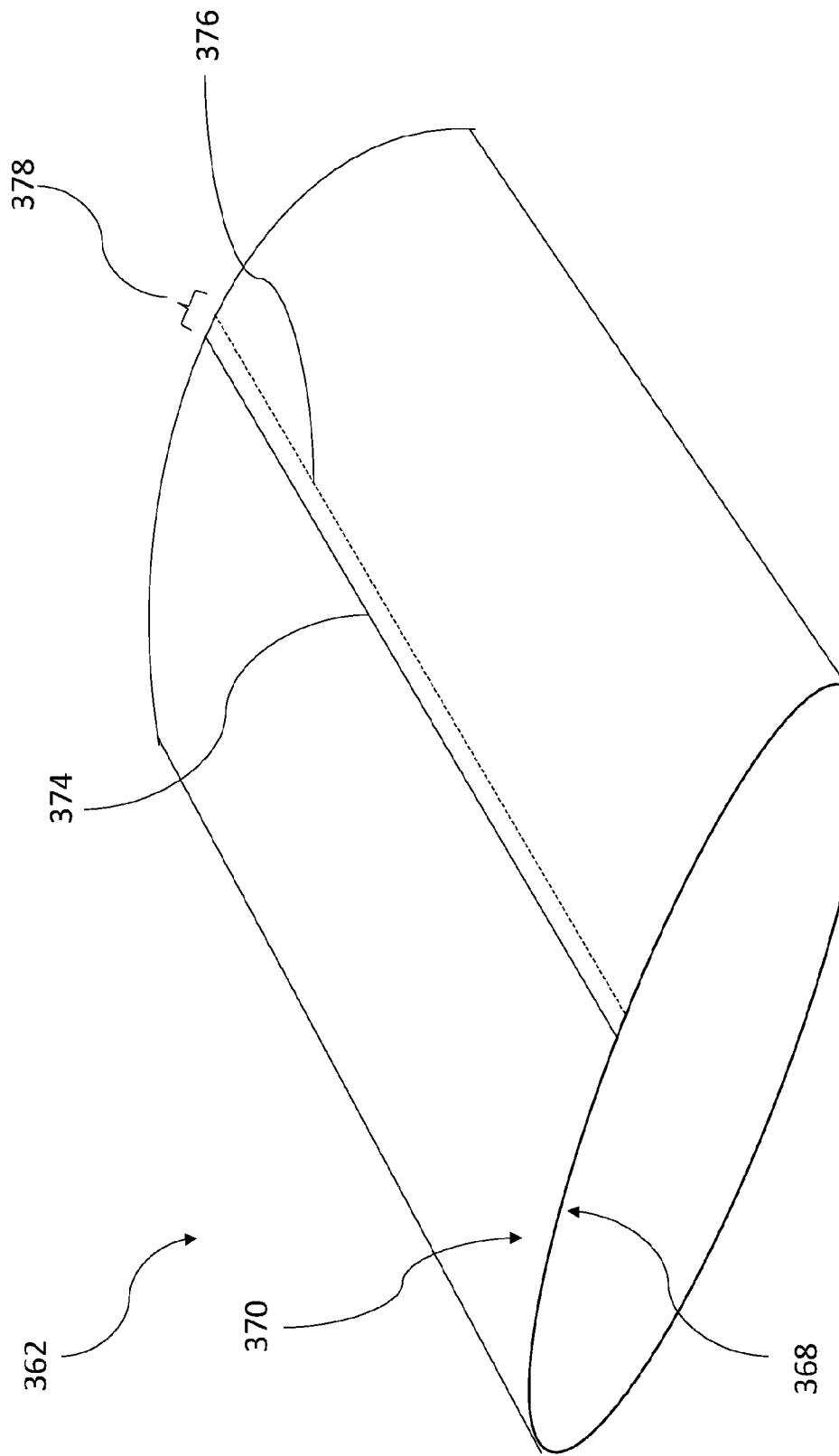
FIG. 28 is a perspective view of the end tube of the storage bag in accordance with some embodiments herein.

In some embodiments, the storage bag 300 also includes an end tube 362, depicted in FIGS. 20 and 27-28, that is positioned over the second end 312 of the body 302 to seal the storage bag 300. In some embodiments, the end tube 362 extends from a first end 364 to a second end 366. In some embodiments, the end tube 362 defines an inner surface 368, which faces an inside of the end tube 362, and an outer surface 370, which faces the exterior of the storage bag 300, as depicted in FIG. 28.

Figure 29:
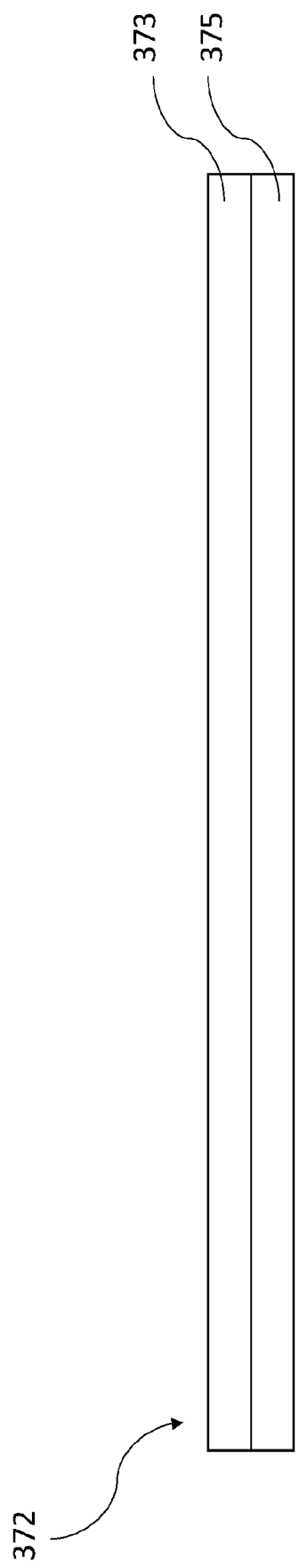
FIG. 29 is a cross-sectional view of a composite sheet of the end tube in accordance with some embodiments herein.

In some embodiments, the end tube 362 is formed in substantially the same manner as the port tube 304. Specifically, in some embodiments, the end tube 362 is formed from a composite sheet 372 including a first polymer 373 and a second polymer 375, as depicted in FIG. 29. In some embodiments, the first polymer 373 is a lower melting polymer and the second polymer 375 is a higher melting polymer. In some embodiments, the first polymer 373 and the second polymer 375 of the end tube 362 are formed from any of the materials listed above with regard to the main tube 102.

In some embodiments, the end tube 362 is formed by creating a tube from the composite sheet 372 such that the inner surface 368 is the first polymer 373 of the composite sheet 372 and the outer surface 370 is the second polymer 375 of the composite sheet 372. Thus, when the end tube 362 is formed, the outer surface 370 of the end tube 362 is the higher melting polymer and the inner surface 368 is the lower melting polymer. In some embodiments, the end tube 362 is formed by overlapping a first lateral edge 374 of the composite sheet 372 over a second lateral edge 376 of the composite sheet 372 such that the inner surface 368 overlaps a portion of the outer surface 370, as depicted in FIG. 28. The lower melting polymer of the inner surface 368 and the higher melting polymer of the outer surface 370 are then heat sealed together such that the lower melting polymer bonds with the higher melting polymer, creating an end tube lap seam 378.

The storage bag 300 is formed by inserting the angled interface 326 of the body 302 into the angled interface 352 of the port tube 304 such that the angled edge 354 of the port tube 304 overlaps the angled edge 328 of the body 302, as depicted in FIG. 30. In this configuration, the lower melting polymer of the inner surface 340 of the port tube 304 is adjacent to the lower melting polymer of the outer surface 316 of the body 302. The port tube 304 and the body 302 are heat sealed together such that the lower melting polymer of the body 302 bonds with the lower melting polymer of the port tube 304, creating a lap seam 380.

In some embodiments, an angled drainage area 382 is then formed by sealing at least a portion 384 of the port tube 304 not overlapping the body 302 to itself. A port insertion area 386 of the port tube 304 is left unsealed and open to the compartment 306 so that the port 308 can be inserted therein. In some embodiments, the sealable port 308 includes an insertion portion 398 formed of a lower melting polymer. In some embodiments, the insertion portion 398 is positioned within the port insertion area 386, so as to abut the cutout 311 in the first end 310 of the body 302, as depicted in FIG. 20. In some embodiments, the first polymer 315 (e.g., a lower melting polymer) is sealed (e.g., through heat sealing) to the lower melting polymer of the insertion portion 398 of sealable port 308 to seal the port tube 304, thereby sealing an entire perimeter of the storage bag 300.

The angled drainage area 382 enhances drainage from the compartment 306 to and through the port 308. In some embodiments, the angled drainage area 382 provides the same benefits and functionality as the angled drainage area 182.

To seal the second end 312 of the body 302, the second end 312 of the body 302 is partially inserted into the first end 364 of the end tube 362 such that the lower melting polymer of the inner surface 368 of the end tube 362 is adjacent to the lower melting polymer of the outer surface 316 of the body 302. The body 302 and the end tube 362 are heat sealed together such that the lower melting polymer of the body 302 bonds with the lower melting polymer of the end tube 362, creating a lap seam 388. In some embodiments, the storage bag 300 is then sealed by sealing the portion 390 of the end tube 362 that does not overlap the body 302 to itself.

In some embodiments, the end tube 362 is selectively sealed to itself to form various compartments therein. Thus, the size and shape of the end tube 362 may be predetermined to accommodate the various compartments to be formed therein. For example, in one embodiment, depicted in FIG. 20, the end tube 362 is sized and shaped for formation of a label compartment 392. In this embodiment, the end tube 362 is selectively sealed to itself around the desired label area, leaving the second end 366 open so that a label may be slid into the label compartment 392. In other embodiments, the end tube 362 is formed with two or more label compartments for insertion of multiple labels.

FIG. 31 depicts a storage bag 400, according to some embodiments of the present disclosure. In some embodiments, the storage bag 400 is a cryopreservation bag. The storage bag 400 includes a main tube 402 defining a compartment 406 therein, a port tube 404, and an end tube 462. In some embodiments, the port tube 404 is configured to receive at least one sealable port 408 such that the port 408 is in fluid communication with the compartment 406 of the main tube 402.

In some embodiments, the main tube 402 extends from a first end 410 to a second end 412, as depicted in FIG. 32. In some embodiments, the main tube 402 defines an inner surface 414, which faces the compartment 406, and an outer surface 416, which faces the exterior of the storage bag 400.

Figure 34:
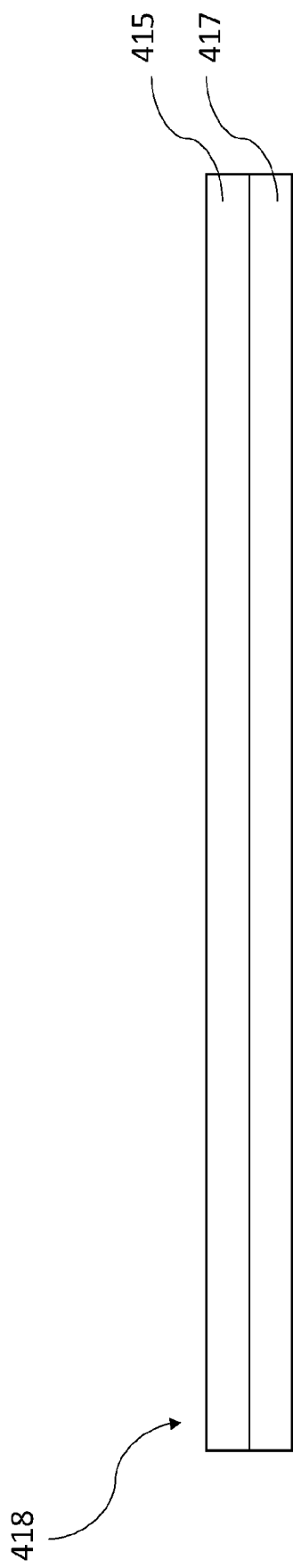
FIG. 34 is a cross-sectional view of a composite sheet of the main tube of the storage bag in accordance with some embodiments herein.

In some embodiments, the main tube 402 is formed from a composite sheet 418. In an embodiment, the composite sheet includes a first polymer 415 and a second polymer 417, as depicted in FIG. 34. In some embodiments, the first polymer 415 is a higher melting polymer and the second polymer 417 is a lower melting polymer, as per the definitions provided above. In some embodiments, the first polymer 415 and the second polymer 417 of the main tube 402 are formed from any of the materials listed above with regard to the main tube 102.

In some embodiments, the main tube 402 is formed by creating a tube from the composite sheet 418, as illustrated in FIG. 33, such that the inner surface 414 is the first polymer 415 of the composite sheet 418 and the outer surface 416 is the second polymer 417 of the composite sheet 418. Thus, when the main tube 402 is formed, the outer surface 416 of the main tube 402 is the lower melting polymer 417 and the inner surface 414 is the higher melting polymer 415. In some embodiments, the main tube 402 is formed by overlapping a first lateral edge 420 of the composite sheet 418 over a second lateral edge 422 of the composite sheet 418 such that the inner surface 414 overlaps a portion of the outer surface 416, as depicted in FIG. 33. The higher melting polymer of the inner surface 414 and the lower melting polymer of the outer surface 416 are then heat sealed together such that the lower melting polymer bonds with the higher melting polymer, creating a lap seam 424.

In some embodiments, a corner at the first end 410 of the main tube 402 is cut to form a main tube angled interface 426 configured for engagement with the port tube 404. For example, as depicted in FIG. 32, in some embodiments, the main tube 402 includes an angled edge 428 extending from a first lateral side 430 of the main tube 402 toward the first end 410. As shown in FIG. 32, the first end 410 extends between the first angled edge 428 and a second lateral side 432 of the main tube 402. The first angled edge 428 and the first end 410, in combination, make up the main tube angled interface 426 that engages with the port tube 404.

Figure 35:
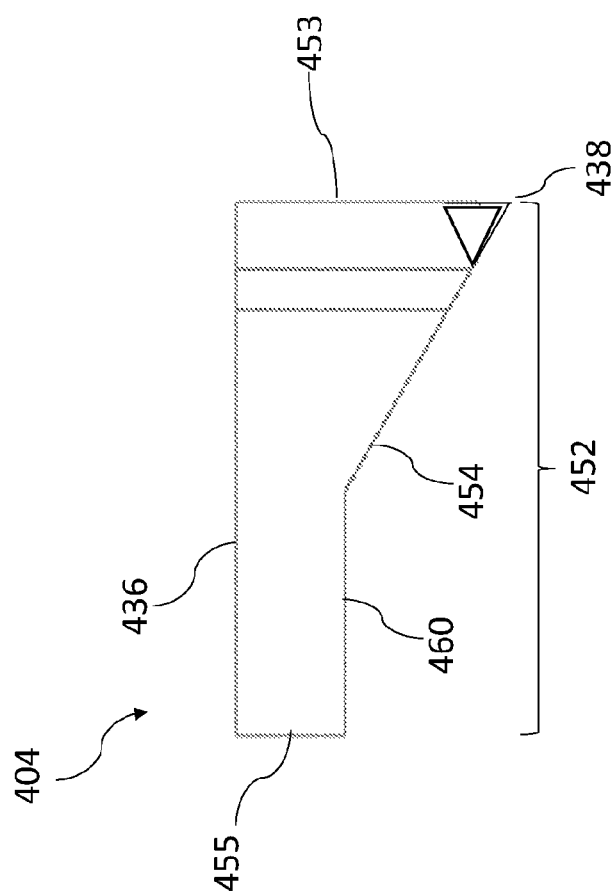
FIG. 35 is a top view of a port tube of the storage bag in accordance with some embodiments herein.

In some embodiments, as depicted in FIG. 35, the port tube 404 extends from a first end 436 to a second end 438. In some embodiments, the port tube 404 defines an inner surface 440, which faces an inside of the port tube 404, and an outer surface 442, which faces the exterior of the storage bag 400.

Figure 37:
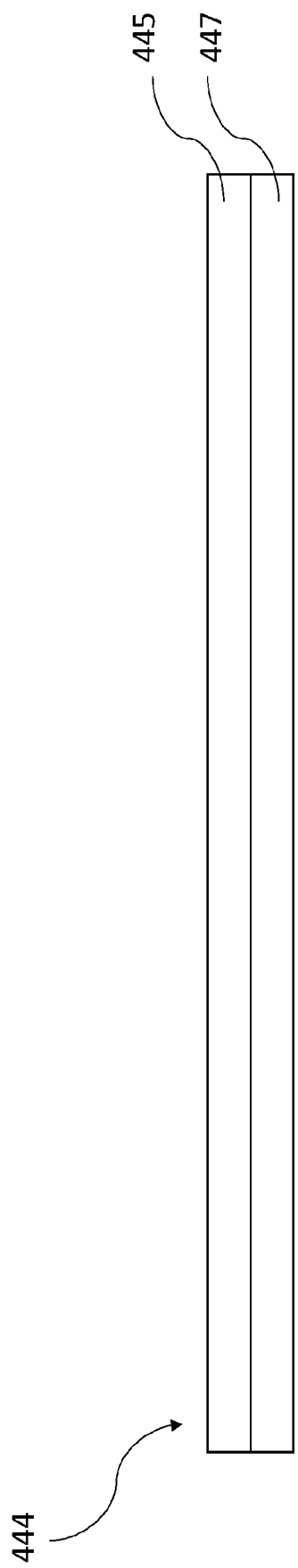
FIG. 37 is a cross-sectional view of the port tube of the storage bag in accordance with some embodiments herein.

In some embodiments, the port tube 404 is formed in substantially the same manner as the main tube 402. In some embodiments, the port tube 404 is formed from a composite sheet 444 including a first polymer 445 and a second polymer 447, as depicted in FIG. 37. However, in some embodiments, the first polymer 445 is a lower melting polymer and the second polymer 447 is a higher melting polymer. In some embodiments, the first polymer 445 and the second polymer 447 of the port tube 404 are formed from any of the materials listed above with regard to the main tube 102.

Figure 36:
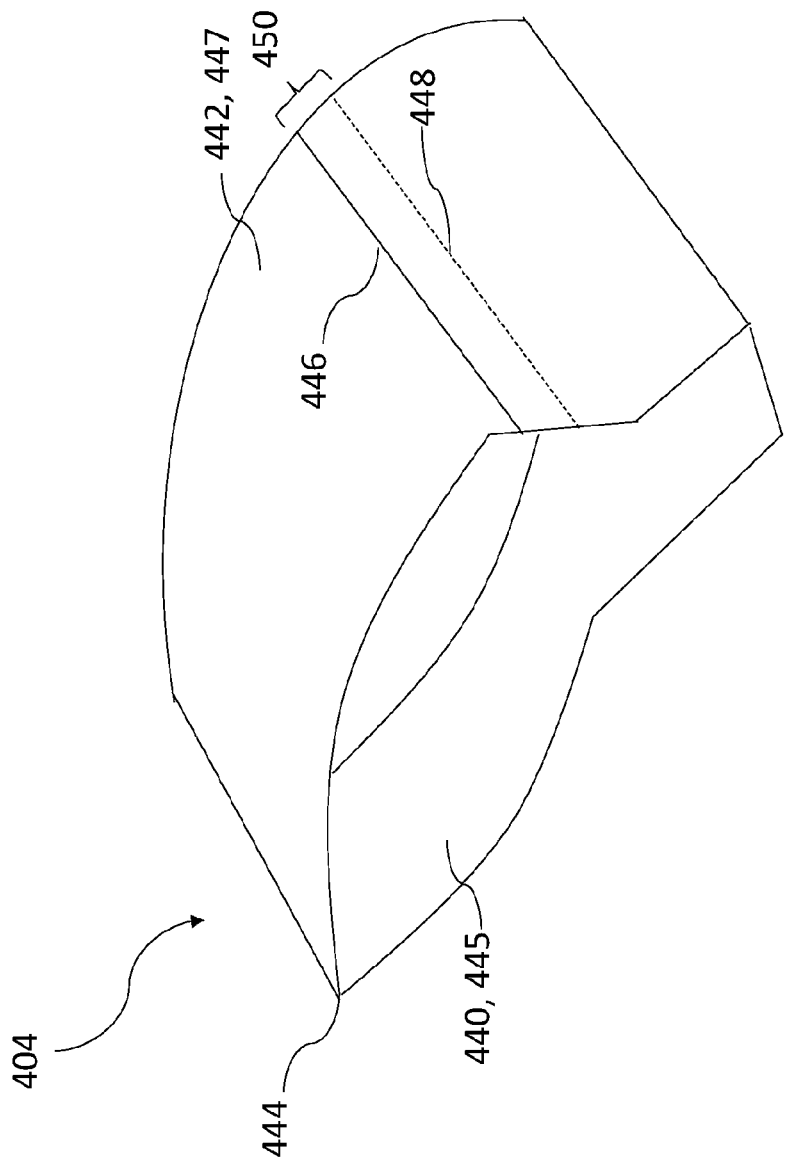
FIG. 36 is a perspective view of the port tube of the storage bag in accordance with some embodiments herein.

In some embodiments, as depicted in FIG. 36, the port tube 404 is formed by creating a tube from the composite sheet 444 such that the inner surface 440 is the first polymer 445 of the composite sheet 444 and the outer surface 442 is the second polymer 447 of the composite sheet 444. Thus, when the port tube 404 is formed, the outer surface 442 of the port tube 404 is the higher melting polymer and the inner surface 440 is the lower melting polymer. In some embodiments, the port tube 404 is formed by overlapping a first lateral edge 446 of the composite sheet 444 over a second lateral edge 448 of the composite sheet 444 such that the inner surface 440 overlaps a portion of the outer surface 442 to form a port tube lap seam 450, as depicted in FIG. 35. The lower melting polymer of the inner surface 440 and the higher melting polymer of the outer surface 442 are then heat sealed together such that the lower melting polymer bonds with the higher melting polymer, creating a port tube lap seam 450.

In some embodiments, a portion of the second end 438 of the port tube 404 is cut to form an angled interface 452 configured for engagement with the angled interface 426 of the main tube 402. As depicted in FIG. 35, in some embodiments, the port tube 404 includes an angled edge 454 extending from the second end 438 toward a horizontal edge 460. As shown in FIG. 35, the second end 438 is at the connection point between a first lateral side 453 and the angled edge 454. The horizontal edge 460 extends from, and connects, the first angled edge 454 to a second lateral side 455 of the port tube 404. The angled edge 454, the horizontal edge 460, and the second end 438, in combination, make up the angled interface 452 that engages with the main tube 402.

As depicted in FIG. 31, the angled interface 452 of the port tube 404 has a profile that is substantially the same as the angled interface 426 of the main tube 402 so that, when the angled interface 452 of the port tube 404 overlaps the angled interface 426 of the main tube 402, portions of the storage bag 400 that have two layers of composite sheets are reduced or minimized. Reducing or minimizing the overlap of the composite sheets 418, 444 of the respective tubes improves visualization and manipulation of the storage bag 400, as will be discussed in further detail below.

Figure 38:
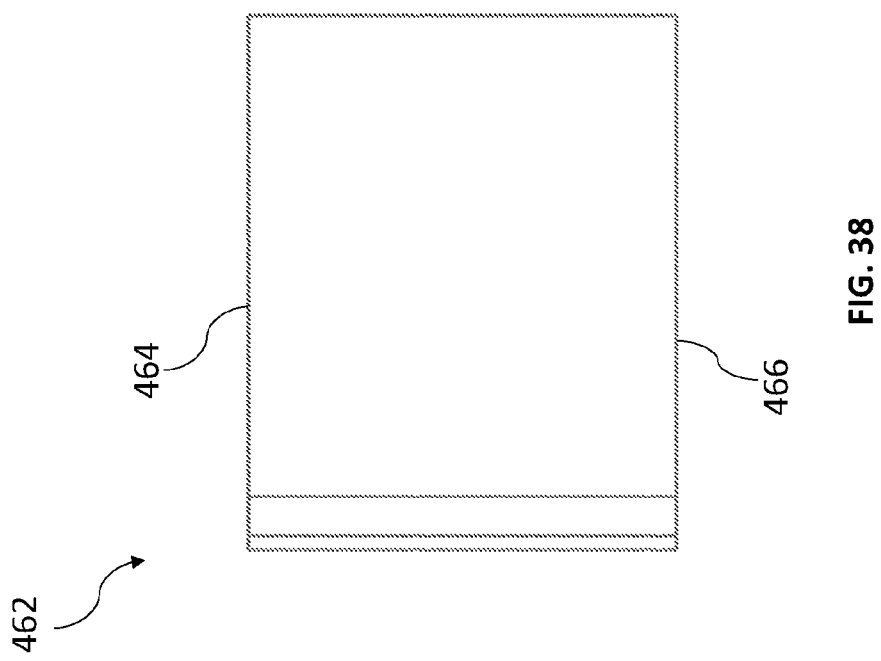
FIG. 38 is a top view of an end tube of the storage bag in accordance with some embodiments herein.
Figure 39:
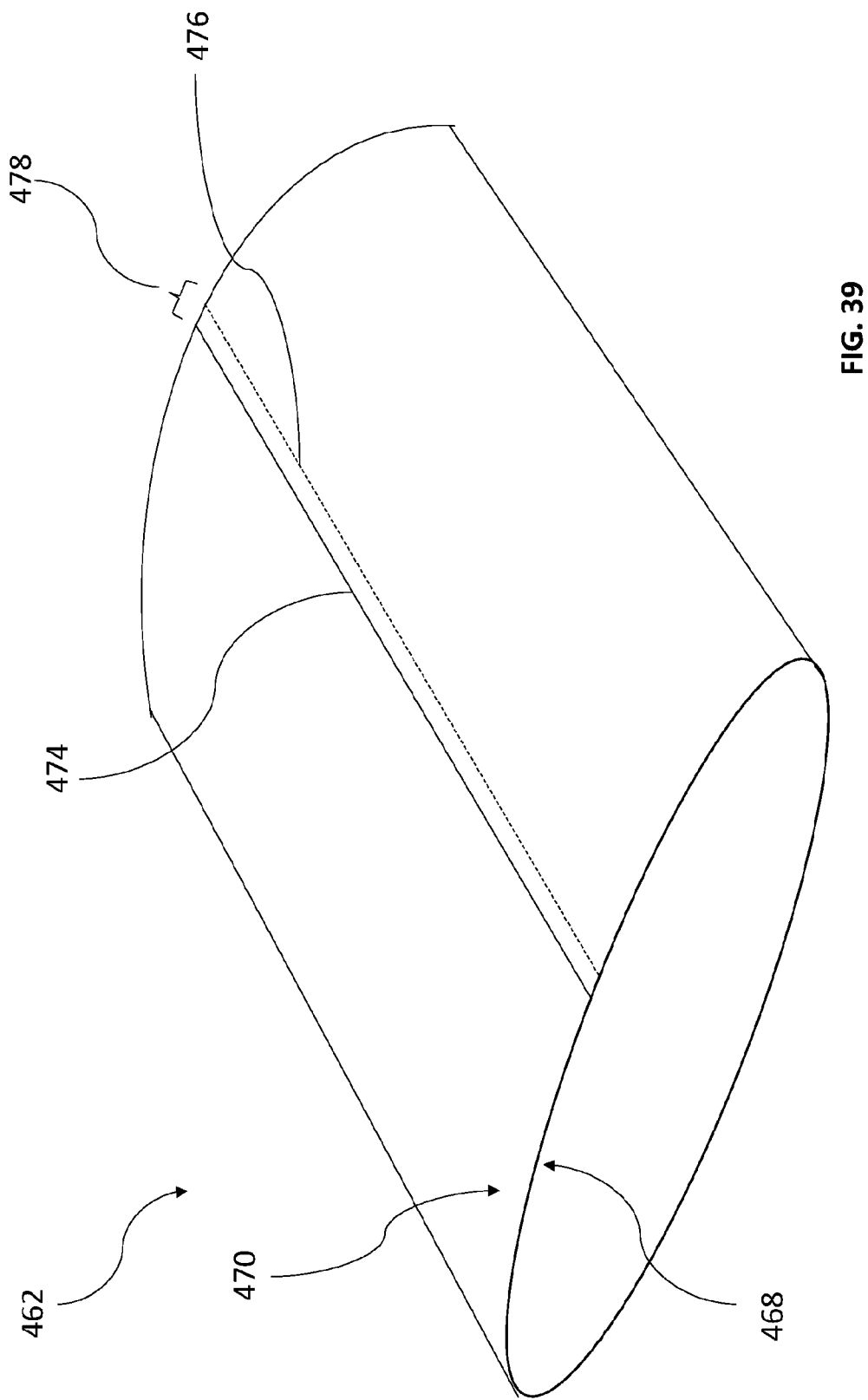
FIG. 39 is a perspective view of the end tube of the storage bag in accordance with some embodiments herein.

In some embodiments, the storage bag 400 also includes an end tube 462, depicted in FIG. 38, that is positioned over the second end 412 of the main tube 402 to seal the storage bag 400. In some embodiments, the end tube 462 extends from a first end 464 to a second end 466. In some embodiments, the end tube 462 defines an inner surface 468, which faces an inside of the end tube 462, and an outer surface 470, which faces the exterior of the storage bag 400, as depicted in FIG. 39.

Figure 40:
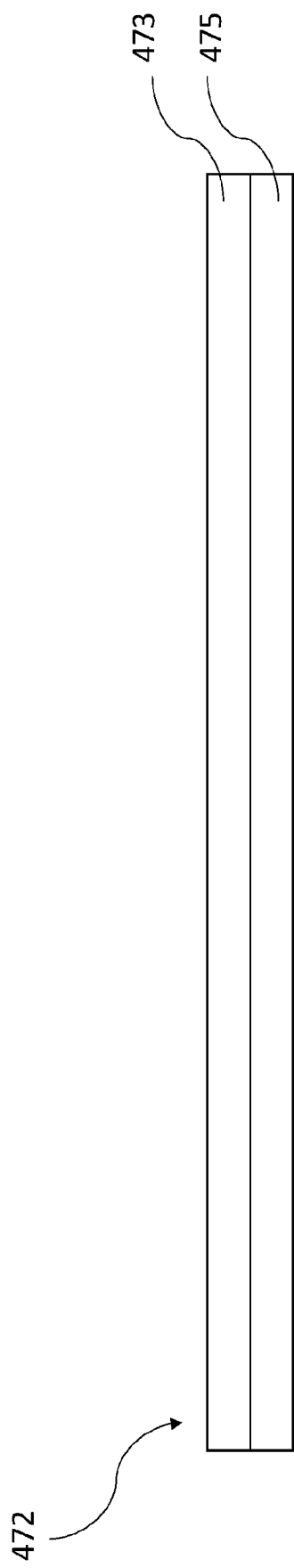
FIG. 40 is a cross-sectional view of a composite sheet of the end tube of the storage bag in accordance with some embodiments herein.

In some embodiments, the end tube 462 is formed in substantially the same manner as the end tube 362. Specifically, in some embodiments, the end tube 462 is formed from a composite sheet 472 including a first polymer 473 and a second polymer 475, as depicted in FIG. 40. In some embodiments, the first polymer 473 is a lower melting polymer and the second polymer 475 is a higher melting polymer. In some embodiments, the first polymer 473 and the second polymer 475 of the end tube 462 are formed from any of the materials listed above with regard to the main tube 102.

In some embodiments, the end tube 462 is formed by creating a tube from the composite sheet 472 such that the inner surface 468 is the first polymer 473 of the composite sheet 472 and the outer surface 470 is the second polymer 475 of the composite sheet 472. Thus, when the end tube 462 is formed, the outer surface 470 of the end tube 462 is the higher melting polymer and the inner surface 468 is the lower melting polymer. In some embodiments, the end tube 462 is formed by overlapping a first lateral edge 474 of the composite sheet 472 over a second lateral edge 476 of the composite sheet 472 such that the inner surface 468 overlaps a portion of the outer surface 470, as depicted in FIG. 39. The lower melting polymer of the inner surface 468 and the higher melting polymer of the outer surface 470 are then heat sealed together such that the lower melting polymer bonds with the higher melting polymer, creating an end tube lap seam 478.

The storage bag 400 is formed by inserting the angled interface 426 of the main tube 402 into the angled interface 452 of the port tube 404 such that the angled edge 454 of the port tube 404 overlaps the angled edge 428 of the main tube 402, as depicted in FIG. 31. In this configuration, the lower melting polymer of the inner surface 440 of the port tube 404 is adjacent to the lower melting polymer of the outer surface 416 of the main tube 402. The port tube 404 and the main tube 402 are heat sealed together such that the lower melting polymer of the main tube 402 bonds with the lower melting polymer of the port tube 404, creating a lap seam 480.

In some embodiments, an angled drainage area 482 is then formed by sealing at least a portion 484 of the port tube 404 not overlapping the main tube 402 to itself. A port insertion area 486 of the port tube 404 is left unsealed and open to the compartment 406 so that the port 408 can be inserted therein.

In some embodiments, the sealable port 408 includes an insertion portion 498 formed of a lower melting polymer. In some embodiments, the first polymer 445 (e.g., a lower melting polymer) is sealed (e.g., through heat sealing) to the lower melting polymer of the insertion portion 498 of sealable port 408 to seal the port tube 404, thereby sealing an entire perimeter of the storage bag 400.

The angled drainage area 482 enhances drainage from the compartment 406 to and through the port 408. In some embodiments, the angled drainage area 482 provides the same benefits and functionality as the angled drainage area 182.

To seal the second end 412 of the main tube 402, the second end 412 of the main tube 402 is partially inserted into the first end 464 of the end tube 462 such that the lower melting polymer of the inner surface 468 of the end tube 462 is adjacent to the lower melting polymer of the outer surface 416 of the main tube 402. The main tube 402 and the end tube 462 are heat sealed together such that the lower melting polymer of the main tube 402 bonds with the lower melting polymer of the end tube 462, creating a lap seam 488. In some embodiments, the storage bag 400 is then sealed by sealing a portion of the end tube 462 that does not overlap the main tube 402 to itself.

In some embodiments, the end tube 462 is selectively sealed to itself to form various compartments therein. Thus, the size and shape of the end tube 462 may be predetermined to accommodate the various compartments to be formed therein. For example, in one embodiment, depicted in FIG. 31, the end tube 462 is sized and shaped for formation of a label compartment 492. In this embodiment, the end tube 462 is selectively sealed to itself around the desired label area, leaving the second end 466 open so that a label may be slid into the label compartment 492. In other embodiments, the end tube 462 is formed with two or more label compartments for insertion of multiple labels.

Figure 41:
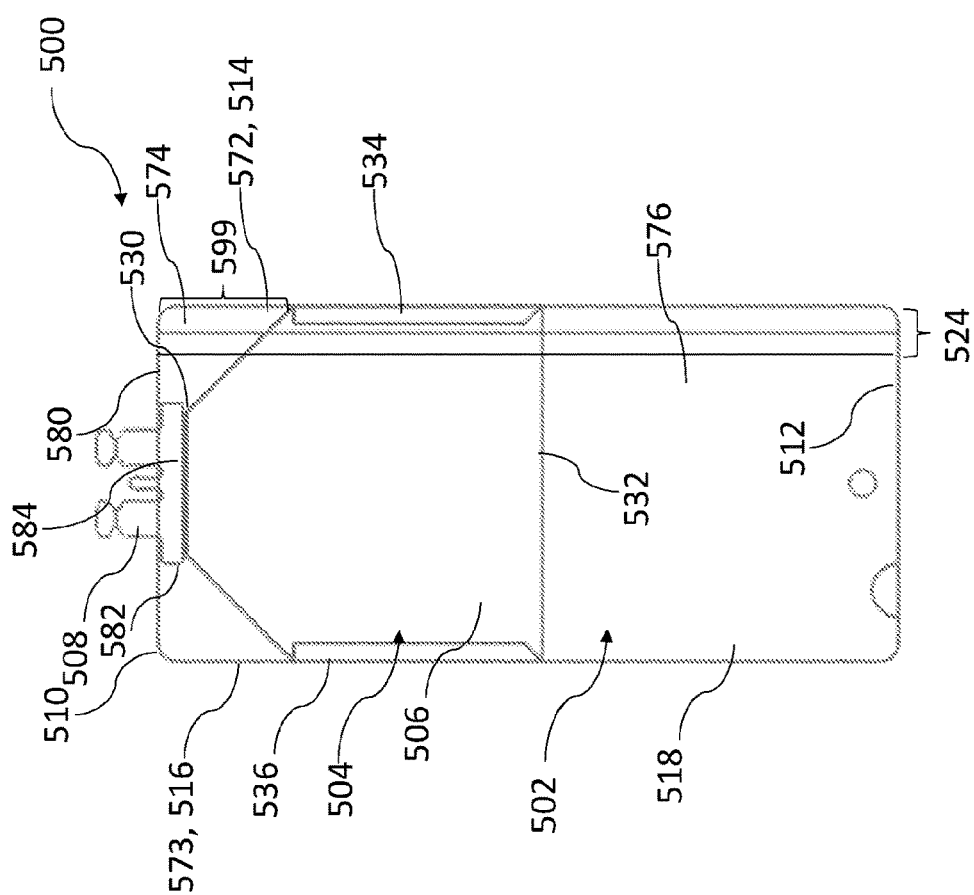
FIG. 41 is a top view of a storage bag in accordance with some embodiments herein.

FIG. 41 depicts a storage bag 500, according to some embodiments of the present disclosure. In some embodiments, the storage bag 500 is a cryopreservation bag. The storage bag 500 includes a main tube 502 and an insert 504 defining a compartment 506 therein. In some embodiments, the main tube 502 is configured to receive at least one sealable port 508 such that the port 508 is in fluid communication with the compartment 506 of the insert 504.

Figure 43:
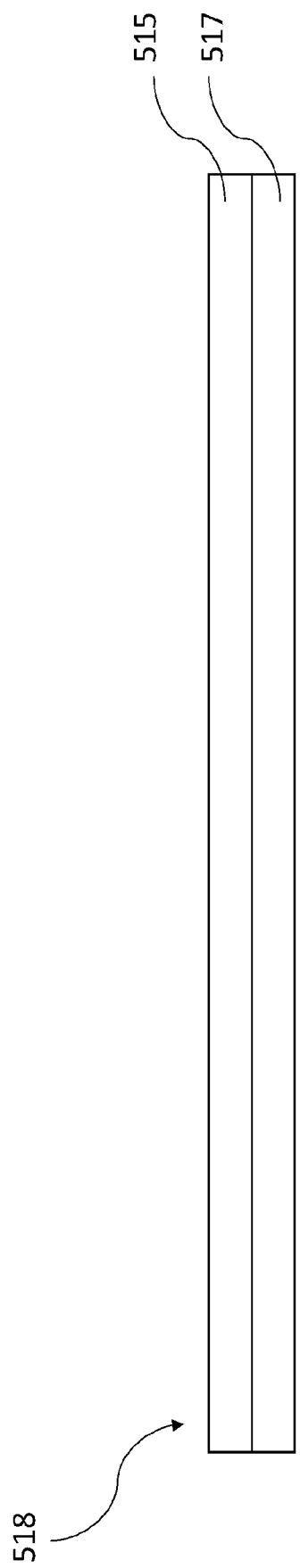
FIG. 43 is a cross-sectional view of the composite sheet of main tube of the storage bag in accordance with some embodiments herein.

In some embodiments, the main tube 502 is formed from a composite sheet 518. In an embodiment, the composite sheet includes a first polymer 515 and a second polymer 517, as depicted in FIG. 43. In some embodiments, the first polymer 515 is a lower melting polymer and the second polymer 517 is a higher melting polymer, as per the definitions provided above. In some embodiments, the first polymer 515 and the second polymer 517 of the main tube 502 are formed from any of the materials listed above with regard to the main tube 102.

Figure 42:
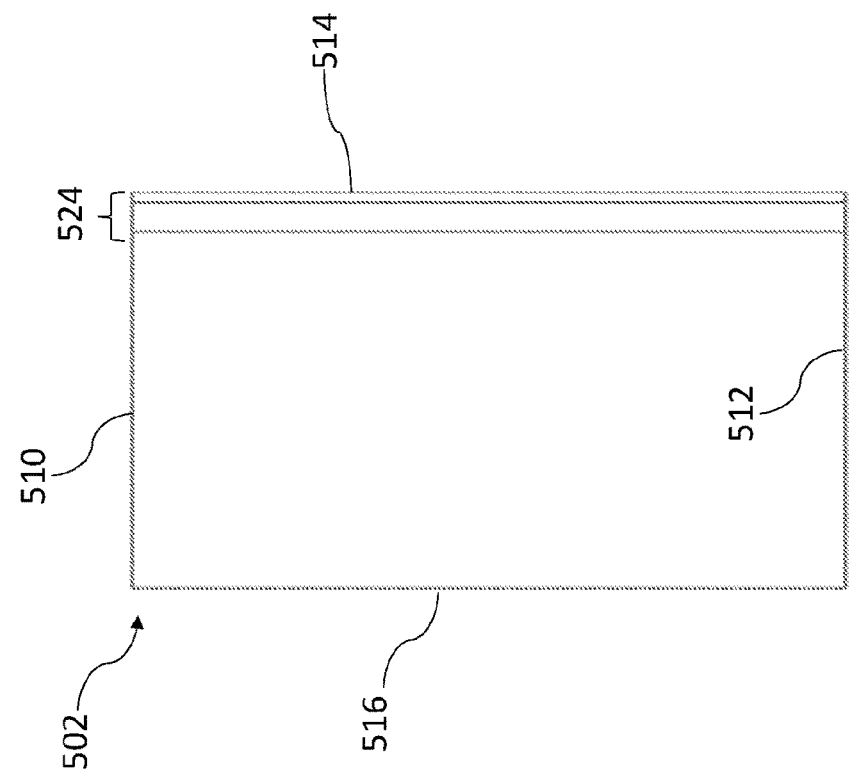
FIG. 42 is a top view of a main tube of the storage bag in accordance with some embodiments herein.

In some embodiments, as depicted in FIG. 42, the main tube 502 extends from a first end 510 to a second end 512 and from a first side 514 to a second side 516.

Figure 44:
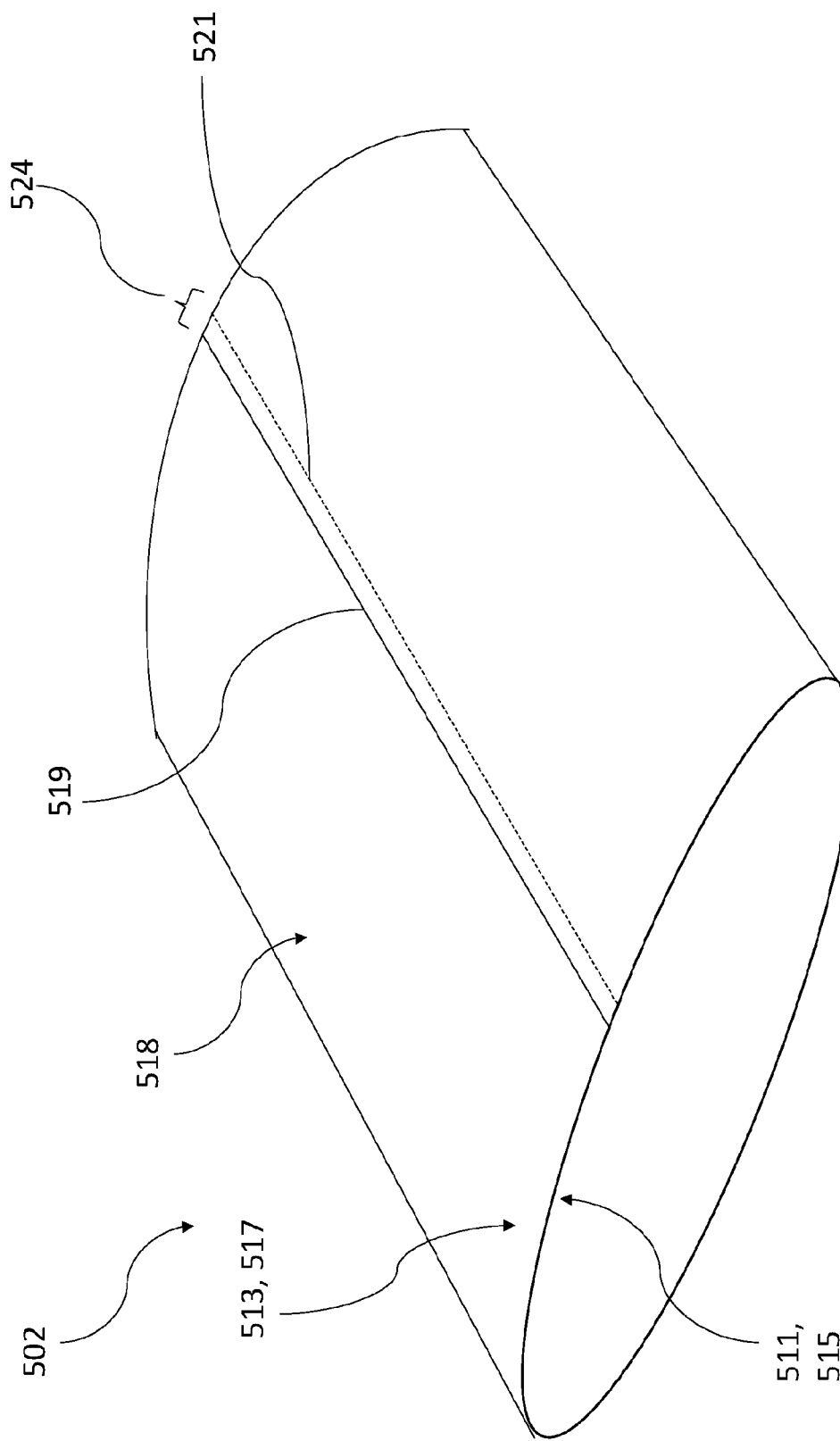
FIG. 44 is a top view of an unfolded composite sheet of the main tube of the storage bag in accordance with some embodiments herein.

In some embodiments, the main tube 502 is formed by creating a tube from the composite sheet 518, as illustrated in FIG. 44. Thus, when the main tube 502 is formed, the outer surface 513 of the main tube 502 is the higher melting polymer 517 and the inner surface 511 is the lower melting polymer 515. In some embodiments, the main tube 502 is formed by overlapping a first lateral edge 519 of the composite sheet 518 over a second lateral edge 521 of the composite sheet 518 such that the inner surface 511 overlaps a portion of the outer surface 513, as depicted in FIG. 44. The lower melting polymer of the inner surface 511 and the higher melting polymer of the outer surface 513 are then heat sealed together such that the lower melting polymer bonds with the higher melting polymer, creating a lap seam 524.

Figure 45:
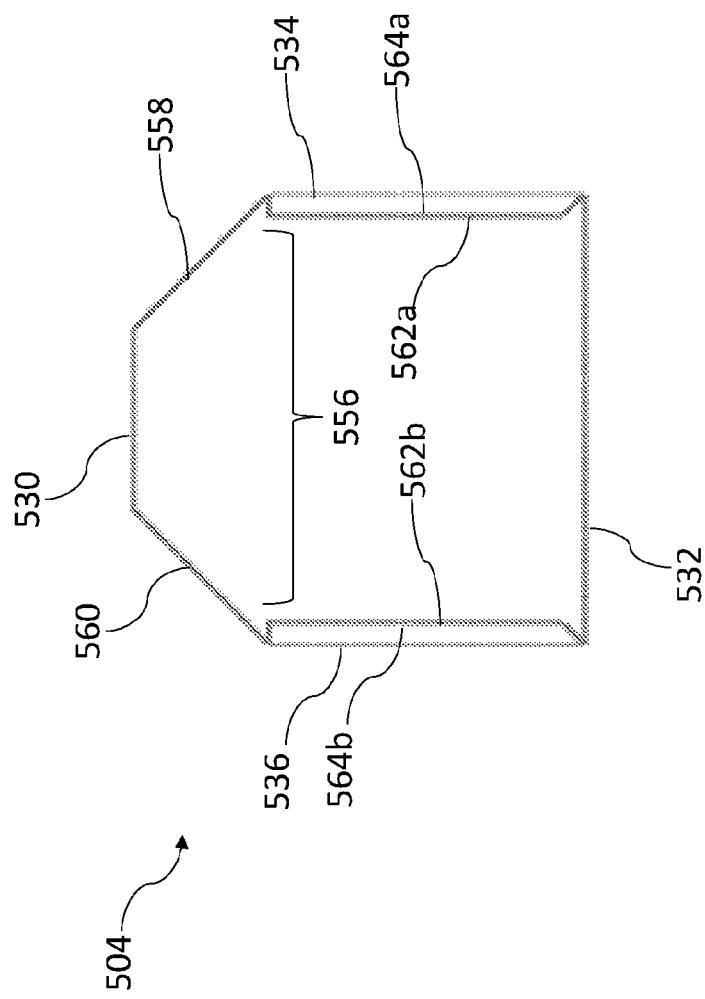
FIG. 45 is a top view of an insert of the storage bag in accordance with some embodiments herein.
Figure 46:
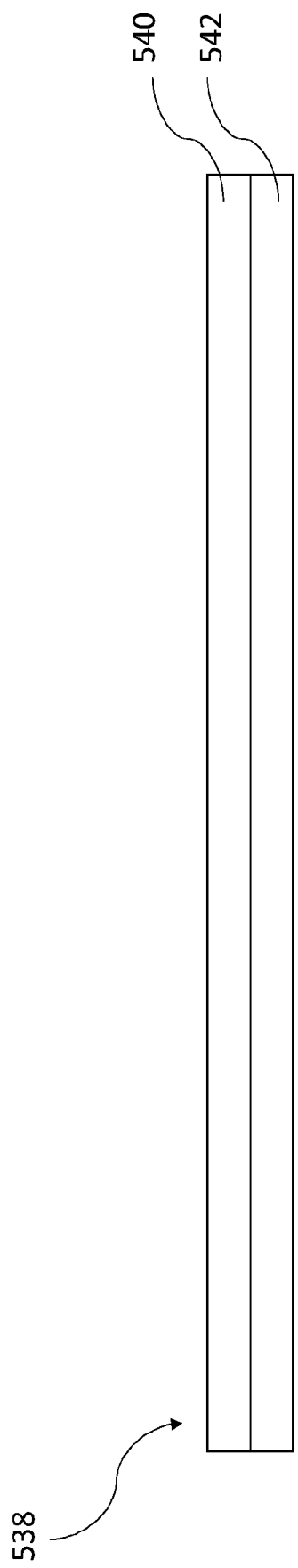
FIG. 46 is a cross-sectional view of a composite sheet of the insert of the storage bag in accordance with some embodiments herein.

In some embodiments, the insert 504 extends from a first end 530 to a second end 532 and from a first lateral side 534 to a second lateral side 536, as depicted in FIG. 45. In some embodiments, the insert 504 is formed from a composite sheet 538. In an embodiment, the composite sheet 538 includes a first polymer 540 and a second polymer 542, as depicted in FIG. 46. In some embodiments, the first polymer 540 is a higher melting polymer and the second polymer 542 is a lower melting polymer, as per the definitions provided above. In some embodiments, the first polymer 540 and the second polymer 542 of the insert 504 are formed from any of the materials listed above with regard to the main tube 102.

Figure 47:
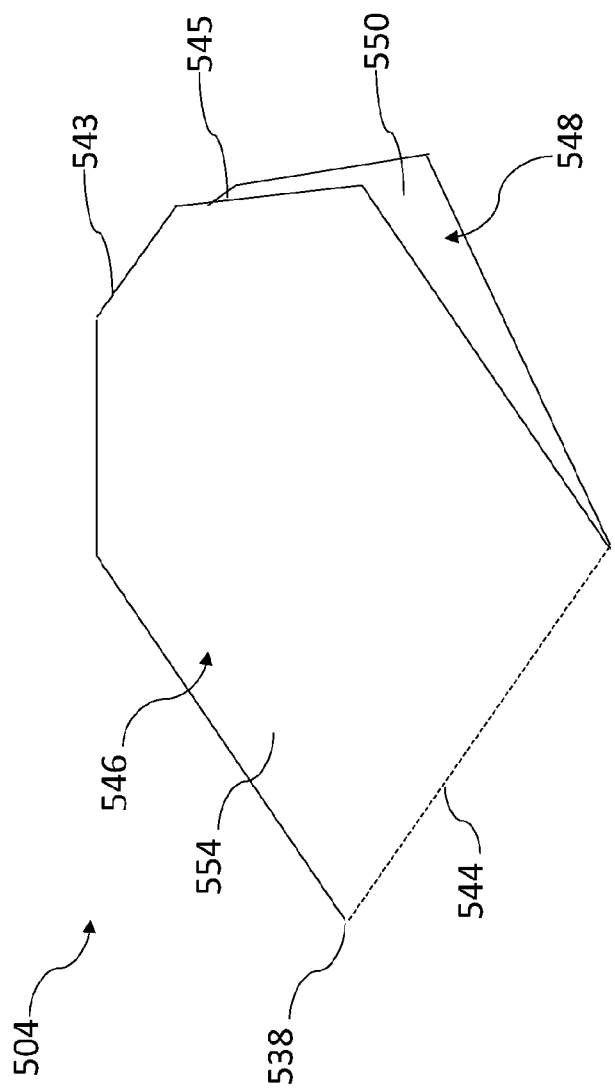
FIG. 47 is a perspective view of the insert of the storage bag in accordance with some embodiments herein.

In some embodiments, the insert 504 is formed by folding the composite sheet 538 along a fold line 544 such that a first end 543 and a second end 545 thereof are aligned, to define a first portion 546 and a second portion 548, as depicted in FIG. 47. In some embodiments, the insert 504 defines an inner surface 550, which faces the compartment 506 of the insert 504, and an outer surface 554, which faces an exterior of the insert 504. In some embodiments, the insert 504 is folded such that the inner surface 550 is the first polymer 540 of the composite sheet 538 and the outer surface 554 is the second polymer 542 of the composite sheet 538.

In some embodiments, the corners at the first end 530 of the insert 504 are cut to form an angled interface 556. For example, as depicted in FIG. 45, the insert 504 includes a first angled edge 558 extending from the first lateral side 534 of the insert 504 toward the first end 530. In some embodiments, the insert 504 also includes a second angled edge 560 extending from the second lateral side 536 of the insert 504 toward the first end 530. As shown in FIG. 45, the first end 530 extends between the first angled edge 558 and the second angled edge 560. The first angled edge 558, the second angled edge 560 and the first end 530, in combination, make up the angled interface 556 of the insert 504.

In some embodiments, when the composite sheet 538 is folded to form the insert 504, the first portion 546 includes a first lateral edge 562a and a second lateral edge 562b. In some embodiments, the second portion 548 also includes a first lateral edge 564a and a second lateral edge 564b. In some embodiments, each of the first lateral edge 564a and second lateral edge 564b of the second portion 548 extends past the associated one of first lateral edge 562a and second lateral edge 562b of the first portion 546. In some embodiments, the insert 504 is formed by first folding the first lateral edge 564a and the second lateral edge 564b of the second portion 548 toward the respective one of the first lateral edge 562a, second lateral edge 562b of the first portion 546 such that the lateral edges 562a,b of the first portion 546 and the lateral edges 564a,b of the second portion 548 abut, but do not overlap, one another. In some embodiments, as a result of such folding, the first polymer 540 contacts itself on the inside of the folded composite sheet 538, and the second polymer 542 faces outward. FIG. 45 shows the composite sheet 538 as folded, forming the insert 504.

In some embodiments, as shown in FIG. 41, a storage bag 500 is formed from the folded composite sheet 538, forming the insert 504, as shown in FIG. 45 and the folded composite sheet 518, forming the main tube 502, as shown in FIG. 42. In some embodiments, the storage bag 500 is formed by positioning the insert 504 within the main tube 502. In some embodiments, a first side 572 of the bag 500 is defined by the main tube 502 enclosing the first lateral side 534 of the insert 504. In some embodiments, a second side 573 of the bag 500 is defined by the main tube 502 enclosing the second lateral side 536 of the insert 504. In some embodiments, the main tube 502 is sized and shaped such that, when positioned over the insert 504 as shown in FIG. 41, the first end 510 of the main tube 502 extends past the first end 530 of the insert 504 to define a first extension portion 574. In some embodiments, the main tube 502 is sized and shaped such that, when positioned over the insert 504 as shown in FIG. 41, the second end 512 of the main tube 502 extends past the second end 532 of the insert 504 to define a second extension portion 576.

In some embodiments, the inner facing surfaces (e.g., formed by the first polymer 515 that is a lower melting polymer) of the portion of the main tube 502 located in the second extension portion 576 are sealed to one another and the second end 532 (e.g., through heat sealing) to thereby produce a fin seam that forms a bottom end of the bag that is enclosed and sealed. In some embodiments, the inner facing surfaces (e.g., formed by the first polymer 515 that is a lower melting polymer) of a portion of the main tube 502 extending between the first lateral side 514 and the second lateral side 516 are sealed to the outer facing surfaces (e.g., formed by the second polymer 542 that is a lower melting polymer) of the insert 504 extending between first lateral side 534 of the insert 504 and the second lateral side 536 of the insert 504 (e.g., through heat sealing) to thereby cause the first side 572 and the second side 573 of the bag to be enclosed and sealed.

In some embodiments, portions of the inner facing surfaces of the main tube 502 (e.g., formed by the first polymer 515 that is a lower melting polymer) located in the first extension portion 574 are sealed to one another (e.g., through heat sealing) to produce a fin seam that seals a portion 580 of the first extension portion 574 around the angled interface 556 to form an angled drainage area 599. In some embodiments, portions of the inner facing surfaces of the main tube 502 (e.g., formed by the first polymer 515 that is a lower melting polymer) located in the first extension portion 574 are not sealed to one another to form an unsealed portion 582 of the first extension portion 574574.

In some embodiments, the sealable port 508 is inserted the first extension portion 574, as depicted in FIG. 41. In some embodiments, the sealable port 508 includes an insertion portion 584 formed of a lower melting polymer. In some embodiments, the first polymer 515 (e.g., a lower melting polymer) at the inner surface of the unsealed portion 582 is sealed (e.g., through heat sealing) to the lower melting polymer of the insertion portion 584 of sealable port 508 to seal the unsealed portion 582, thereby sealing an entire perimeter of the storage bag 500.

In some embodiments, the storage bag 500 enables the use of composite sheets for the main tube 502 and the insert 504 that are thin and thus, too weak to be used in a single layer, because of the overlapping of the main tube 502 and the insert 504. These thin composite films allow for increased flexibility and clarity (for viewing of contents) of the storage bag 500.

FIG. 48 depicts a storage bag 600, according to some embodiments of the present disclosure. In some embodiments, the storage bag 600 is a cryopreservation bag. The storage bag 600 includes a main tube 602 and an insert 604 defining a compartment 606 therein. In some embodiments, the main tube 602 is configured to receive at least one sealable port 608 such that the port 608 is in fluid communication with the compartment 606 of the insert 604.

Figure 50:
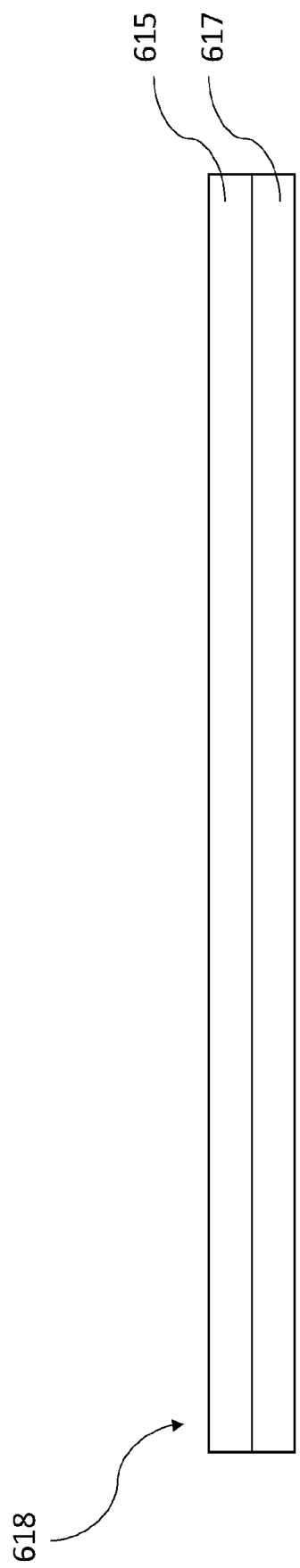
FIG. 50 is a cross-sectional view of a composite sheet of the main tube of the storage bag in accordance with some embodiments herein.

In some embodiments, the main tube 602 is formed from a composite sheet 618. In an embodiment, the composite sheet includes a first polymer 615 and a second polymer 617, as depicted in FIG. 50. In some embodiments, the first polymer 615 is a lower melting polymer and the second polymer 617 is a higher melting polymer, as per the definitions provided above. In some embodiments, the first polymer 615 and the second polymer 617 of the main tube 602 are formed from any of the materials listed above with regard to the main tube 102.

Figure 51:
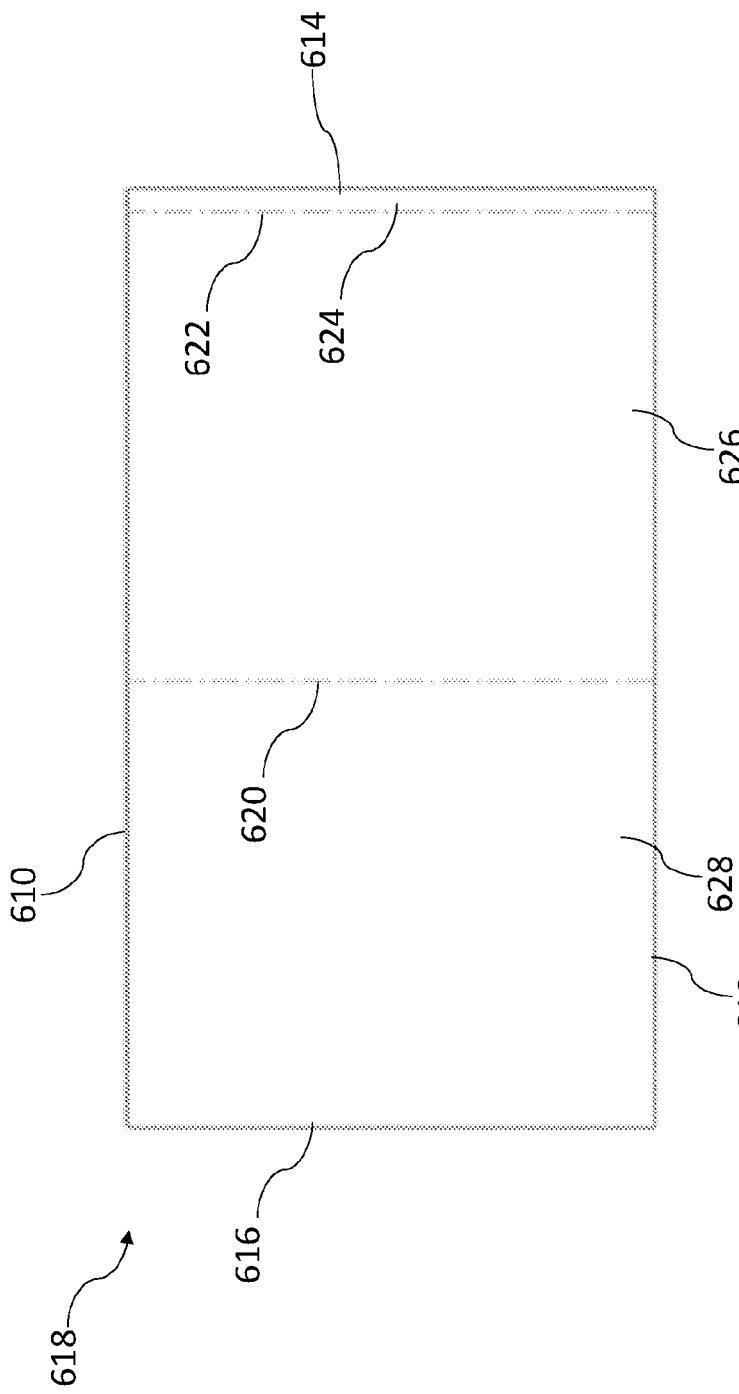
FIG. 51 is a top view of the unfolded composite sheet of the main tube of the storage bag in accordance with some embodiments herein.

In some embodiments, as depicted in FIG. 51, the composite sheet 618 extends from a first end 610 to a second end 612 and from a first side 614 to a second side 616. In some embodiments, the composite sheet 618 defines a first fold line 620 extending perpendicularly from the first end 610 to the second end 612 and positioned approximately intermediate the first side 614 and the second side 616. In some embodiments, the composite sheet 618 defines a second fold line 622 extending perpendicularly from the first end 610 to the second end 612 and positioned proximate to the first side 614. In some embodiments, the first and second fold lines 620 and 622 subdivide the composite sheet 618 into three regions: (1) a first region 624 bounded by the first side 614, the second end 612, the second fold line 622, and the first end 610; (2) a second region 626 bounded by the second fold line 622, the second end 612, the first fold line 620, and the first end 610; and (3) a third region 628 bounded by the first fold line 620, the second end 612, the second side 616, and the first end 610. In some embodiments, the first and second fold lines 620 and 622 are positioned such that the area of the second region 626 is equal to the sum of the respective areas of the first region 624 and the third region 628. In some embodiments, the first polymer 615 and the second polymer 617 of the composite sheet 618 are formed from any of the materials listed above with regard to the composite sheet 118.

In some embodiments, formation of a storage bag 600 includes folding the composite sheet 618 to form the main tube 602. FIG. 49 shows the composite sheet 618 as folded. In some embodiments, folding the composite sheet 618 includes folding the composite sheet 618 along the first fold line 620 and along the second fold line 622 such that the first polymer 615 faces inward so as to contact itself and such that the second polymer 617 faces outward. In some embodiments, folding the outer composite sheet 618 includes folding the first side 614 and the second side 616 toward one another such that the first side 614 and the second side 616 abut, but do not overlap, one another. In some embodiments, as a result of such folding, the first polymer 615 contacts itself on the inside of the folded outer composite sheet 618, and the second polymer 617 faces outward.

Figure 53:
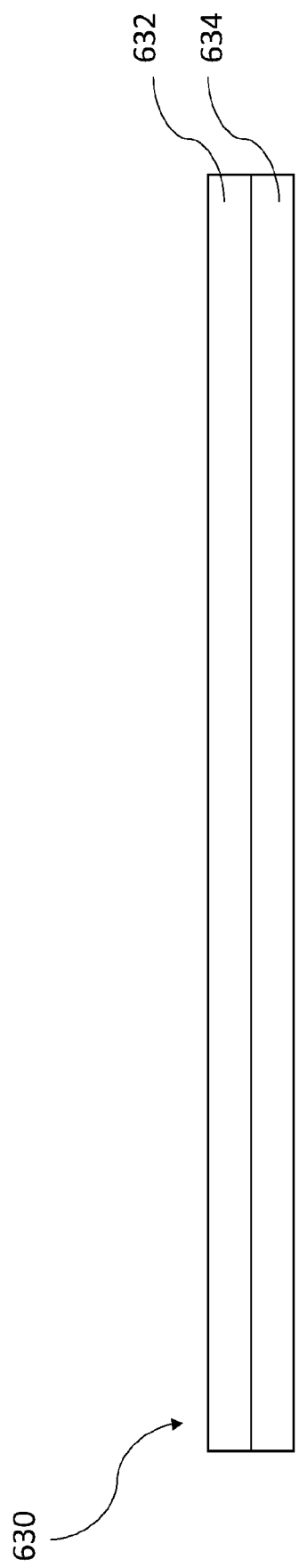
FIG. 53 is a cross-sectional view of a composite sheet of the insert of the storage bag in accordance with some embodiments herein.

In some embodiments, the insert 604 is formed from a composite sheet 630. In an embodiment, the composite sheet includes a first polymer 632 and a second polymer 634, as depicted in FIG. 53. In some embodiments, the first polymer 632 is a higher melting polymer and the second polymer 634 is a lower melting polymer, as per the definitions provided above. In some embodiments, the first polymer 632 and the second polymer 634 of the insert 604 are formed from any of the materials listed above with regard to the main tube 102.

Figure 52:
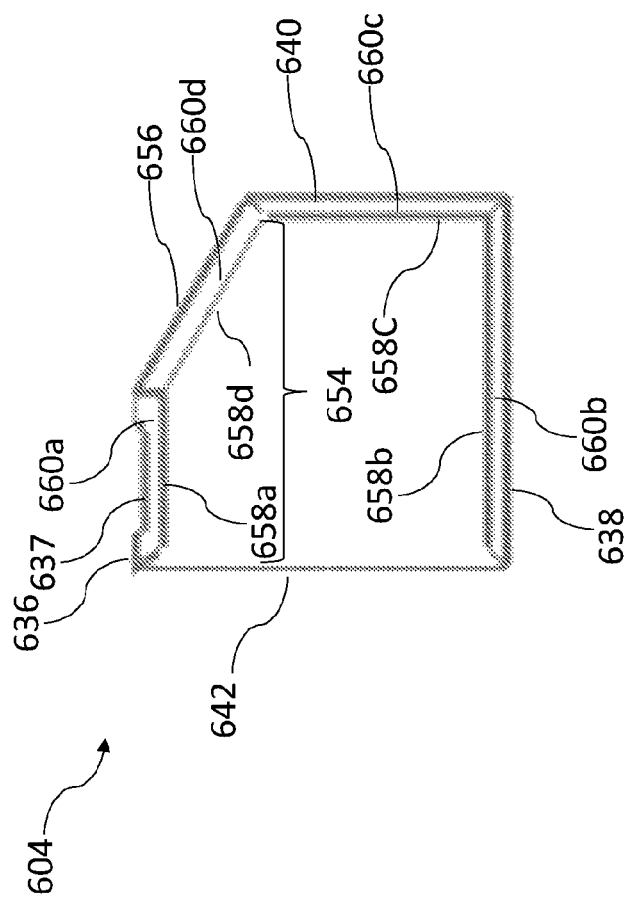
FIG. 52 is a top view of an insert of the storage bag in accordance with some embodiments herein.

In some embodiments, the insert 604 extends from a first end 636 to a second end 638 and from a first lateral side 640 to a second side 642, as depicted in FIGS. 52 and 54. In some embodiments, the insert 604 is formed by folding the composite sheet 630 along a fold line 644 to define a first portion 646 and a second portion 648. In some embodiments, the insert 604 defines an inner surface 650, which faces the compartment 606, and an outer surface 652, which faces the exterior of the insert 604. In some embodiments, the composite sheet 630 is folded such that the inner surface 650 is the first polymer 632 of the composite sheet 630 and the outer surface 652 is the second polymer 634 of the composite sheet 630.

In some embodiments, a corner at the first lateral side 640 of the insert 604 is cut to form a body angled interface 654 configured to increase drainage of the storage bag 600. For example, as depicted in FIG. 52, in some embodiments, the insert 604 includes an angled edge 656 extending from the first lateral side 640 of the insert 604 toward the first end 636. As depicted in FIG. 52, the first end 636 extends between the angled edge 656 and the second lateral side 642 of the insert 604. The angled edge 656 and the first end 636 make up the body angled interface 654. In some embodiments, the first end 636 includes a cutout 637 configured to receive an insertion portion 684 of the sealable port 608, as will be described in further detail below.

In some embodiments, when folded to form the insert 604, the first portion 646 of the composite sheet 630 includes four open edges: a first end edge 658a, a second end edge 658b, a first side edge 658c and an angled edge 658d. In some embodiments, the second portion 648 also includes four open edges: a first end edge 660a, a second end edge 660b, a first side edge 660c and an angled edge 660d, as depicted in FIG. 54. In some embodiments, each of the second portion edges 660a-d extends past the associated one of the first portion edges 658a-d. In some embodiments, the insert 604 is formed by first folding each of the second portion edges 660a-d toward the respective one of the first portion edges 658a-d such that the first portion edges 658a-d and the second portion edges 660a-d abut, but do not overlap, one another, as depicted in FIG. 52. In some embodiments, as a result of such folding, the first polymer 632 contacts itself on the inside of the folded composite sheet 630, and the second polymer 634 faces outward.

In some embodiments, as shown in FIG. 48, a storage bag 600 is formed from the folded composite sheet 630, forming the insert 604, as shown in FIG. 52 and the folded composite sheet 618, forming the main tube 602, as shown in FIG. 49. In some embodiments, the storage bag 600 is formed by positioning the insert 604 within the main tube 602. In some embodiments, a first side 672 of the storage bag 600 is defined by the second fold line 622 of the composite sheet 618 enclosing the first lateral side 640 of the insert 604. In some embodiments, a second side 673 of the storage bag 600 is defined by the first fold line 620 of the composite sheet 618 enclosing the second lateral side 642 of the insert 604. In some embodiments, the main tube 602 is sized and shaped such that, when positioned over the insert 604 as shown in FIG. 48, the first end 610 of the main tube 602 extends past the first end 636 of the insert 604 to define a first extension portion 674. In some embodiments, the main tube 602 is sized and shaped such that, when positioned over the insert 604 as shown in FIG. 48, the second end 612 of the main tube 602 extends past the second end 638 of the insert 604 to define a second extension portion 676.

In some embodiments, the inner facing surfaces (e.g., formed by the first polymer 615 that is a lower melting polymer) of the portion of the main tube 602 located in the second extension portion 676 and at the second end 638 of the insert 604 are sealed to one another (e.g., through heat sealing) to thereby produce a fin seam that forms a bottom end of the storage bag 600 that is enclosed and sealed. In some embodiments, the inner facing surfaces (e.g., formed by the first polymer 615 that is a lower melting polymer) of the portion of the main tube 602 extending between the second fold line 622 of the composite sheet 618 and the first fold line 620 of the composite sheet 618 are sealed to the outer facing surfaces (e.g., formed by the second polymer 634 that is a lower melting polymer) of the insert 604 extending between first lateral side 640 of the insert 604 and the second lateral side 642 of the insert 604 (e.g., through heat sealing) to thereby cause the first side 672 and the second side 673 of the storage bag 600 to be enclosed and sealed.

In some embodiments, portions of the inner facing surfaces of the main tube 602 (e.g., formed by the first polymer 615 that is a lower melting polymer) located in the first extension portion 674 are sealed to one another (e.g., through heat sealing) to produce a fin seam that seals a portion 680 of the first extension portion 674 around the angled interface 654 to form an angled drainage area 699. The fin seam is reinforced by folded edges at the first end 636 and the angled edge 656. In some embodiments, portions of the inner facing surfaces of the main tube 602 (e.g., formed by the first polymer 615 that is a lower melting polymer) located in the first extension portion 674 are not sealed to one another to form an unsealed portion 682 of the first extension portion 674.

In some embodiments, the sealable port 608 is inserted the first extension portion 674, as depicted in FIG. 48. In some embodiments, the sealable port 608 includes an insertion portion 684 formed of a lower melting polymer. In some embodiments, the insertion portion 684 abuts the cutout 637, when the sealable port 608 is inserted into the first extension portion, as depicted in FIG. 48. In some embodiments, the first polymer 615 (e.g., a lower melting polymer) at the inner surface of the unsealed portion 682 is sealed (e.g., through heat sealing) to the lower melting polymer of the insertion portion 684 of sealable port 608 to seal the unsealed portion 682, thereby sealing an entire perimeter of the storage bag 600. Thus, the storage bag 600 is completely sealed through the bonding of lower melting polymers to lower melting polymers, creating a stronger bond than a bond between two different materials (i.e., a lower melting polymer and a higher melting polymer), and reducing potential fracture and leakage of the storage bag 600.

In some embodiments, the storage bag 600 enables the use of composite sheets for the main tube 602 and the insert 604 that are thin and thus, in some instances, too weak to be used in a single layer, because of the overlapping of the main tube 602 and the insert 604. These thin composite films allow for increased flexibility and clarity (for viewing of contents) of the storage bag 600.

FIG. 55 depicts a storage bag 700, according to some embodiments of the present disclosure. In some embodiments, the storage bag 700 is a cryopreservation bag. The storage bag 700 includes a main tube 702 and an insert 704 defining a compartment 706 therein. In some embodiments, the main tube 702 is configured to receive at least one sealable port 708 such that the port 708 is in fluid communication with the compartment 706 of the insert 704. In some embodiments, the main tube 702 defines an inner surface 711, facing the compartment 706, and an outer surface 713, facing an exterior of the storage bag 700, as depicted in FIG. 57.

Figure 58:
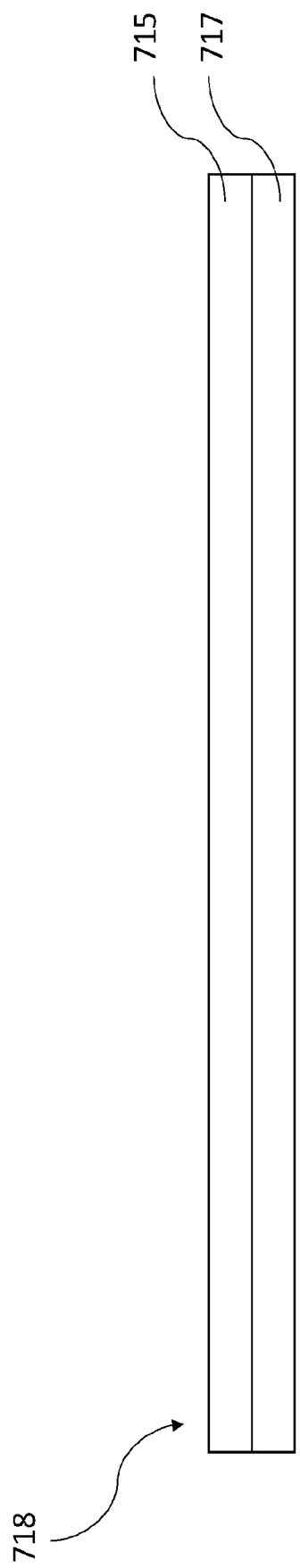
FIG. 58 is a cross-sectional view of a composite sheet of the main tube of the storage bag in accordance with some embodiments herein.

In some embodiments, the main tube 702 is formed from a composite sheet 718. In an embodiment, the composite sheet includes a first polymer 715 and a second polymer 717, as depicted in FIG. 58. In some embodiments, the first polymer 715 is a lower melting polymer and the second polymer 717 is a higher melting polymer, as per the definitions provided above. In some embodiments, the first polymer 715 and the second polymer 717 of the main tube 702 are formed from any of the materials listed above with regard to the main tube 102. In some embodiments, as depicted in FIG. 56, the main tube 702 extends from a first end 710 to a second end 712 and from a first side 714 to a second side 716.

Figure 57:
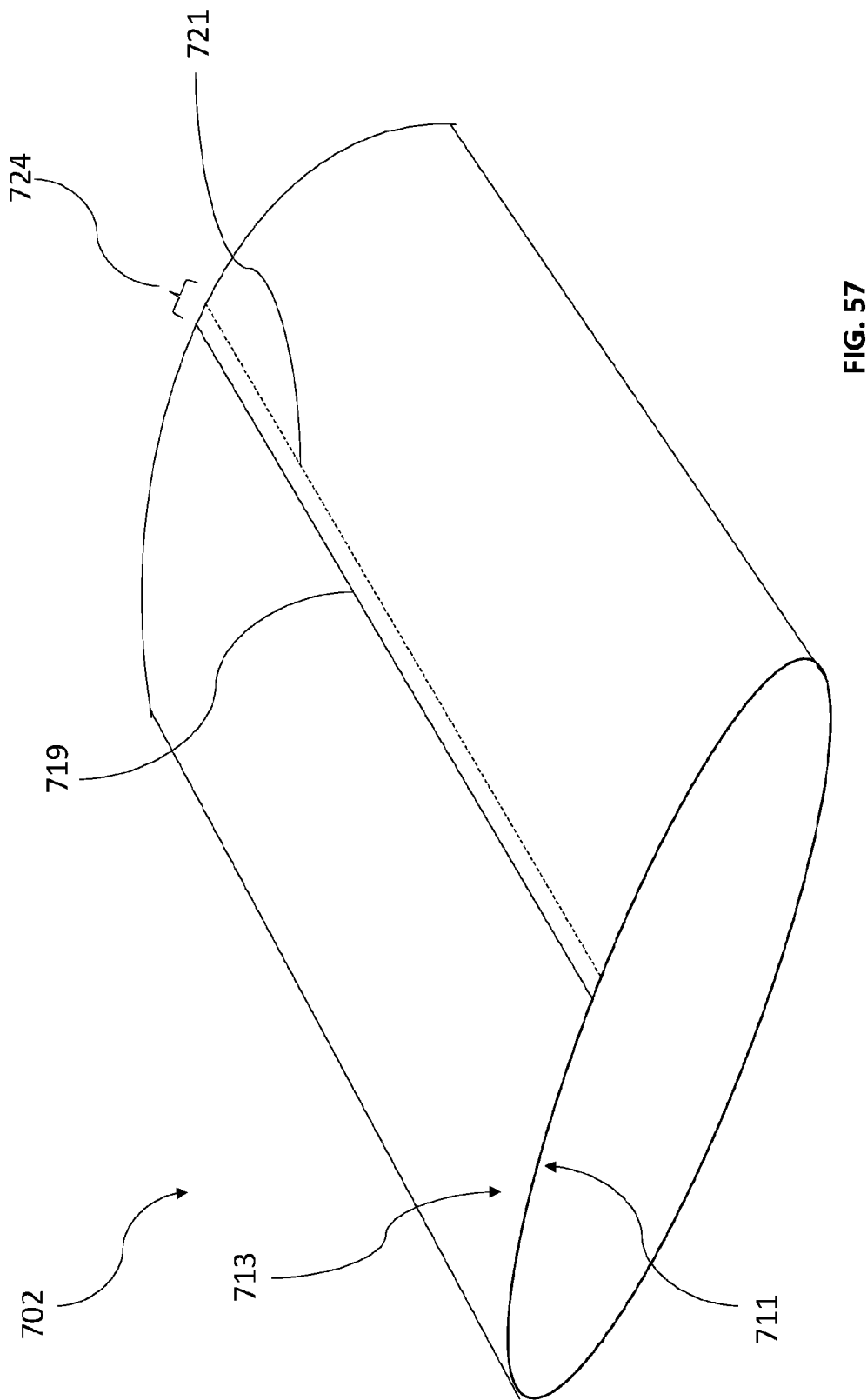
FIG. 57 is a perspective view of the main tube of the storage bag in accordance with some embodiments herein.

In some embodiments, the main tube 702 is formed by creating a tube from the composite sheet 718, as illustrated in FIG. 57. Thus, when the main tube 702 is formed, the outer surface 713 of the main tube 702 is the higher melting polymer 717 and the inner surface 711 is the lower melting polymer 715. In some embodiments, the main tube 702 is formed by overlapping a first lateral edge 719 of the composite sheet 718 over a second lateral edge 721 of the composite sheet 718 such that the inner surface 711 overlaps a portion of the outer surface 713, as depicted in FIG. 57. The lower melting polymer of the inner surface 711 and the higher melting polymer of the outer surface 713 are then heat sealed together such that the lower melting polymer bonds with the higher melting polymer, creating a lap seam 724.

Figure 60:
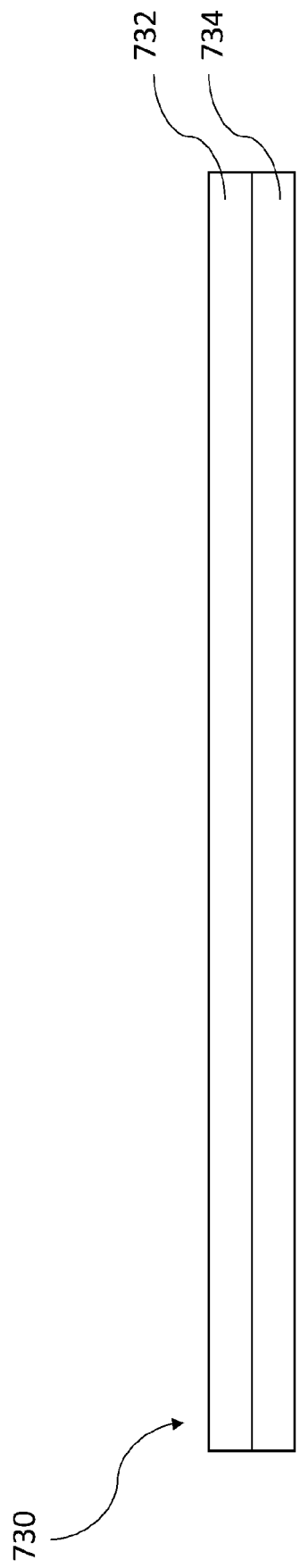
FIG. 60 is a cross-sectional view of a composite sheet of the insert of the storage bag in accordance with some embodiments herein.

In some embodiments, the insert 704 is formed in the same manner provided above with respect to insert 604. Specifically, the insert 704 is formed from a composite sheet 730. In an embodiment, the composite sheet 730 includes a first polymer 732 and a second polymer 734, as depicted in FIG. 60. In some embodiments, the first polymer 732 is a higher melting polymer and the second polymer 734 is a lower melting polymer, as per the definitions provided above. In some embodiments, the first polymer 732 and the second polymer 734 of the insert 704 are formed from any of the materials listed above with regard to the main tube 102.

Figure 59:
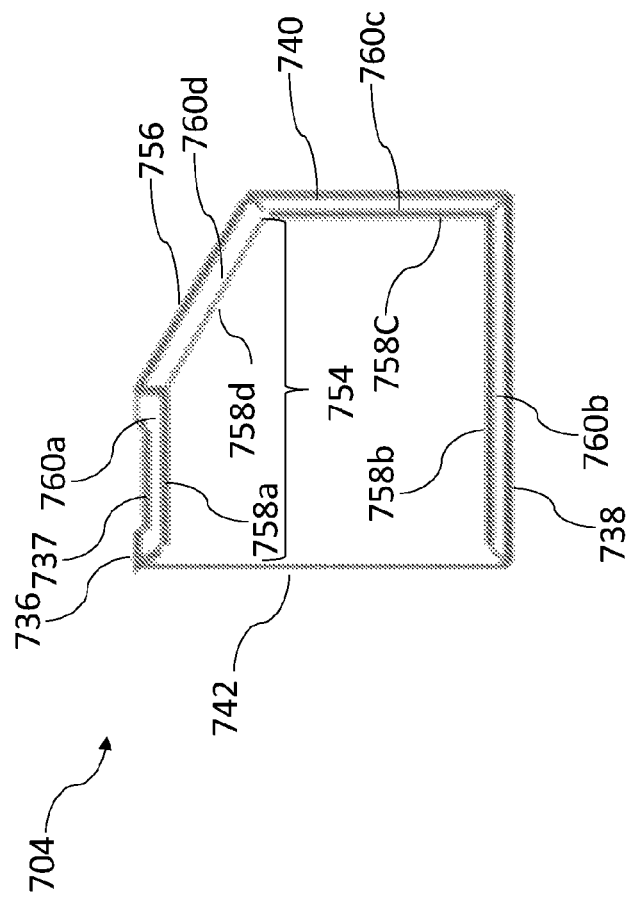
FIG. 59 is a top view of an insert of the storage bag in accordance with some embodiments herein.

In some embodiments, the insert 704 extends from a first end 736 to a second end 738 and from a first lateral side 740 to a second side 742, as depicted in FIG. 59. In some embodiments, the insert 704 is formed by folding the composite sheet 730 along a fold line 744 to define a first portion 746 and a second portion 748. In some embodiments, the insert 704 defines an inner surface 750, which faces the compartment 706, and an outer surface 752, which faces the exterior of the insert 704. In some embodiments, the composite sheet 730 is folded such that the inner surface 750 is the first polymer 732 of the composite sheet 730 and the outer surface 752 is the second polymer 734 of the composite sheet 730.

In some embodiments, a corner at the first lateral side 740 of the insert 704 is cut to form a body angled interface 754 configured to increase drainage of the storage bag 700. For example, as depicted in FIG. 59, in some embodiments, the insert 704 includes an angled edge 756 extending from the first lateral side 740 of the insert 704 toward the first end 736. As depicted in FIG. 59, the first end 736 extends between the angled edge 756 and the second lateral side 742 of the insert 704. The angled edge 756 and the first end 736 make up the body angled interface 754. In some embodiments, the first end 736 includes a cutout 737 configured to receive an insertion portion 784 of the sealable port 708, as will be described in further detail below.

Figure 61:
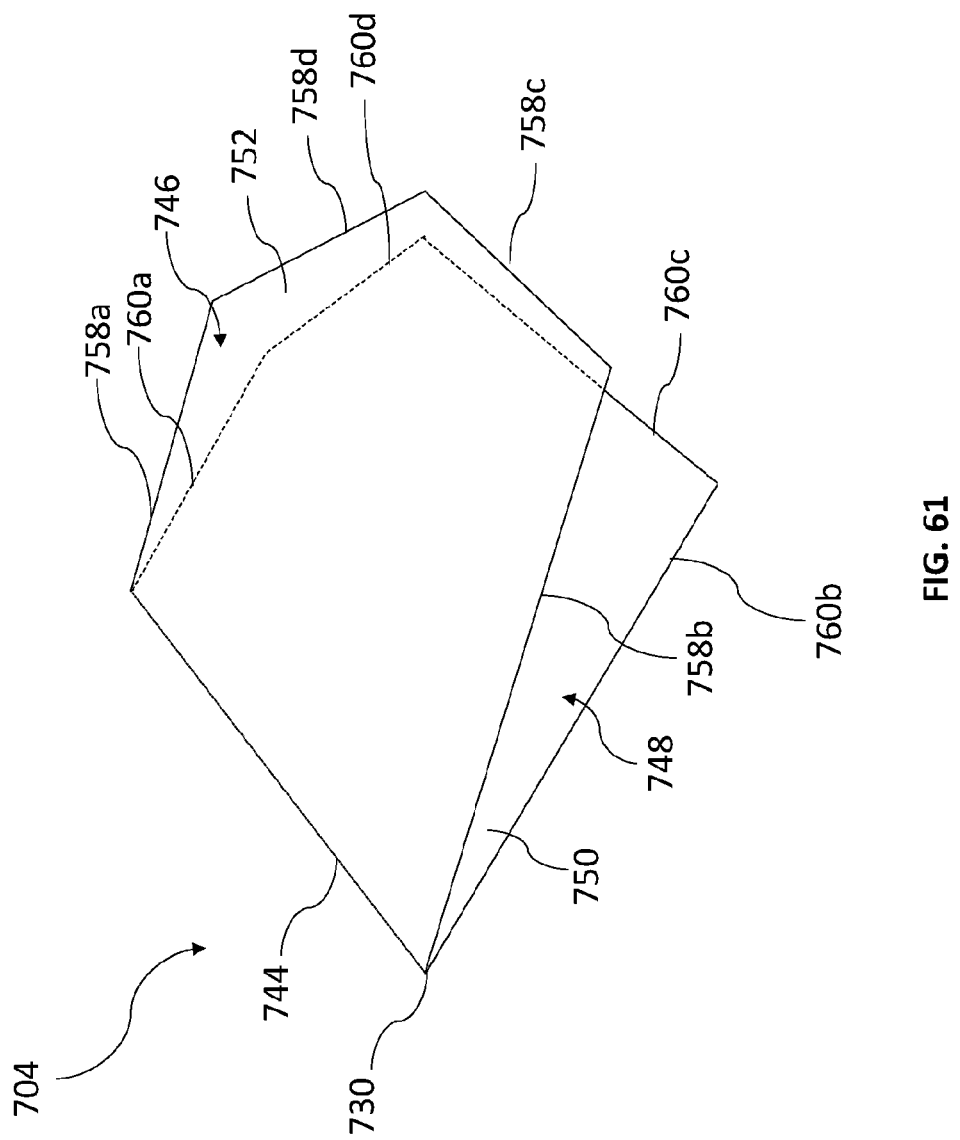
FIG. 61 is a perspective view of the insert of the storage bag in accordance with some embodiments herein.

In some embodiments, when folded to form the insert 704, the first portion 746 of the composite sheet 730 includes four open edges: a first end edge 758a, a second end edge 758b, a first side edge 758c and an angled edge 758d, as depicted in FIG. 61. In some embodiments, the second portion 648 also includes four open edges: a first end edge 760a, a second end edge 760b, a first side edge 760c and an angled edge 760d. In some embodiments, each of the second portion edges 760a-d extends past an associated one of the first portion edges 758a-d. In some embodiments, the insert 704 is formed by first folding each of the second portion edges 760a-d toward an associated one of the first portion edges 758a-d such that the first portion edges 758a-d and the second portion edges 760a-d abut, but do not overlap, one another. In some embodiments, as a result of such folding, the first polymer 732 contacts itself on the inside of the folded composite sheet 730, and the second polymer 734 faces outward.

In some embodiments, as shown in FIG. 55, a storage bag 700 is formed from the folded composite sheet 730, forming the insert 704, as shown in FIG. 59 and the composite sheet 718, forming the main tube 702, as shown in FIG. 56. In some embodiments, the storage bag 700 is formed by positioning the insert 704 within the main tube 702. In some embodiments, a first side 772 of the storage bag 700 is defined by the main tube 702 enclosing the first lateral side 740 of the insert 704. In some embodiments, a second side 773 of the storage bag 700 is defined by the main tube 702 enclosing the second lateral side 742 of the insert 704. In some embodiments, the main tube 702 is sized and shaped such that, when positioned over the insert 704 as shown in FIG. 55, the first end 710 of the main tube 702 extends past the first end 736 of the insert 704 to define a first extension portion 774. In some embodiments, the main tube 702 is sized and shaped such that, when positioned over the insert 704 as shown in FIG. 55, the second end 712 of the main tube 702 extends past the second end 738 of the insert 704 to define a second extension portion 776.

In some embodiments, the inner facing surfaces (e.g., formed by the first polymer 715 that is a lower melting polymer) of the portion of the main tube 702 located in the second extension portion 776 are sealed to one another and the folded edge 738 (e.g., through heat sealing) to thereby produce a fin seam that forms a bottom end of the storage bag 700 that is enclosed and sealed. In some embodiments, the inner facing surfaces (e.g., formed by the first polymer 715 that is a lower melting polymer) of a portion of the main tube 702 overlaying the insert are sealed to the outer facing surfaces (e.g., formed by the second polymer 734 that is a lower melting polymer) of the insert 704 extending between first lateral side 740 of the insert 704 and the second lateral side 742 of the insert 704 (e.g., through heat sealing) to thereby cause the first side 772 and the second side 773 of the storage bag 700 to be enclosed and sealed.

In some embodiments, portions of the inner facing surfaces of the main tube 702 (e.g., formed by the first polymer 715 that is a lower melting polymer) located in the first extension portion 774 are sealed to one another (e.g., through heat sealing) to produce a fin seam that seals a portion 780 of the first extension portion 774 around the angled interface 754 to form an angled drainage area 799. In some embodiments, the fin seam is reinforced by the folded edges at the first end 736 and the angled edge 756. In some embodiments, portions of the inner facing surfaces of the main tube 702 (e.g., formed by the first polymer 715 that is a lower melting polymer) located in the first extension portion 774 are not sealed to one another to form an unsealed portion 782 of the first extension portion 774.

In some embodiments, the sealable port 708 is inserted into the first extension portion 774, as depicted in FIG. 55. In some embodiments, the sealable port 708 includes an insertion portion 784 formed of a lower melting polymer. In some embodiments, the insertion portion 784 abuts the cutout 737, when the sealable port 708 is inserted into the first extension portion 774, as depicted in FIG. 55. In some embodiments, the first polymer 715 (e.g., a lower melting polymer) at the inner surface of the unsealed portion 782 is sealed (e.g., through heat sealing) to the lower melting polymer of the insertion portion 784 of sealable port 708 to seal the unsealed portion 782, thereby sealing an entire perimeter of the storage bag 700. Thus, the storage bag 700 is completely sealed through the bonding of lower melting polymers to lower melting polymers, except at the lap seam of the main tube 702, creating a stronger bond than a bond between two different materials (i.e., a lower melting polymer and a higher melting polymer), and reducing potential fracture and leakage of the storage bag 700.

In some embodiments, the storage bag 700 enables the use of composite sheets for the main tube 702 and the insert 704 that are thin and thus, in some instances, too weak to be used in a single layer, because of the overlapping of the main tube 702 and the insert 704. These thin composite films allow for increased flexibility and clarity (for viewing of contents) of the storage bag 700.

Figure 62:
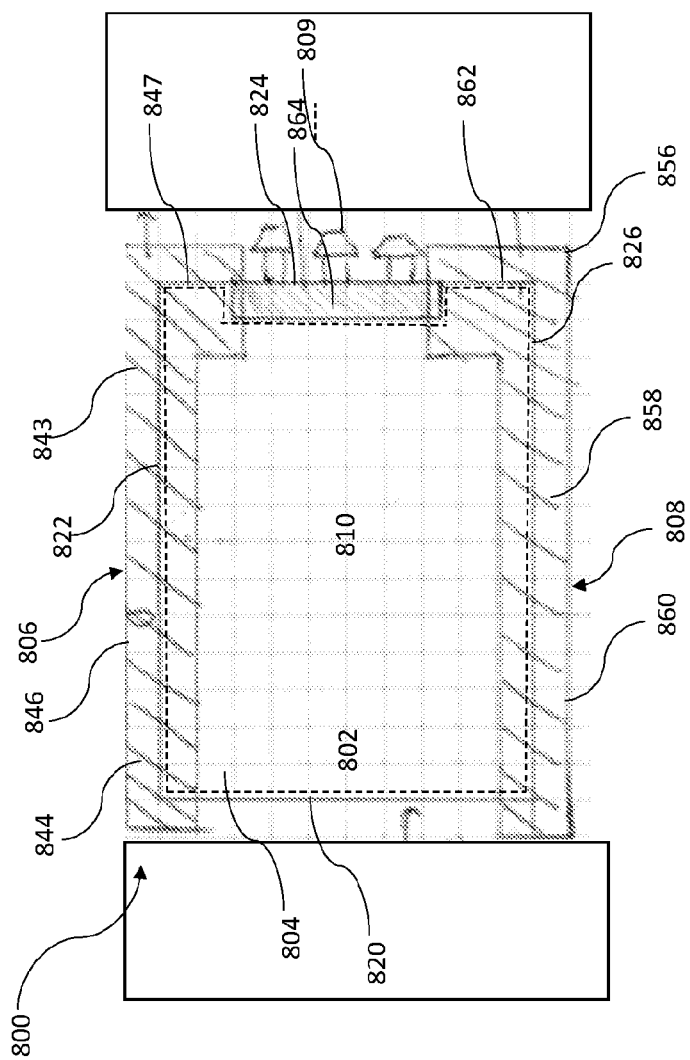
FIG. 62 is a top view of a storage bag in accordance with some embodiments herein.

FIG. 62 depicts a storage bag 800, according to some embodiments of the present disclosure. In some embodiments, the storage bag 800 is a cryopreservation bag. The storage bag 800 includes a body 802, formed of a composite sheet 804, a first sealing composite sheet 806, and a second sealing composite sheet 808. In some embodiments, the storage bag 800 also includes at least one sealable port 809 that is in fluid communication with an inner compartment 810 of the storage bag 800.

Figure 64:
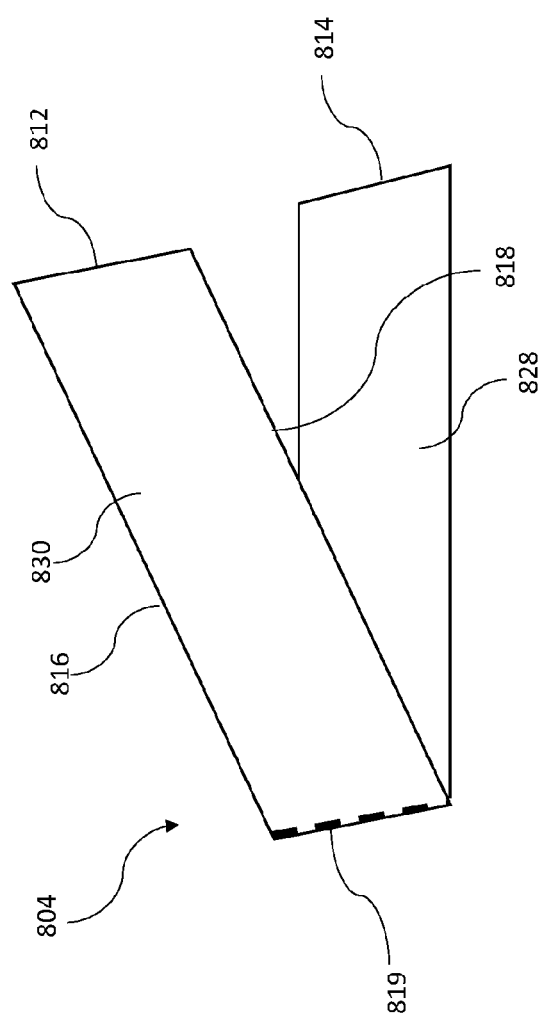
FIG. 64 is a perspective view of the folded composite sheet of the storage bag in accordance with some embodiments herein.

In some embodiments, the composite sheet 804 of the body 802 extends from a first end 812 to a second end 814 and from a first side 816 to a second side 818. In some embodiments, the composite sheet 804 is folded along a first fold line 819 such that the first side 816 and the second side 818 of the composite sheet 804 are aligned and the first end 812 and the second end 814 are aligned to form the body 802, as depicted in FIG. 64. The body 802 thus defines a folded side 820 and three open sides 822, 824, 826. In some embodiments, the body 802 defines an inner surface 828, which faces the compartment 810, and an outer surface 830, which faces the exterior of the storage bag 800.

Figure 63:
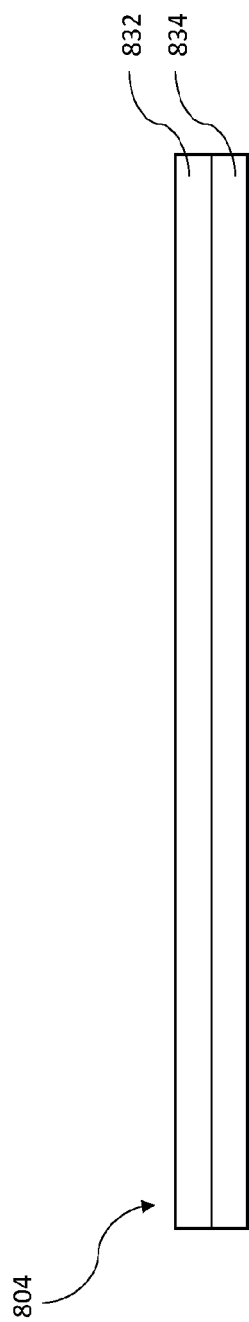
FIG. 63 is a cross-sectional view of a composite sheet of a storage bag in accordance with some embodiments herein.

In an embodiment, the composite sheet 804 includes a first polymer 832 and a second polymer 834, as depicted in FIG. 63. In some embodiments, the first polymer 832 is a higher melting polymer and the second polymer 834 is a lower melting polymer, as per the definitions provided above. In some embodiments, the first polymer 832 and the second polymer 834 of the composite sheet 804 are formed from any of the materials listed above with regard to the main tube 102.

In some embodiments, the body 802 is folded such that the inner surface 828 is the first polymer 832 of the composite sheet 804 and the outer surface 830 is the second polymer 834 of the composite sheet 804. Thus, when the body 802 is formed, the outer surface 830 of the body 802 is the lower melting polymer and the inner surface 828 is the higher melting polymer.

Figure 66:
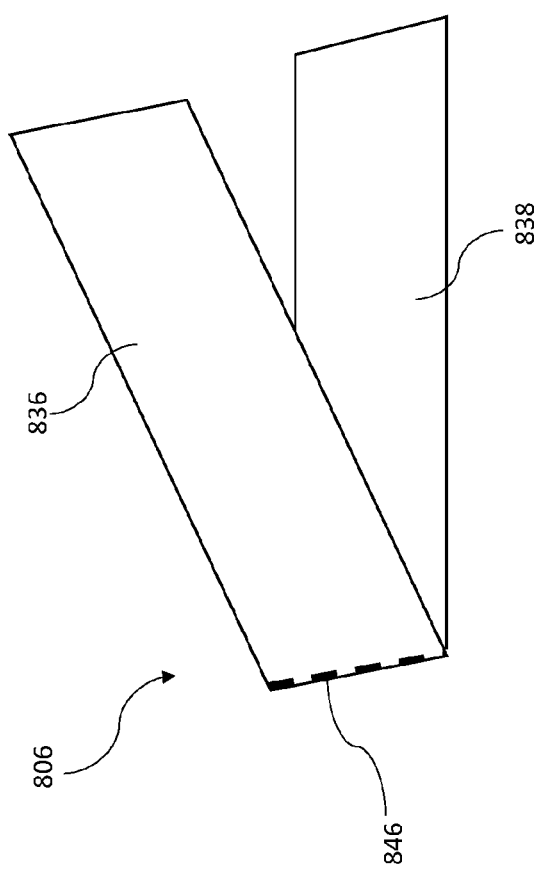
FIG. 66 is a perspective view of the folded first sealing composite sheet of the storage bag in accordance with some embodiments herein.

In some embodiments, the first sealing composite sheet 806 is folded over the first open side 822 of the body 802 such that the first sealing composite sheet 806 defines an outer surface 836 and an inner surface 838, as shown in FIG. 66, when in the folded configuration.

Figure 65:
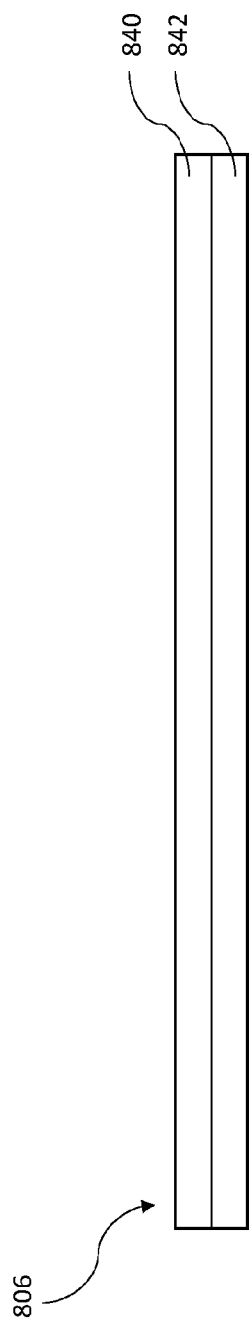
FIG. 65 is a cross-sectional view of a first sealing composite sheet of the storage bag in accordance with some embodiments herein.

In some embodiments, the first sealing composite sheet 806 is formed in substantially the same manner as the composite sheet 804. Specifically, in some embodiments, the first sealing composite sheet 806 includes a first polymer 840 and a second polymer 842, as depicted in FIG. 65. In some embodiments, the first polymer 840 is a lower melting polymer and the second polymer 842 is a higher melting polymer. In some embodiments, the first polymer 840 and the second polymer 842 of the first sealing composite sheet 806 are formed from any of the materials listed above with regard to the main tube 102.

In some embodiments, when the first sealing composite sheet 806 is in the folded configuration, the inner surface 838 is the first polymer 840 of the first sealing composite sheet 806 and the outer surface 836 is the second polymer 842 of the first sealing composite sheet 806, as depicted in FIG. 66. Thus, when the first sealing composite sheet 806 is in the folded configuration, the outer surface 836 is the higher melting polymer and the inner surface 838 is the lower melting polymer.

In some embodiments, the first open side 822 of the body 802 is sealed by folding the first sealing composite sheet 806 over the first open side 822 such that at least a portion of the inner surface 838 of the first sealing composite sheet 806 overlaps a portion of the outer surface 830 of the body 802, as depicted in FIG. 62. The lower melting polymer of the inner surface 838 of the first sealing composite sheet 806 and the lower melting polymer of the outer surface 830 of the body 802 are then heat sealed together such that the lower melting polymers bond, thereby creating a lap seam between the body 802 and the first sealing composite sheet 806.

Figure 69:
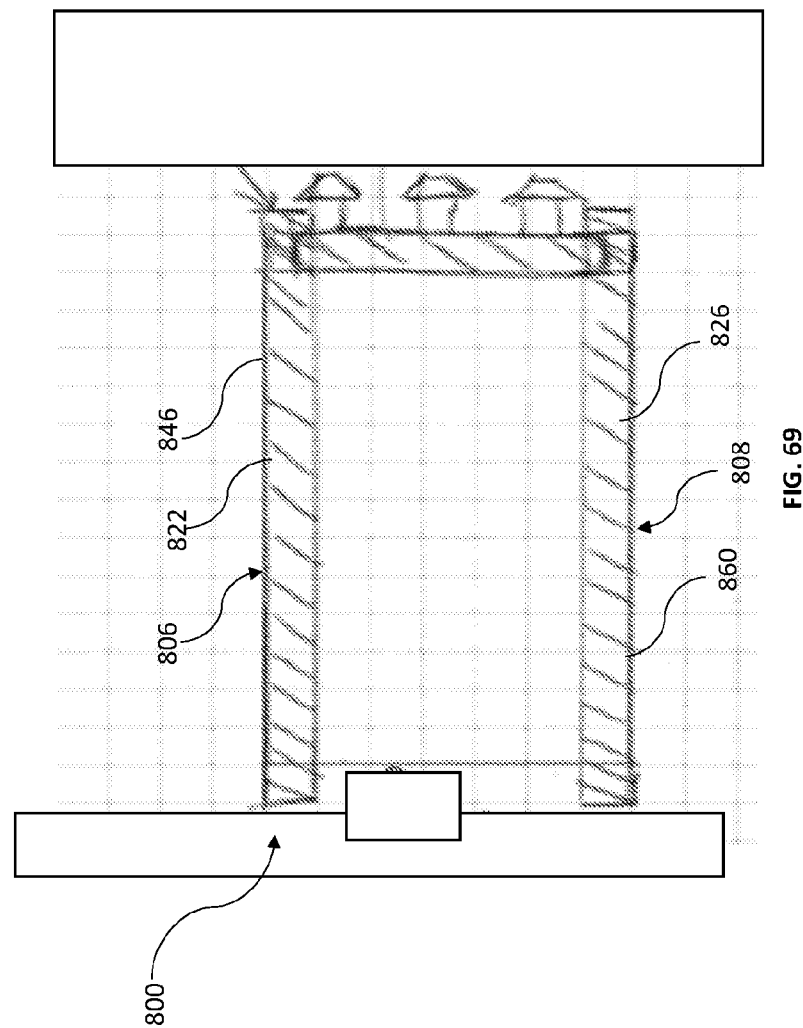
FIG. 69 is a top view of a storage bag in accordance with some embodiments herein.

In some embodiments, as depicted in FIG. 62, a portion 844 of the first sealing composite sheet 806 does not overlap the body 802. In some embodiments, this portion 844 is sealed to itself to form a first fin seam 843 that seals the first open side 822. In other embodiments, as depicted in FIG. 69, a folded edge 846 of the first sealing composite sheet 806 is aligned with the first open side 822 such that bonding of the inner surface 838 of the first sealing composite sheet 806 to the outer surface 830 of the body 802 seals the first open side 822.

In some embodiments, as depicted in FIG. 62, the first sealing composite sheet 806 overlaps a first lateral portion 847 of the second open side 824. This first lateral portion 847 may be sealed by the same method described above with regard to the first open side 822.

Figure 68:
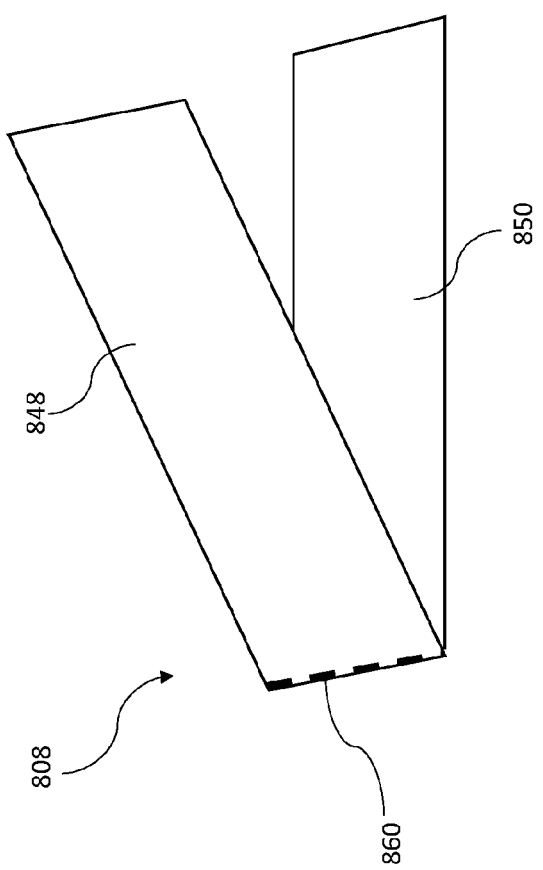
FIG. 68 is a perspective view of the folded second sealing composite sheet of the storage bag in accordance with some embodiments herein.

In some embodiments, the second sealing composite sheet 808 is folded over the third open side 826 of the body 802 such that the second sealing composite sheet 808 defines an outer surface 848 and an inner surface 850, when in the folded configuration, as depicted in FIG. 68.

Figure 67:
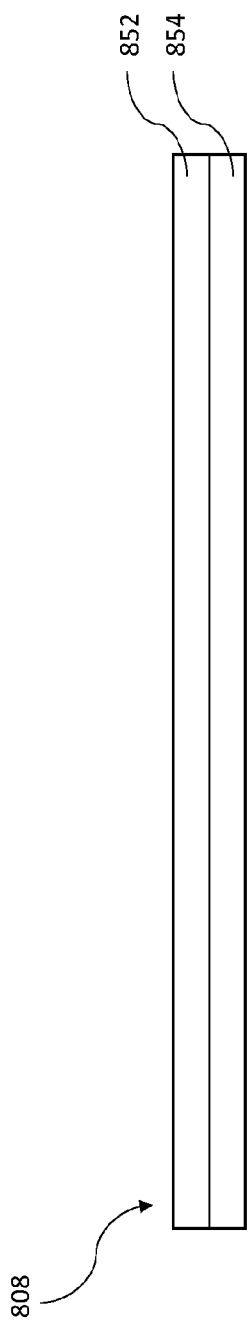
FIG. 67 is a cross-sectional view of a second sealing composite sheet of the storage bag in accordance with some embodiments herein.

In some embodiments, the second sealing composite sheet 808 is formed in substantially the same manner as the composite sheet 804 and the first sealing composite sheet 806. Specifically, in some embodiments, the second sealing composite sheet 808 includes a first polymer 852 and a second polymer 854, as depicted in FIG. 67. In some embodiments, the first polymer 852 is a lower melting polymer and the second polymer 854 is a higher melting polymer. In some embodiments, the first polymer 852 and the second polymer 854 of the second sealing composite sheet 808 are formed from any of the materials listed above with regard to the composite sheet 804.

In some embodiments, as shown in FIG. 68, when the second sealing composite sheet 808 is in the folded configuration, the inner surface 850 is the first polymer 852 of the second sealing composite sheet 808 and the outer surface 848 is the second polymer 854 of the second sealing composite sheet 808. Thus, when the second sealing composite sheet 808 is in the folded configuration, the outer surface 848 is the higher melting polymer and the inner surface 850 is the lower melting polymer. In some embodiments, the third open side 826 of the body 802 is sealed by folding the second sealing composite sheet 808 over the third open side 826 such that at least a portion of the inner surface 850 of the second sealing composite sheet 808 overlaps a portion of the outer surface 830 of the body 802, as depicted in FIG. 62. The lower melting polymer of the inner surface 850 and the lower melting polymer of the outer surface 830 are then heat sealed together such that the lower melting polymers bond, creating a lap seam between the body 802 and the second sealing composite sheet 808.

In some embodiments, as depicted in FIG. 62, a portion 856 of the second sealing composite sheet 808 does not overlap the body 802. In some embodiments, this portion 856 is sealed to itself to form a second fin seam 858 that seals the third open side 826. In other embodiments, as depicted in FIG. 69, a folded edge 860 of the second sealing composite sheet 808 is aligned with the third open side 826 such that bonding of the inner surface 850 of the second sealing composite sheet 808 to the outer surface 830 of the body 802 seals the third open side 826.

In some embodiments, as depicted in FIG. 62, the second sealing composite sheet 808 overlaps a second lateral portion 862 of the second open side 824. This second lateral portion 862 may be sealed by the same method described above with regard to the third open side 826.

In some embodiments, the sealable port 809 is inserted into the unsealed portion of the second open side 824. The sealable port 809 includes an insertion portion 864 formed of a lower melting polymer. The higher melting polymer of the inner surface 828 of the body 802, at the unsealed portion of the second open side 824, is bonded to the lower melting polymer of the insertion portion 864 of sealable port 809 to seal the second open side 824, and the storage bag 800.

Figure 70:
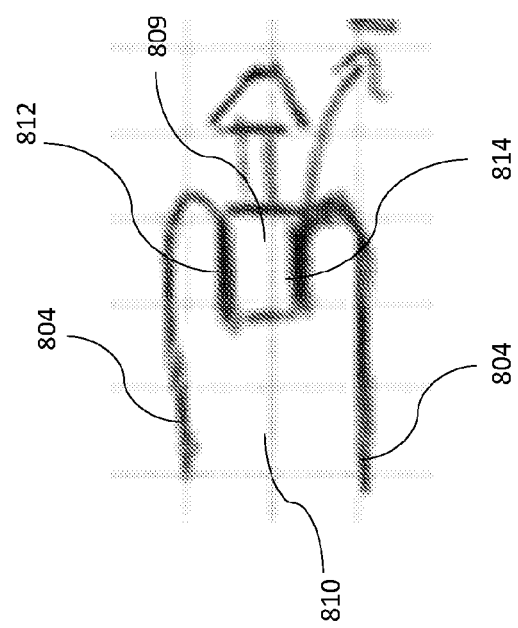
FIG. 70 is an enlarged view of the ends of a composite sheet of a storage bag in accordance with some embodiments herein.

In some embodiments, the first end 812 and the second end 814 of the composite sheet 804 are folded inward into the compartment 810 of the storage bag 800, as depicted in FIG. 70. In this configuration, the lower melting polymer of the composite sheet 804 at the first end 812 faces the lower melting polymer of the sealable port 809. Additionally, the lower melting polymer of the composite sheet 804 at the second end 814 also faces the lower melting polymer of the sealable port 809. The lower melting polymer of the composite sheet 804 and the lower melting polymer of the sealable port 809 are then bonded together to seal the storage bag 800. This bond between two like materials (i.e., lower melting polymers of the sealable port 809 and the lower melting polymer of the composite sheet 804) creates a stronger bond than a bond between two different materials (i.e., a lower melting polymer and a higher melting polymer), reducing potential fracture and leakage at the seal.

Figure 71:
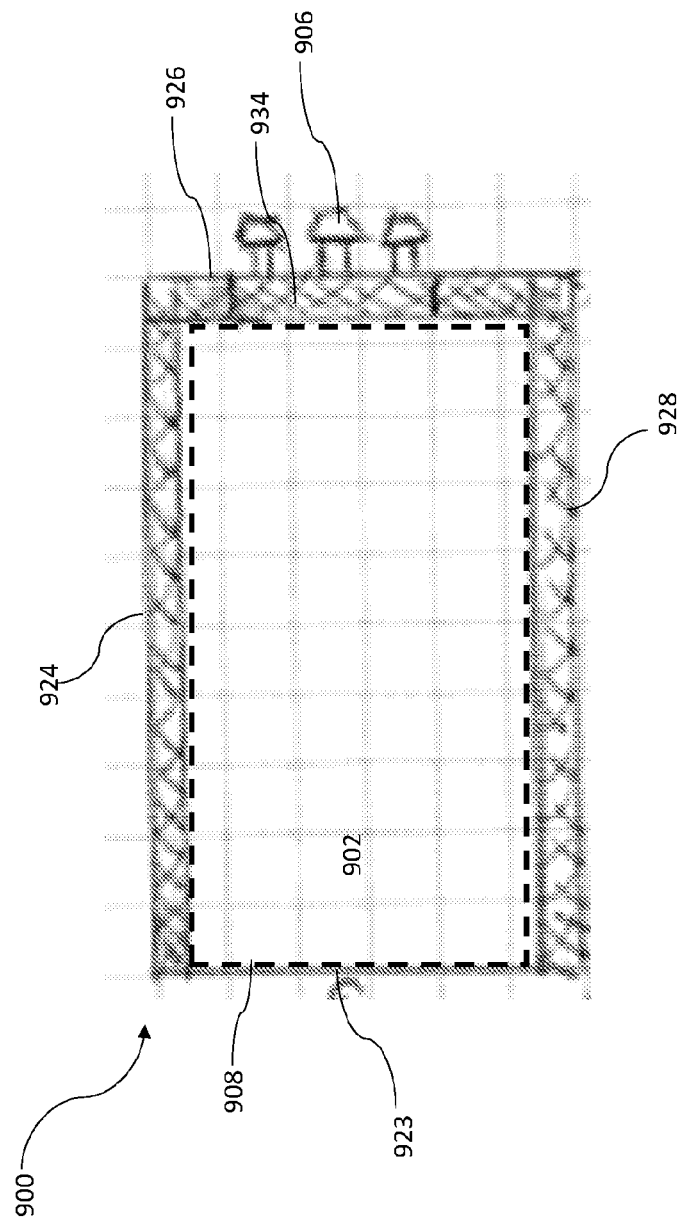
FIG. 71 is a top view of a storage bag in accordance with some embodiments herein.

FIG. 71 depicts a storage bag 900, according to some embodiments of the present disclosure. In some embodiments, the storage bag 900 is a cryopreservation bag. The storage bag 900 includes a body 902, formed of a composite sheet 904. In some embodiments, the storage bag 900 also includes at least one sealable port 906 that is in fluid communication with an inner compartment 908 of the storage bag 900.

Figure 72:
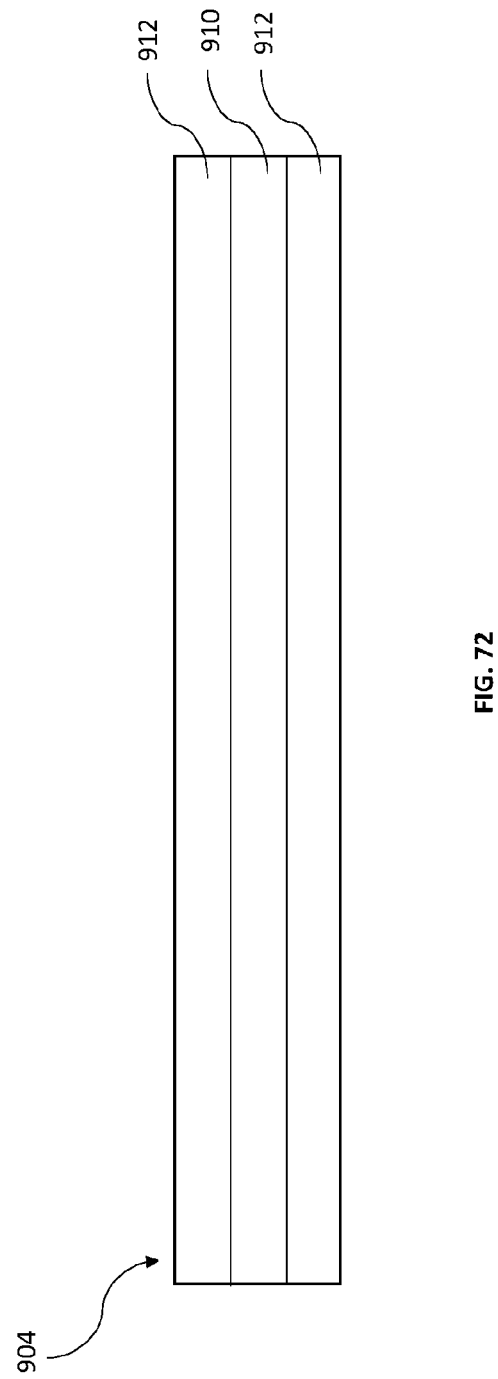
FIG. 72 is a cross-sectional view of a three-layer composite sheet of the storage bag in accordance with some embodiments herein.

In an embodiment, the composite sheet 904 is a three-layer composite that includes a first polymer 910 and a second polymer 912. In some embodiments, a layer of the first polymer 910 is positioned between two layers of the second polymer 912 to form the three-layer composite sheet 904, as depicted in FIG. 72. In some embodiments, the first polymer 910 is a higher melting polymer and the second polymer 912 is a lower melting polymer.

Figure 73:
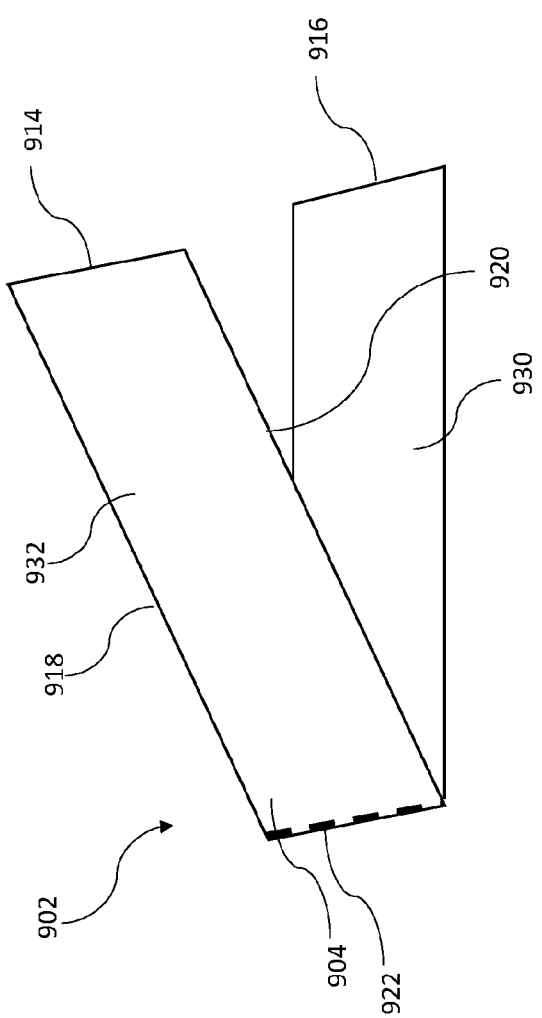
FIG. 73 is a perspective view of the folded three-layer composite sheet of the storage bag in accordance with some embodiments herein.

In some embodiments, the composite sheet 904 of the body 902 extends from a first end 914 to a second end 916 and from a first side 918 to a second side 920, as depicted in FIG. 73. In some embodiments, the composite sheet 904 is folded along a fold line 922 such that the first side 918 and the second side 920 of the composite sheet 904 are aligned and the first end 914 and the second end 916 are aligned to form the body 902. The body 902 thus defines a folded side 923 and three open sides 924, 926, 928, as depicted in FIG. 71. In some embodiments, the body 902 defines an inner surface 930, which faces the compartment 908, and an outer surface 932, which faces the exterior of the storage bag 900.

In some embodiments, the body 902 is folded such that the inner surface 930 is the second polymer 912 of the composite sheet 904 and the outer surface 932 is the second polymer 912 of the composite sheet 904. Thus, when the body 902 is formed, both the inner surface 930 and the outer surface 932 of the body 902 are lower melting polymers.

In some embodiments, a portion of the composite sheet 904, along an entire length of the first open side 924, is bonded (e.g., heat-sealed) to itself to seal the first open side 924. Additionally, a portion of the composite sheet 904, along an entire length of the third open side 928, is bonded (e.g., heat-sealed) to itself to seal the third open side 928. Specifically, the lower melting polymer of the folded composite sheet 904 is bonded to itself to form a seal. This bond between the same lower melting polymer material creates a stronger bond than a bond between two different materials (i.e., a lower melting polymer and a higher melting polymer), reducing potential fracture and leakage at the seals. In some embodiments, two pieces of the composite sheet 904 are sealed to one another along all four edges to seal a storage bag. In some embodiments, two pieces of the composite sheet 904 are sealed to one another along all four edges, leaving a gap for a port in one of the edges.

In some embodiments, the sealable port 906 is inserted into the second open side 926. The sealable port 906 includes an insertion portion 934 formed of a lower melting polymer. The lower melting polymer of the inner surface 930 of the body 902, at the second open side 926, is bonded (i.e., through heat sealing) to the lower melting polymer of the insertion portion 934 of sealable port 906 to seal the second open side 926, and the storage bag 900. Similar to the first and third open sides 924, 928, the bonding of the lower melting polymer of the inner surface 930 to the lower melting polymer of the insertion portion 934 of the sealable port 906 creates a stronger bond than a bond between two different materials (i.e., a lower melting polymer and a higher melting polymer), reducing potential fracture and leakage at the seal and the sealable port 906.

Figure 74:
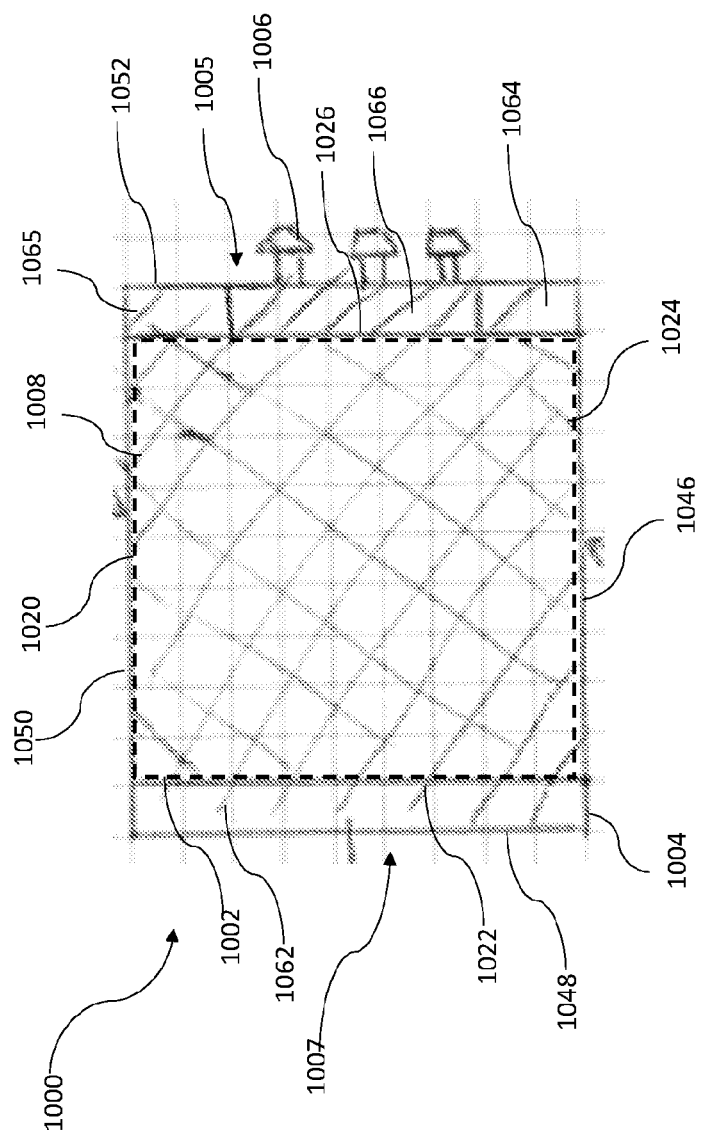
FIG. 74 is a top view of a storage bag in accordance with some embodiments herein.

FIG. 74 depicts a storage bag 1000, according to some embodiments of the present disclosure. In some embodiments, the storage bag 1000 is a cryopreservation bag. The storage bag 1000 includes an inner composite sheet 1002 and an outer composite sheet 1004. In some embodiments, the storage bag 1000 also includes at least one sealable port 1006 that is in fluid communication with an inner compartment 1008 of the storage bag 1000. In some embodiments, the storage bag 1000 extends from a first port end 1005 to an opposing second end 1007.

Figure 76:
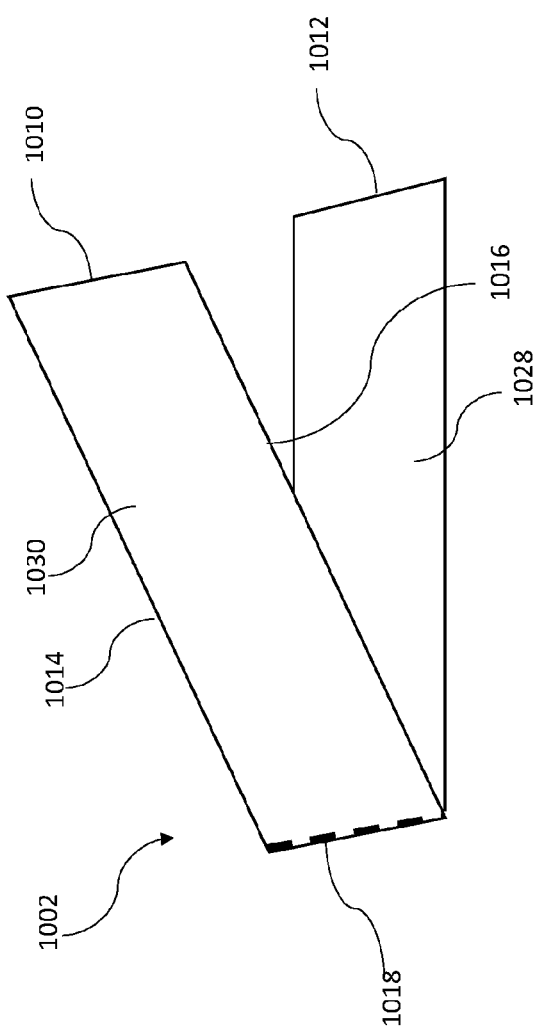
FIG. 76 is a perspective view of the folded inner composite sheet of the storage bag in accordance with some embodiments herein.

In some embodiments, the inner composite sheet 1002 extends from a first end 1010 to a second end 1012 and from a first side 1014 to a second side 1016, as depicted in FIG. 76. In some embodiments, the inner composite sheet 1002 is folded along a fold line 1018 such that the first side 1014 and the second side 1016 of the inner composite sheet 1002 are aligned and the first end 1010 and the second end 1012 are aligned, as depicted in FIG. 76. The folded inner composite sheet 1002 thus defines a folded side 1020 and three open sides 1022, 1024, 1026, as depicted in FIG. 74. In some embodiments, the folded inner composite sheet 1002 defines an inner surface 1028, which faces the compartment 1008, and an outer surface 1030, which faces the outer composite sheet 1004.

Figure 75:
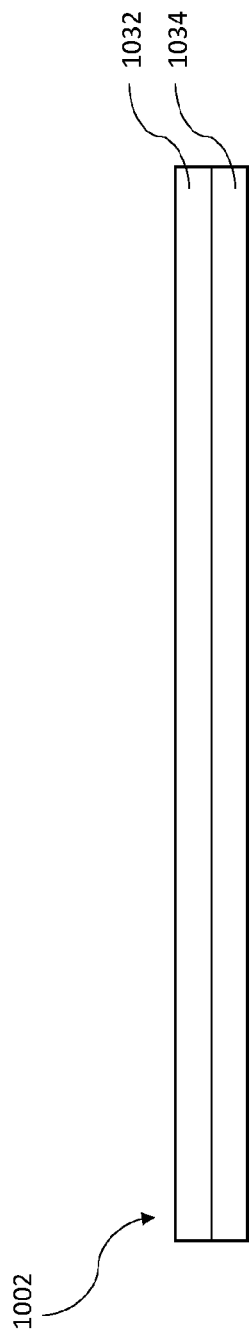
FIG. 75 is a cross-sectional view of an inner composite sheet of the storage bag in accordance with some embodiments herein.

In an embodiment, the inner composite sheet 1002 includes a first polymer 1032 and a second polymer 1034, as depicted in FIG. 75. In some embodiments, the first polymer 1032 is a higher melting polymer and the second polymer 1034 is a lower melting polymer. In some embodiments, the inner composite sheet 1002 is folded such that the inner surface 1028 is the first polymer 1032 and the outer surface 1030 is the second polymer 1034. Thus, when the inner composite sheet 1002 is in the folded configuration, the outer surface 1030 of the folded inner composite sheet 1002 is the lower melting polymer and the inner surface 1028 is the higher melting polymer. In some embodiments, the first polymer 1032 and the second polymer 1034 of the inner composite sheet 1002 are formed from any of the materials listed above with regard to the composite sheet 118.

Figure 78:
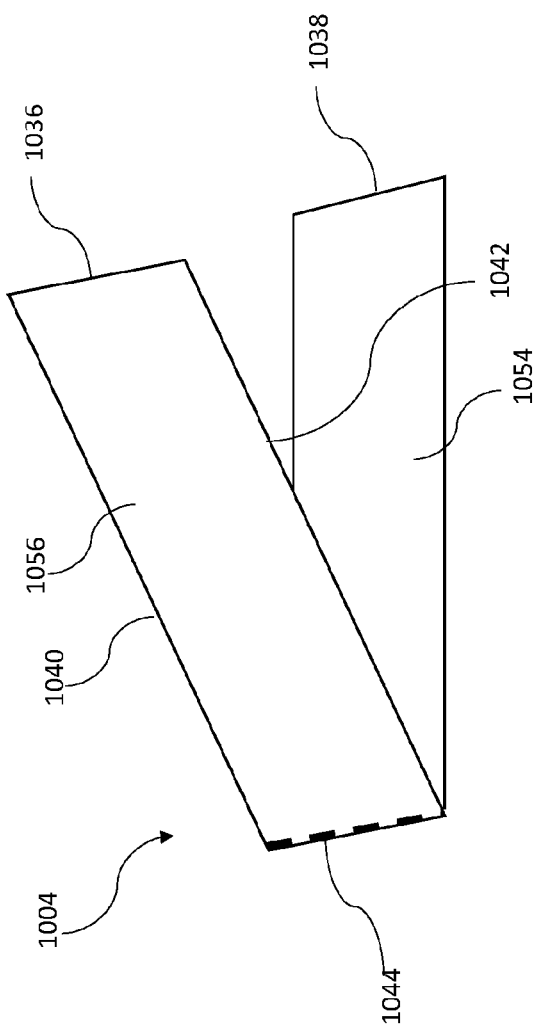
FIG. 78 is a perspective view of the folded outer composite sheet of the storage bag in accordance with some embodiments herein.

In some embodiments, the outer composite sheet 1004 extends from a first end 1036 to a second end 1038 and from a first side 1040 to a second side 1042, as depicted in FIG. 78. In some embodiments, the outer composite sheet 1004 is folded along a fold line 1044 such that the first side 1040 and the second side 1042 of the outer composite sheet 1004 are aligned and the first end 1036 and the second end 1038 are aligned. The folded outer composite sheet 1004 thus defines a folded side 1046 and three open sides 1048, 1050, 1052, as depicted in FIG. 74. In some embodiments, the folded outer composite sheet 1004 defines an inner surface 1054, which faces the inner composite sheet 1002, and an outer surface 1056, which faces the exterior of the storage bag 1000.

Figure 77:
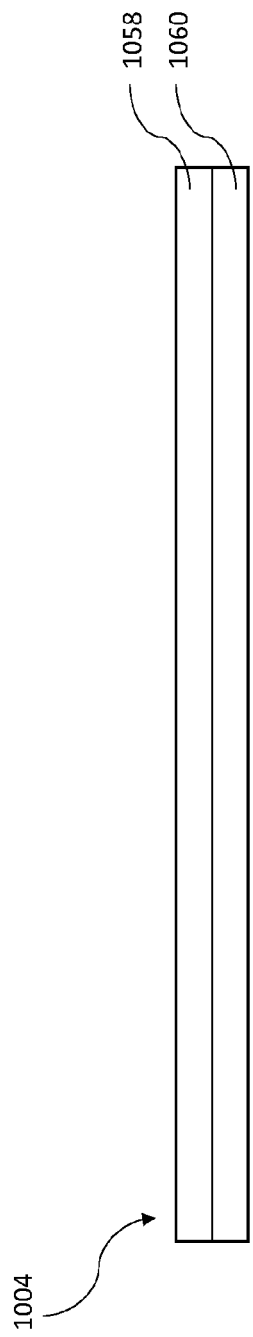
FIG. 77 is a cross-sectional view of an outer composite sheet of the storage bag in accordance with some embodiments herein.

In an embodiment, the outer composite sheet 1004 includes a first polymer 1058 and a second polymer 1060, as depicted in FIG. 77. In some embodiments, the first polymer 1058 is a lower melting polymer and the second polymer 1060 is a higher melting polymer. In some embodiments, the outer composite sheet 1004 is folded such that the inner surface 1054 is the first polymer 1058 and the outer surface 1056 is the second polymer 1060. Thus, when the outer composite sheet 1004 is in the folded configuration, the outer surface 1056 of the folded outer composite sheet 1004 is the higher melting polymer and the inner surface 1054 is the lower melting polymer. In some embodiments, the first polymer 1058 and the second polymer 1060 of the outer composite sheet 1004 are formed from any of the materials listed above with regard to the composite sheet 118.

In some embodiments, the storage bag 1000 is formed by positioning the folded inner composite sheet 1002 within the folded outer composite sheet 1004. In an embodiment, the folded side 1046 of the folded outer composite sheet 1004 is adjacent to, and encloses, the second open side 1024 of the folded inner composite sheet 1002, as depicted in FIG. 74. Additionally, in the embodiment of FIG. 74, the folded side 1020 of the folded inner composite sheet 1002 is adjacent to the second open side 1050 of the folded outer composite sheet 1004. Although FIG. 74 depicts the folded side 1046 of the folded outer composite sheet 1004 adjacent to the second open side 1024 of the folded inner composite sheet 1002, and the folded side 1020 of the folded inner composite sheet 1002 adjacent to the second open side 1050 of the folded outer composite sheet 1004, the folded side 1046 may be positioned adjacent to any of the three open sides 1022, 1024, 1026 of the folded inner composite sheet 1002 and the folded side 1020 may be positioned adjacent to any of the three open sides 1048, 1050, 1052 of the folded outer composite sheet 1004.

In the embodiment of FIG. 74, the folded outer composite sheet 1004 includes a first extension portion 1062 that extends past the first open side 1022 of the folded inner composite sheet 1002, and includes a second extension portion 1064 that extends past the third open side 1026 of the folded inner composite sheet 1002. In some embodiments, the first extension portion 1062 extends past any one of the three open sides 1022, 1024, 1026 of the folded inner composite sheet 1002 that is not adjacent to the folded side 1046 of the outer composite sheet 1004, and also extends past the folded side 1020 of the inner composite sheet 1002. In some embodiments, the second extension portion 1064 extends past any second one of the three open sides 1022, 1024, 1026 of the folded inner composite sheet 1002 that is not adjacent to the folded side 1046 of the outer composite sheet 1004. In some embodiments, the second extension portion 1064 extends past any second one of the three open sides 1022, 1024, 1026 of the folded inner composite sheet 1002 that is not adjacent to the folded side 1046 of the outer composite sheet 1004, and also extends past the folded side 1020 of the inner composite sheet 1002.

The storage bag 1000 is sealed by bonding the lower melting polymer of the inner surface 1054 of the folded outer composite sheet 1004 to the lower melting polymer of the outer surface 1030 of the folded inner composite sheet 1002. Additionally, the first extension portion 1062 is bonded to itself to seal the second end 1007 of the storage bag 1000 and a portion 1065 of the second extension portion 1064 is bonded to itself to seal the port end 1005 of the storage bag 1000.

In some embodiments, the sealable port 1006 is inserted into the second extension portion 1064, as depicted in FIG. 74. The sealable port 1006 includes an insertion portion 1066 formed of a lower melting polymer. The lower melting polymer of the inner surface 1054 of the folded outer composite sheet 1004 is bonded (i.e., through heat sealing) to the lower melting polymer of the insertion portion 1066 of sealable port 1006 to seal the port end 1005, and the storage bag 1000. Thus, the storage bag 1000 is completely sealed through the bonding of lower melting polymers to lower melting polymers, creating a stronger bond than a bond between two different materials (i.e., a lower melting polymer and a higher melting polymer), and reducing potential fracture and leakage of the storage bag 1000.

Figure 79:
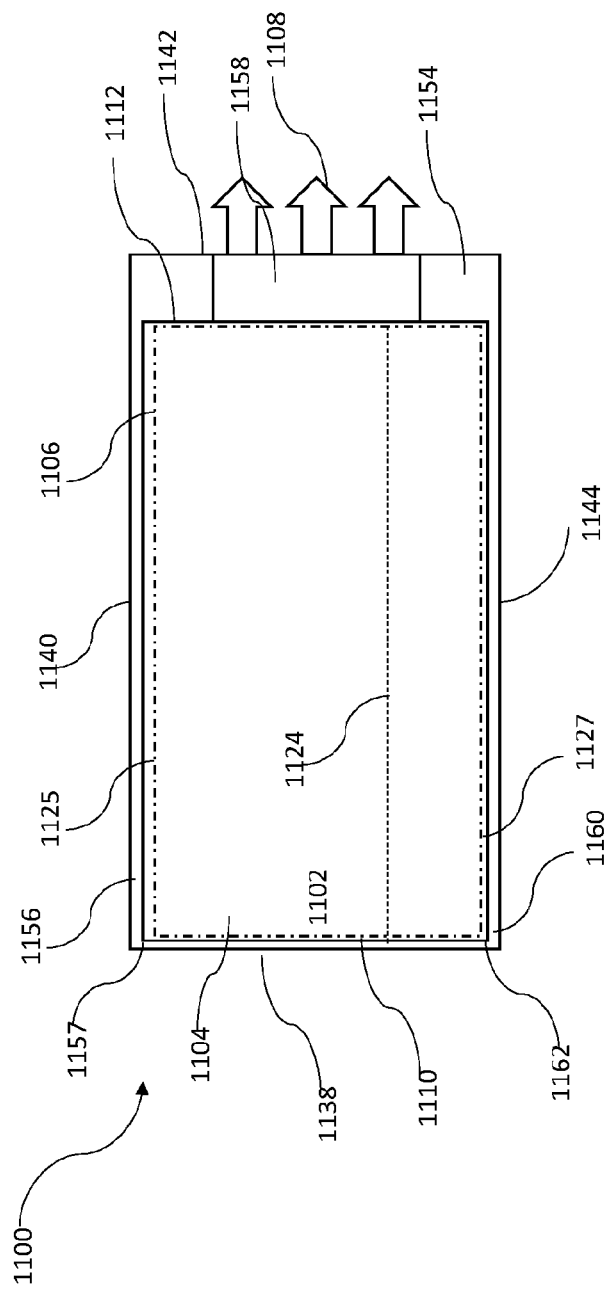
FIG. 79 is a top view of a storage bag in accordance with some embodiments herein.

FIG. 79 depicts a storage bag 1100, according to some embodiments of the present disclosure. In some embodiments, the storage bag 1100 is a cryopreservation bag. The storage bag 1100 includes a composite tube 1102 defining a compartment 1106 therein, and a composite sheet 1104. In some embodiments, the storage bag 1100 includes at least one sealable port 1108 such that the port 1108 is in fluid communication with the compartment 1106 of the composite tube 1102.

Figure 80:
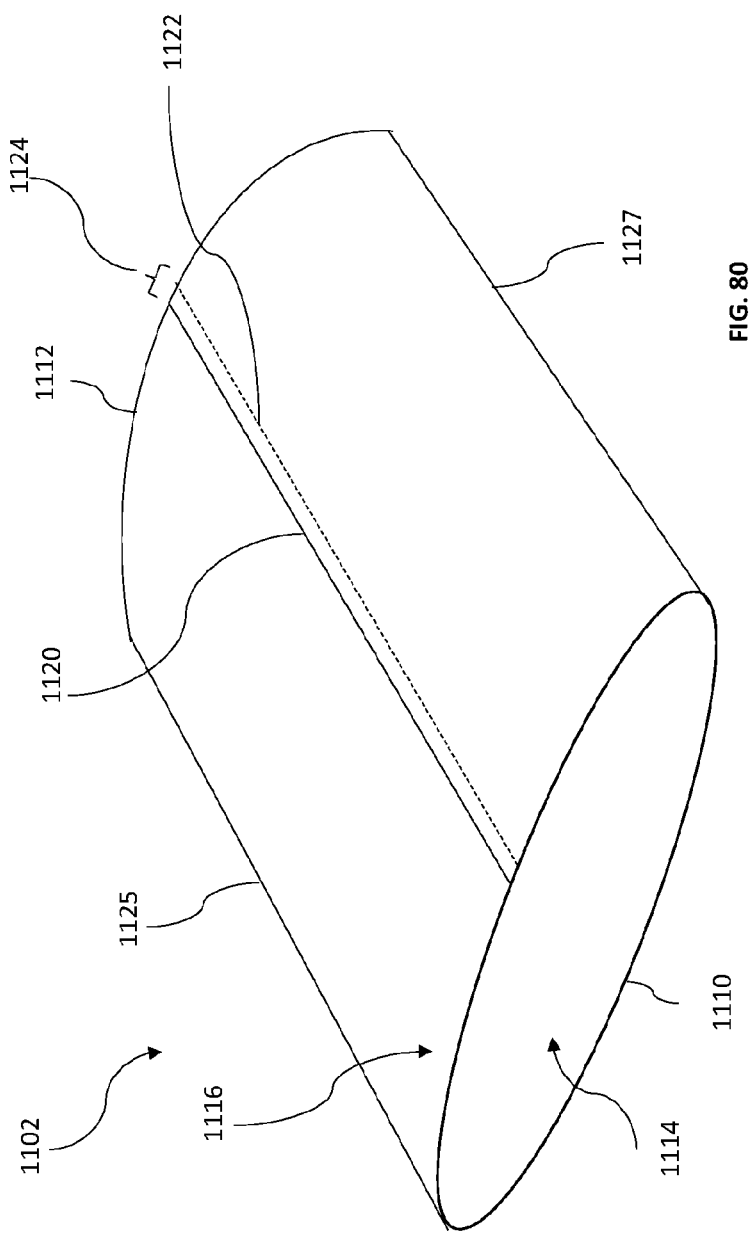
FIG. 80 is a perspective view of the composite tube of the storage bag in accordance with some embodiments herein.

In some embodiments, the composite tube 1102 extends from a first open end 1110 to a second open end 1112, as depicted in FIG. 80. In some embodiments, the composite tube 1102 defines an inner surface 1114, which faces the compartment 1106, and an outer surface 1116, which faces composite sheet 1104, as will be described in further detail below.

Figure 81:
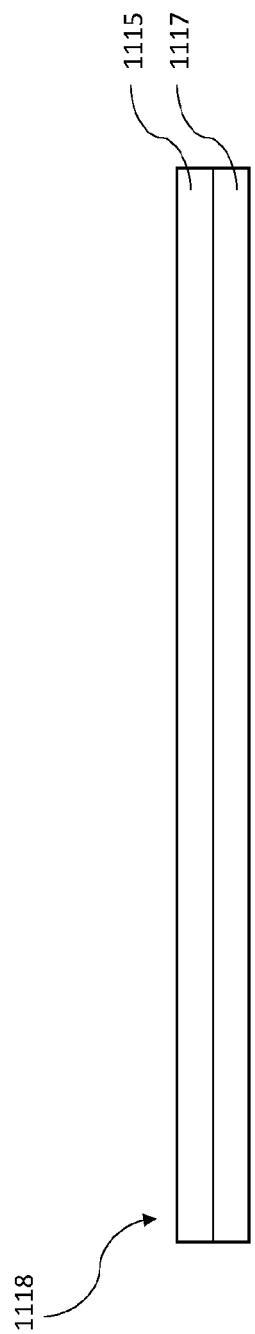
FIG. 81 is a cross-sectional view of a composite sheet of the composite tube in accordance with some embodiments herein.

In some embodiments, the composite tube 1102 is formed from a composite sheet 1118. In an embodiment, the composite sheet includes a first polymer 1115 and a second polymer 1117, as depicted in FIG. 81. In some embodiments, the first polymer 1115 is a higher melting polymer and the second polymer 1117 is a lower melting polymer. In some embodiments, the first polymer 1115 and the second polymer 1117 of the composite tube 1102 are formed from any of the materials listed above with regard to the composite sheet 118.

In some embodiments, the composite tube 1102 is formed by creating a tube from the composite sheet 1118, as illustrated in FIG. 80, such that the inner surface 1114 is the first polymer 1115 of the composite sheet 1118 and the outer surface 1116 is the second polymer 1117 of the composite sheet 1118. Thus, when the composite tube 1102 is formed, the outer surface 1116 of the composite tube 1102 is the lower melting polymer 1117 and the inner surface 1114 is the higher melting polymer 1115. In some embodiments, the composite tube 1102 is formed by overlapping a first lateral edge 1120 of the composite sheet 1118 over a second lateral edge 1122 of the composite sheet 1118 such that the inner surface 1114 overlaps a portion of the outer surface 1116, as depicted in FIG. 80. The higher melting polymer of the inner surface 1114 and the lower melting polymer of the outer surface 1116 are then heat sealed together such that the lower melting polymer bonds with the higher melting polymer, creating a lap seam 1124. In some embodiments, formation of the composite tube 1102 produces a first tube side 1125 and a second tube side 1127.

Figure 83:
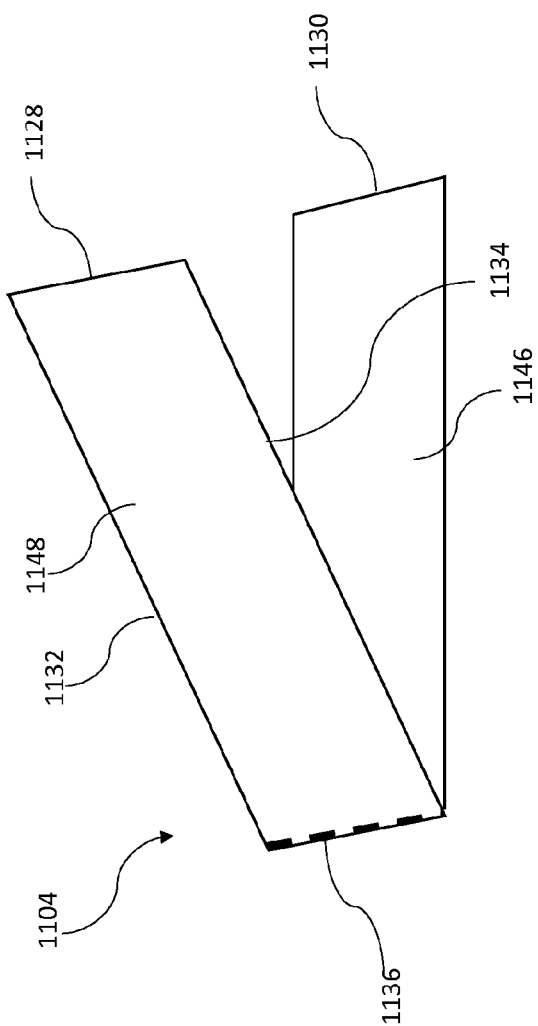
FIG. 83 is a perspective view of the folded composite sheet of the storage bag in accordance with some embodiments herein.

In some embodiments, the composite sheet 1104 extends from a first end 1128 to a second end 1130 and from a first side 1132 to a second side 1134, as depicted in FIG. 83. In some embodiments, the composite sheet 1104 is folded along a fold line 1136 such that the first side 1132 and the second side 1134 of the composite sheet 1104 are aligned and the first end 1128 and the second end 1130 are aligned. The folded composite sheet 1104 thus defines a folded side 1138 and three open sides 1140, 1142, 1144, as depicted in FIG. 79. In some embodiments, the folded composite sheet 1104 defines an inner surface 1146, which faces the composite tube 1102, and an outer surface 1148, which faces an exterior of the storage bag 1100.

Figure 82:
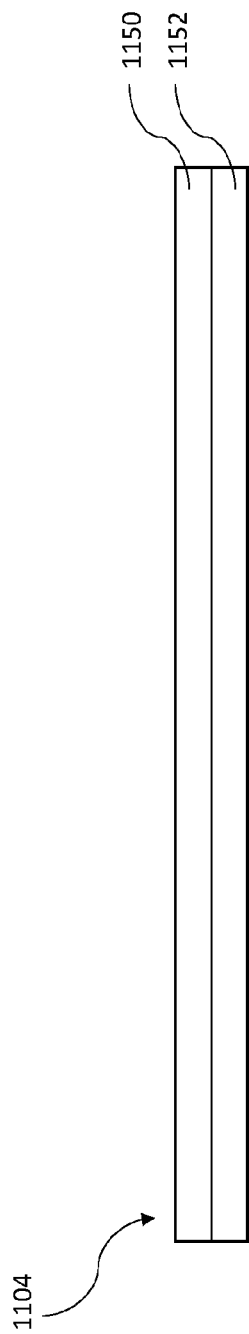
FIG. 82 is a cross-sectional view of a composite sheet of the storage bag in accordance with some embodiments herein.

In an embodiment, the composite sheet 1104 includes a first polymer 1150 and a second polymer 1152, as depicted in FIG. 82. In some embodiments, the first polymer 1150 is a lower melting polymer and the second polymer 1152 is a higher melting polymer. In some embodiments, the composite sheet 1104 is folded such that the inner surface 1146 is the first polymer 1150 and the outer surface 1148 is the second polymer 1152. Thus, when the composite sheet 1104 is in the folded configuration, the outer surface 1148 of the folded composite sheet 1104 is the higher melting polymer and the inner surface 1146 is the lower melting polymer. In some embodiments, the first polymer 1150 and the second polymer 1152 of the composite sheet 1104 are formed from any of the materials listed above with regard to the composite sheet 118.

In some embodiments, as depicted in FIG. 79, the composite sheet 1104 is folded over the first open end 1110 of the composite tube 1102 such that the first end 1128 of the composite sheet 1104 and the second end 1130 of the composite sheet 1104 are aligned and such that a portion of the lower melting polymer of the inner surface 1146 of the folded composite sheet 1104 is adjacent to the lower melting polymer of the outer surface 1116 of the composite tube 1102. In other embodiments, the composite sheet 1104 is folded over the first tube side 1125. In other embodiments, the composite sheet is folded over the second tube side 1127. In some embodiments, when the folded composite sheet 1104 is positioned over the composite tube 1102, a first extension portion 1154 of the folded composite sheet 1104, comprising the first end 1128 and the second end 1130 of the composite sheet 1104, extends past the second open end 1112 of the composite tube 1102, as depicted in FIG. 79.

In some embodiments, when the composite sheet 1104 is positioned over the composite tube 1102, a second extension portion 1156 of the folded composite sheet 1104 extends past the composite tube 1102 near a first corner 1157 of the first open end 1110 so as to seal the first corner 1157. In some embodiments, the second extension portion 1156 extends the entire length of the storage bag 1100 from the first open end 1110 to the second open end 1112. In some embodiments, the second extension portion 1156 is positioned near the first open end 1110 and does not extend to the second open end 1112. In some embodiments, when the composite sheet 1104 is positioned over the composite tube 1102, a third extension portion 1160 of the folded composite sheet 1104 extends past the composite tube 1102 near a second corner 1162 of the first open end 1110 so as to seal the first corner 1162. In some embodiments, the third extension portion 1160 extends the entire length of the storage bag 1100 from the first open end 1110 to the second open end 1112. In some embodiments, the third extension portion 1160 is positioned near the first open end 1110 and does not extend to the second open end 1112.

The storage bag 1100 is sealed by bonding the lower melting polymer of the inner surface 1146 of the folded composite sheet 1104 to the lower melting polymer of the outer surface 1116 of the composite tube 1102. Additionally, the extension portion 1154 is at least partially bonded to itself.

In some embodiments, the sealable port 1108 is inserted into the extension portion 1154. The sealable port 1108 includes an insertion portion 1158 formed of a lower melting polymer. The lower melting polymer of the inner surface 1146 of the folded composite sheet 1104 is bonded (i.e., through heat sealing) to the lower melting polymer of the insertion portion 1158 of sealable port 1108 to seal the extension portion 1154, and the storage bag 1100. Thus, the storage bag 1100 is completely sealed through the bonding of lower melting polymers to lower melting polymers, except for at the lap seam 1124, creating a stronger bond than a bond between two different materials (i.e., a lower melting polymer and a higher melting polymer), and reducing potential fracture and leakage of the storage bag 1100.

Figure 84:
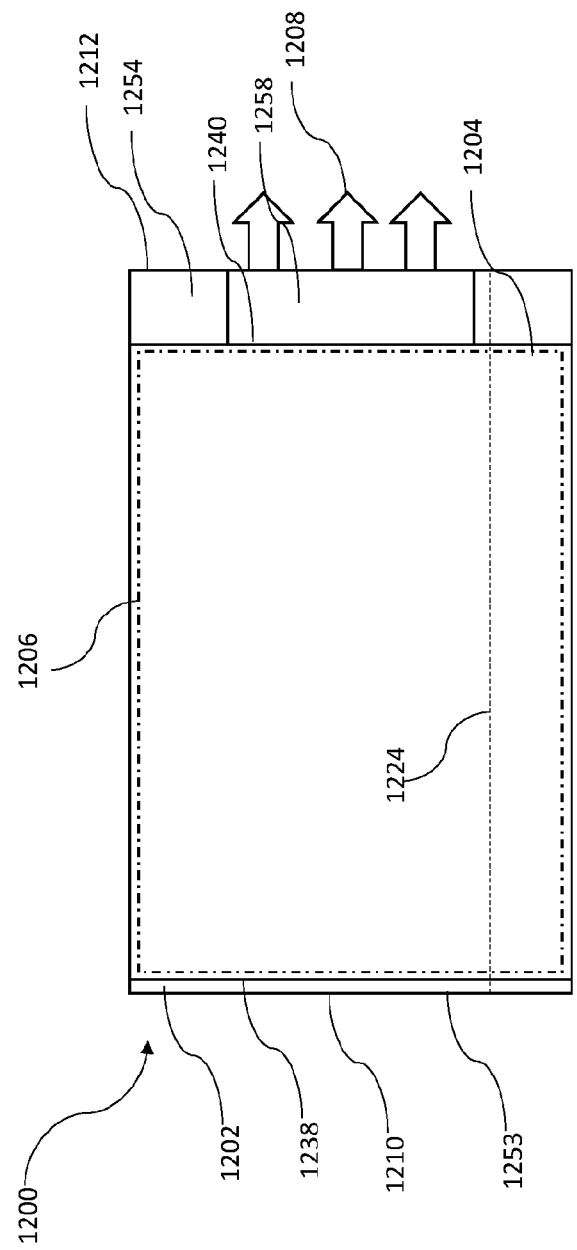
FIG. 84 is a top view of a storage bag in accordance with some embodiments herein.

FIG. 84 depicts a storage bag 1200, according to some embodiments of the present disclosure. In some embodiments, the storage bag 1200 is a cryopreservation bag. The storage bag 1200 includes a composite tube 1202, defining a compartment 1206 therein, and a composite sheet 1204. In some embodiments, the storage bag 1200 includes at least one sealable port 1208 such that the port 1208 is in fluid communication with the compartment 1206 of the composite tube 1202.

In some embodiments, the composite tube 1202 extends from a first open end 1210 to a second open end 1212, as depicted in FIG. 84. In some embodiments, the composite tube 1202 defines an inner surface 1214, which faces the composite sheet 1204, and an outer surface 1216, which faces an exterior of the storage bag 1200, as will be described in further detail below.

Figure 85:
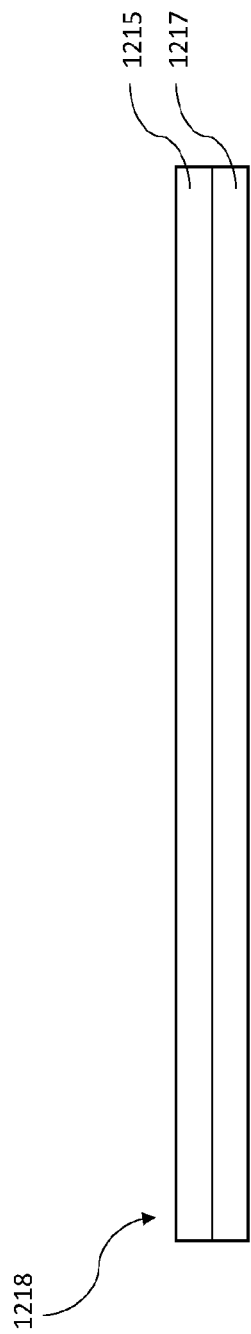
FIG. 85 is a cross-sectional view of a composite sheet of a composite tube of the storage bag in accordance with some embodiments herein.

In some embodiments, the composite tube 1202 is formed from a composite sheet 1218. In an embodiment, the composite sheet 1218 includes a first polymer 1215 and a second polymer 1217, as depicted in FIG. 85. In some embodiments, the first polymer 1215 is a lower melting polymer and the second polymer 1217 is a higher melting polymer. In some embodiments, the first polymer 1215 and the second polymer 1217 of the composite tube 1202 are formed from any of the materials listed above with regard to the composite sheet 118.

Figure 86:
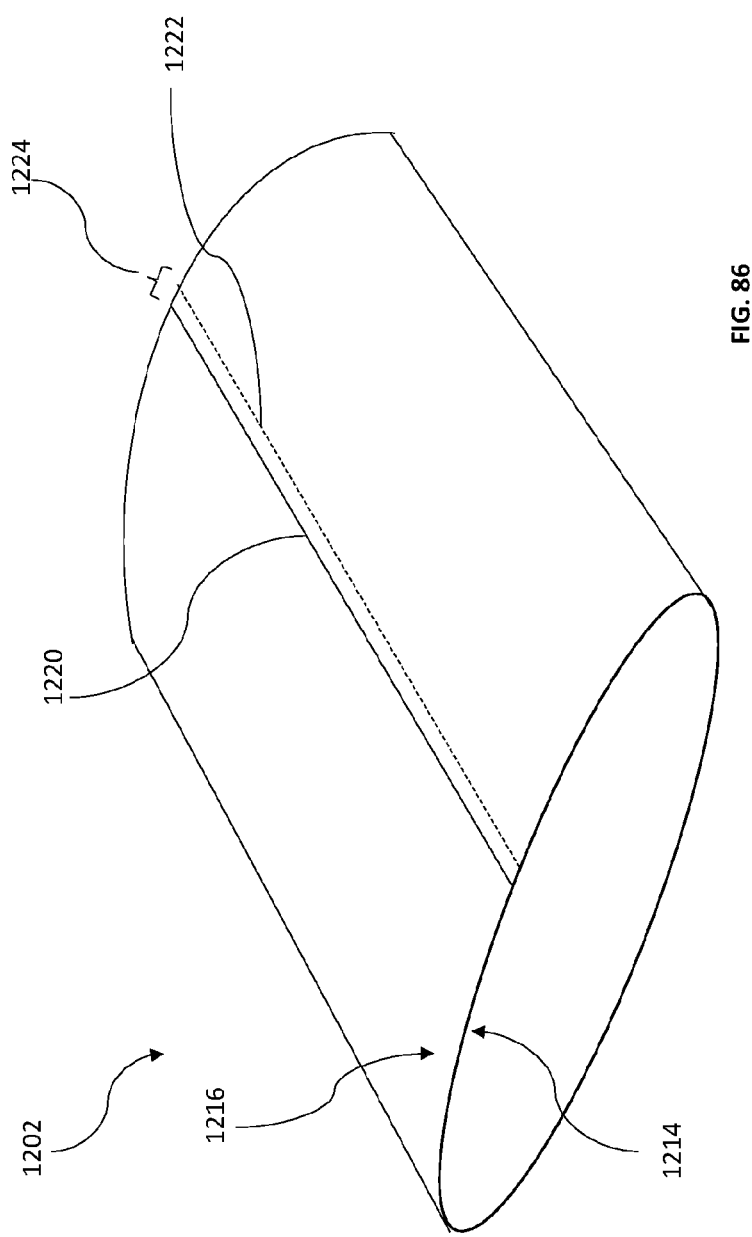
FIG. 86 is a perspective view of the composite tube of the storage bag in accordance with some embodiments herein.

In some embodiments, the composite tube 1202 is formed by creating a tube from the composite sheet 1218, as illustrated in FIG. 86, such that the inner surface 1214 is the first polymer 1215 of the composite sheet 1218 and the outer surface 1216 is the second polymer 1217 of the composite sheet 1218. Thus, when the composite tube 1202 is formed, the outer surface 1216 of the composite tube 1202 is the higher melting polymer 1217 and the inner surface 1214 is the lower melting polymer 1215. In some embodiments, the composite tube 1202 is formed by overlapping a first lateral edge 1220 of the composite sheet 1218 over a second lateral edge 1222 of the composite sheet 1218 such that the inner surface 1214 overlaps a portion of the outer surface 1216, as depicted in FIG. 86. The lower melting polymer of the inner surface 1214 and the higher melting polymer of the outer surface 1216 are then heat sealed together such that the lower melting polymer bonds with the higher melting polymer, creating a lap seam 1224.

Figure 87:
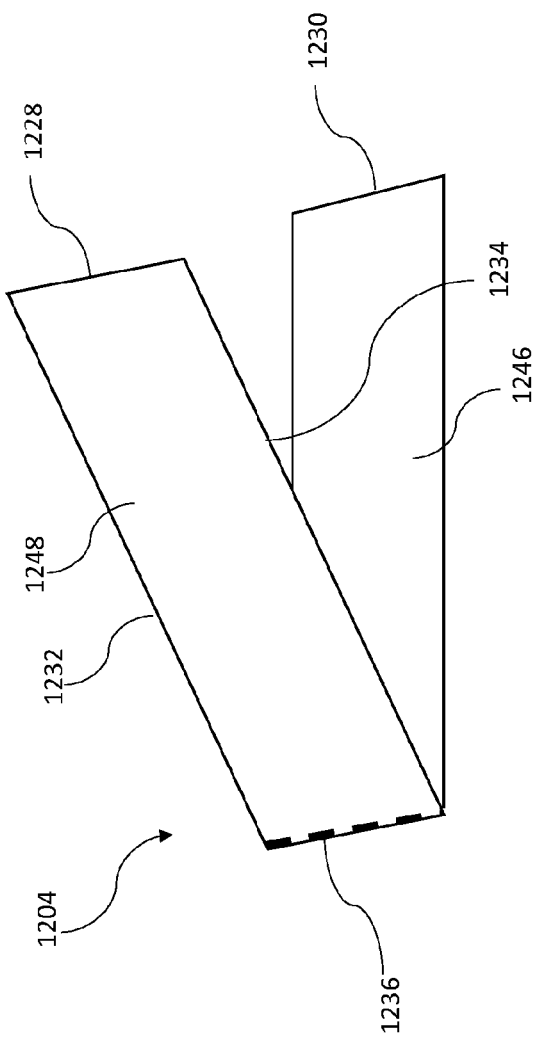
FIG. 87 is a perspective view of the folded composite sheet of the storage bag in accordance with some embodiments herein.

In some embodiments, the composite sheet 1204 extends from a first end 1228 to a second end 1230 and from a first side 1232 to a second side 1234, as depicted in FIG. 87. In some embodiments, the composite sheet 1204 is folded along a fold line 1236 such that the first side 1232 and the second side 1234 of the composite sheet 1204 are aligned and the first end 1228 and the second end 1230 are aligned. The folded composite sheet 1204 thus defines a folded end 1238 and an opposing second end 1240, as depicted in FIG. 84. In some embodiments, the folded composite sheet 1204 defines an inner surface 1246, which faces the compartment 1206, and an outer surface 1248, which faces the composite tube 1202.

Figure 88:
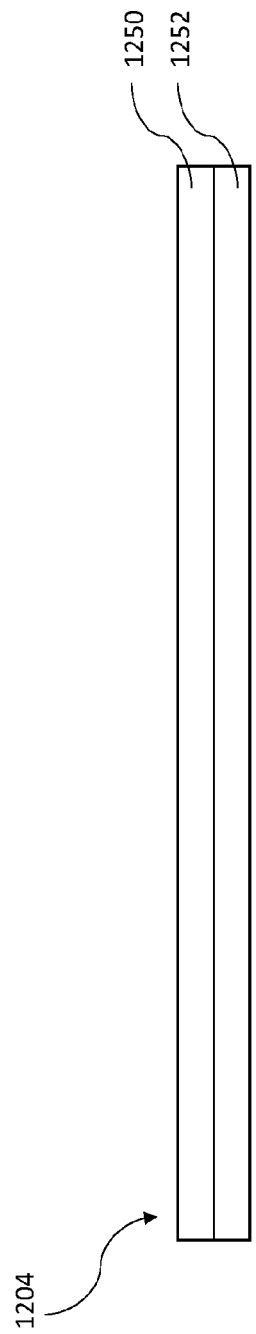
FIG. 88 is a cross-sectional view of a composite sheet of the storage bag in accordance with some embodiments herein.

In an embodiment, the composite sheet 1204 includes a first polymer 1250 and a second polymer 1252, as depicted in FIG. 88. In some embodiments, the first polymer 1250 is a higher melting polymer and the second polymer 1252 is a lower melting polymer. In some embodiments, the composite sheet 1204 is folded such that the inner surface 1246 is the first polymer 1250 and the outer surface 1248 is the second polymer 1252. Thus, when the composite sheet 1204 is in the folded configuration, the outer surface 1248 of the folded composite sheet 1204 is the lower melting polymer and the inner surface 1246 is the higher melting polymer. In some embodiments, the first polymer 1250 and the second polymer 1252 of the composite sheet 1204 are formed from any of the materials listed above with regard to the composite sheet 118.

In some embodiments, as depicted in FIG. 84, the folded composite sheet 1204 is positioned within the composite tube 1202 such that the folded end 1238 is adjacent to the first open end 1210 of the composite tube 1202. Thus, when the folded composite sheet 1204 is positioned within the composite tube 1202, the lower melting polymer of the inner surface 1214 of the composite tube 1202 is adjacent to the lower melting polymer of the outer surface 1248 of the composite sheet 1204. In some embodiments, when the folded composite sheet 1204 is positioned within the composite tube 1202, a first extension portion 1253 of the composite tube 1202, comprising the first open end 1210 of the composite tube 1202, extends past the folded end 1238 of the folded composite sheet 1204, as depicted in FIG. 84. In some embodiments, when the folded composite sheet 1204 is positioned within the composite tube 1202, a second extension portion 1254 of the composite tube 1202, comprising the second open end 1212 of the composite tube 1202, extends past the second end 1240 of the folded composite sheet 1204, as depicted in FIG. 84.

The storage bag 1200 is sealed by bonding the lower melting polymer of the outer surface 1248 of the folded composite sheet 1204 to the lower melting polymer of the inner surface 1214 of the composite tube 1202. Additionally, first extension portion 1253 is bonded to itself and the second extension portion 1254 is at least partially bonded to itself.

In some embodiments, the sealable port 1208 is inserted into the unsealed portion of the extension portion 1254. The sealable port 1208 includes an insertion portion 1258 formed of a lower melting polymer. The lower melting polymer of the inner surface 1214 of the composite tube 1202 is bonded (i.e., through heat sealing) to the lower melting polymer of the insertion portion 1258 of sealable port 1208 to seal the extension portion 1254, and the storage bag 1200. Thus, the storage bag 1200 is completely sealed through the bonding of lower melting polymers to lower melting polymers, except for at the lap seam 1224, creating a stronger bond than a bond between two different materials (i.e., a lower melting polymer and a higher melting polymer), and reducing potential fracture and leakage of the storage bag 1200.

Figure 89:
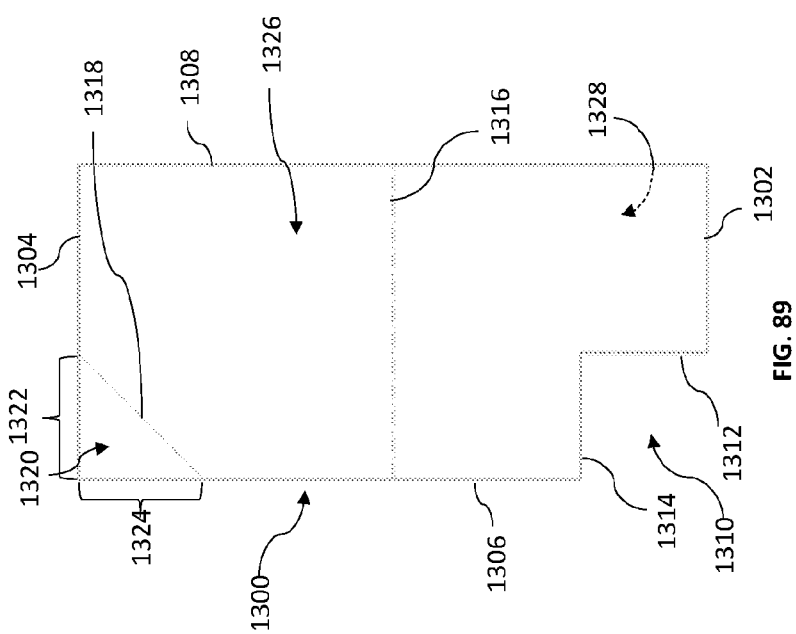
FIG. 89 is a top view of an unfolded inner composite sheet of the storage bag in accordance with some embodiments herein.

In some embodiments, as depicted in FIG. 89, an inner composite sheet 1300 extends from a first end 1302 to a second end 1304 and from a first side 1306 to a second side 1308. In some embodiments, the inner composite sheet 1300 includes a cutout 1310 formed by a first cut edge 1312 extending from the first end 1302 toward the second end 1304 and a second cut edge 1314 extending from the first side 1306 toward the second side 1308. In some embodiments, the first cut edge 1312 and the second cut edge 1314 have the same length such that the cutout 1310 has a square shape. In some embodiments, the inner composite sheet 1300 defines a first fold line 1316 extending perpendicularly from the first side 1306 to the second side 1308. In some embodiments, the first fold line 1316 is positioned intermediate the first end 1302 and the second end 1304 so as to divide the inner sheet into two equal halves. In some embodiments, the inner composite sheet 1300 defines a second fold line 1318 extending diagonally from the first side 1306 toward the second end 1304. In some embodiments, the second fold line 1318 is positioned and oriented so as to define a right isosceles triangular corner region 1320 having first and second sides 1322 and 1324 having a length that is the same as the length of the first cut edge 1312 and the second cut edge 1314. In some embodiments, the inner composite sheet 1300 includes a first polymer 1326 and a second polymer 1328, as depicted in FIG. 89. In some embodiments, the first polymer 1326 is a higher melting polymer and the second polymer 1328 is a lower melting polymer. In some embodiments, the first polymer 1326 and the second polymer 1328 of the inner composite sheet 1300 are formed from any of the materials listed above with regard to the composite sheet 118.

Figure 90:
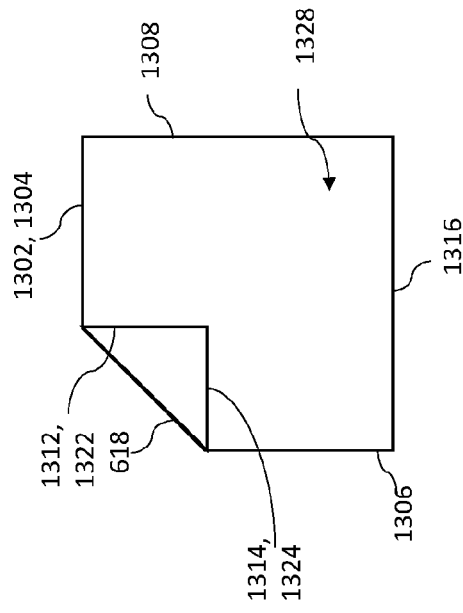
FIG. 90 is a top view of the folded inner composite sheet of the storage bag in accordance with some embodiments herein.

In some embodiments, formation of a storage bag including the inner composite sheet 1300 includes folding the inner composite sheet 1300. FIG. 90 shows the inner composite sheet 1300 as folded. In some embodiments, folding the inner composite sheet 1300 includes folding the inner composite sheet 1300 in half along the first fold line 1316 such that the first polymer 1326 faces inward and such that the first end 1302 aligns with the second end 1304. In some embodiments, folding the inner composite sheet 1300 includes folding the corner region 1320 toward the cutout 1310 along the second fold line 1318 such that the first side 1322 of the corner region 1320 abuts, but does not overlap, the first cut edge 1312, and such that the second side 1324 of the corner region 1320 abuts, but does not overlap, the second cut edge 1314. In some embodiments, as a result of such folding, the first polymer 1326 contacts itself on the inside of the folded inner composite sheet 1300, and the second polymer 1328 faces outward.

In some embodiments, as depicted in FIG. 91, an outer composite sheet 1340 extends from a first end 1342 to a second end 1344 and from a first side 1346 to a second side 1348. In some embodiments, the outer composite sheet 1340 defines a first fold line 1350 extending perpendicularly from the first end 1342 to the second end 1344 and positioned approximately intermediate the first side 1346 and the second side 1348. In some embodiments, the outer composite sheet 1340 defines a second fold line 1352 extending perpendicularly from the first end 1342 to the second end 1344 and positioned proximate to the first side 1346. In some embodiments, the first and second fold lines 1350 and 1352 subdivide the outer composite sheet 1340 into three regions: (1) a first region 1354 bounded by the first side 1346, the second end 1344, the second fold line 1352, and the first end 1342; (2) a second region 1356 bounded by the second fold line 1352, the second end 1344, the first fold line 1350, and the first end 1342; and (3) a third region 1358 bounded by the first fold line 1350, the second end 1344, the second side 1348, and the first end 1342. In some embodiments, the first and second fold lines 1350 and 1352 are positioned such that the area of the second region 1356 is equal to the sum of the respective areas of the first region 1354 and the third region 1358. In some embodiments, the outer composite sheet 1340 includes a first polymer 1360 and a second polymer 1362, as depicted in FIG. 91. In some embodiments, the first polymer 1360 is a lower melting polymer and the second polymer 1362 is a higher melting polymer. In some embodiments, the first polymer 1360 and the second polymer 1362 of the outer composite sheet 1340 are formed from any of the materials listed above with regard to the composite sheet 118.

In some embodiments, formation of a storage bag including the outer composite sheet 1340 includes folding the outer composite sheet 1340. FIG. 92 shows the outer composite sheet 1340 as folded. In some embodiments, folding the outer composite sheet 1340 includes folding the outer composite sheet 1340 along the first fold line 1350 and along the second fold line 1352 such that the first polymer 1360 faces inward so as to contact itself and such that the second polymer 1362 faces outward. In some embodiments, folding the outer composite sheet 1340 includes folding the first side 1346 and the second side 1348 toward one another such that the first side 1346 and the second side 1348 abut, but do not overlap, one another. In some embodiments, as a result of such folding, the first polymer 1360 contacts itself on the inside of the folded outer composite sheet 1340, and the second polymer 1362 faces outward.

In some embodiments, as shown in FIG. 93, a storage bag 1370 is formed from the folded inner composite sheet 1300 as shown in FIG. 90 and the folded outer composite sheet 1340 as shown in FIG. 92. In some embodiments, the storage bag 1370 is formed by positioning the folded inner composite sheet 1300 within the folded outer composite sheet 1340. In some embodiments, a first side 1372 of the bag 1370 is defined by the second fold line 1352 of the outer composite sheet 1340 enclosing the first side 1306 of the inner composite sheet 1300. In some embodiments, a second side 1373 of the bag 1370 is defined by the first fold line 1350 of the outer composite sheet 1340 enclosing the second side 1308 of the inner composite sheet 1300. In some embodiments, the outer composite sheet 1340 is sized and shaped such that, when positioned over the inner composite sheet 1300 as shown in FIG. 93, the first end 1342 of the outer composite sheet 1340 extends past the first fold line 1316 of the inner composite sheet 1300 to define a first extension portion 1374. In some embodiments, the outer composite sheet 1340 is sized and shaped such that, when positioned over the inner composite sheet 1300 as shown in FIG. 93, the second end 1344 of the outer composite sheet 1340 extends past the second fold line 1318 of the inner composite sheet 1300 and past the aligned first and second ends 1302, 1304 of the inner composite sheet to define a second extension portion 1376.

In some embodiments, the inner facing surfaces (e.g., formed by the first polymer 1360 that is a lower melting polymer) of the portion of the outer composite sheet 1340 located in the first extension portion 1374 are sealed to one another and to first fold line 1316 (e.g., through heat sealing) to thereby produce a fin seam that forms a bottom end 1378 of the bag that is enclosed and sealed. In some embodiments, the inner facing surfaces (e.g., formed by the first polymer 1360 that is a lower melting polymer) of the portion of the outer composite sheet 1340 extending between the second fold line 1352 of the outer composite sheet 1340 and the first fold line 1350 of the outer composite sheet 1340 are sealed to the outer facing surfaces (e.g., formed by the second polymer 1328 that is a lower melting polymer) of the inner composite sheet 1300 extending between first side 1306 of the inner composite sheet 1300 and the second side 1308 of the inner composite sheet 1300 (e.g., through heat sealing) to thereby cause the first side 1372 and the second side 1373 of the bag to be enclosed and sealed.

In some embodiments, portions of the inner facing surfaces of the outer composite sheet 1340 (e.g., formed by the first polymer 1360 that is a lower melting polymer) located in the second extension portion 1376 are sealed to one another (e.g., through heat sealing) to produce a fin seam that seals a portion 1380 of the second extension portion 1376. In some embodiments, portions of the inner facing surfaces of the outer composite sheet 1340 (e.g., formed by the first polymer 1360 that is a lower melting polymer) located in the second extension portion 1376 are not sealed to one another to form an unsealed portion 1382 of the second extension portion 1376.

In some embodiments, the storage bag 1370 includes a sealable port 1382. In some embodiments, the sealable port 1382 is inserted the second extension portion 1376, as depicted in FIG. 93. In some embodiments, the sealable port 1382 includes an insertion portion 1384 formed of a lower melting polymer. In some embodiments, the first polymer 1360 (e.g., a lower melting polymer) at the inner surface of the second extension portion 1376 is sealed (e.g., through heat sealing) to the lower melting polymer of the insertion portion 1384 of sealable port 1382 to seal the second extension portion 1376, thereby sealing an entire perimeter of the storage bag 1370. Thus, the storage bag 1370 is completely sealed through the bonding of lower melting polymers to lower melting polymers, creating a stronger bond than a bond between two different materials (i.e., a lower melting polymer and a higher melting polymer), and reducing potential fracture and leakage of the storage bag 1370.

In some embodiments, the abutting but unsealed opposing first and second sides 1346, 1348 of the outer composite sheet 1340 are positioned on a first surface of the storage bag 1370 (e.g., the surface facing toward the view perspective of FIG. 93). In some embodiments, the abutting but unsealed edges 1312, 1314, 1322, 1324 of the inner composite sheet 1300 are positioned on a second surface of the storage bag 1370 (e.g., the surface facing away from the view perspective of FIG. 93). Thus, in some embodiments, the unsealed edges of the outer composite sheet 1340 do not overlay the unsealed edges of the inner composite sheet 1300, so as not to inhibit full enclosure of the storage bag 1370.

In some embodiments, the storage bag 1370 does not include overlaps of the inner composite sheet 1300 or the outer composite sheet 1340. In some embodiments, the lack of overlap within a single sheet in the storage bag 1370 improves flexibility of the storage bag 1370. In some embodiments, the lack of overlap within a single sheet in the storage bag 1370 improves visibility of material stored within the storage bag 1370.

In some embodiments, as shown in FIG. 94, a storage bag 1390 is formed from an inner composite sheet 1392 and an outer composite sheet 1394 in a manner substantially identical to the discussion of the storage bag 1370 described above with reference to FIG. 93. In some embodiments, the outer composite sheet 1394 is sized so as to produce a first extension portion 1396 that extends past the inner composite sheet 1392 by a distance that is further than that necessary to seal the storage bag 1390. In some embodiments, the first extension portion 1396 includes a label pocket. In some embodiments, the inner-facing surfaces of the outer composite sheet 1394 in the first extension portion 1396 (e.g., formed by the first polymer 1360 that is a lower melting polymer) are sealed to one another along the abutting first and second sides 1346, 1348 of the outer composite sheet 1394, thereby producing a label pocket 1398 that is not the full width of the first extension portion 1396.

The storage bags of the present disclosure may be used to store and/or transport different therapeutic compounds including, but not limited to, drugs and biologics such as Coagulation Factors, Cytokines, Epigenetic protein families, Growth Factors, Hormones, Peptides, Signal Transduction molecules, and mutations thereof; also including Amino Acids, Vaccines and/or combinations thereof. Therapeutic compounds further include antibodies, antisense, and RNA interference made to the above biologics, and their target receptors and mutations thereof as well as viral and non-viral vectors and combinations thereof. The viral vectors and non-viral vectors may contain genetic material (e.g., DNA or RNA). Additional therapeutic compounds include, but are not limited to, materials used in Gene Therapy, and Primary and Embryonic Stem Cells, and other cell types including, but not limited to, T-cells. Also included in the therapeutic compounds are antibodies, antisense, RNA interference to Protein Kinases, Esterases, Phosphatases, Ion channels, Proteases, structural proteins, membrane transport proteins, nuclear hormone receptors, ribonucleotide, oligoribonucleotide, polyribonucleotide, and combinations thereof. Additionally, it is to be understood that at least one of the therapeutic compounds identified herein is meant to include one therapeutic compound or two or more therapeutic compounds listed in this disclosure and are considered to be within the purview of the present disclosure.

In another embodiment, the terms "ribonucleotide," "oligoribonucleotide," and polyribonucleotide refers to a string of at least 2 base-sugar-phosphate combinations. The term includes, in another embodiment, compounds comprising nucleotides in which the sugar moiety is ribose. In another embodiment, the term includes both RNA and RNA derivates in which the backbone is modified. RNA may be, in another embodiment, in the form of a tRNA (transfer RNA), snRNA (small nuclear RNA), rRNA (ribosomal RNA), mRNA (messenger RNA), anti-sense RNA, small inhibitory RNA (siRNA), micro RNA (miRNA) and ribozymes. In addition, these forms of RNA may be single, double, triple, or quadruple stranded. The term also includes, in another embodiment, artificial nucleic acids that may contain other types of backbones but the same bases.

Examples of viral vectors include but are not limited to, AAV (such as AAV-MeCP2; AAV1; AAV5; Dual AAV9; AAV8, AAV9; AAVrh10, and AAVhu37); Adenovirus (such as Ad-SYE; AdSur-SYE; Ad5/3-MDA7/IL-24; Ad-SB; Ad-CRISPR; and oncolytic Ad); Alphaviruses (such as SFV; and M1); Flaviviruses (such as Kunjin; West Nile; and Dengue virus); Herpes simplex (such as HSV; HSV1; HSV2; HSV-1; HF10; and Oncolytic HSV-2); Lentiviruses (such as HIV-1; and HIV-2); Measles virus (such as MV-Edm); Newcastle disease virus (NDV) (such as NDV90; and NDV Anhinga); Picornaviruses (such as Coxsackievirus; CVB3; CAV21; and EV1); Poxviruses (such as PANVAC; VV; VV-GLV-1h153; and CPXV); Retroviruses (such as GRV); Rhabdoviruses (such as VSV). Additional viral vectors that could be used in combination with the storage bags of this disclosure include viral vectors in clinical trials, such as, for example, AAV-FVIII/FIX; Lenti-FVIII; Lenti-FIX; Enadenotucirev; HSV HF10; HSV HF10; Toca 511; Toca 511/FC; HSV G207; HSV G207; Gamma RV; MV-NIS; Oncolytic VV; LipoSFV-IL12; PANVAC-VF; NDV-TAA; VEE-PSMA; CVA21; CVA21+PLMab; LipoSFV-IL12; NDV PV701; and Lenti-hCEF-CT.

Examples of Coagulation Factors include, but are not limited to: Fibrinogen, Prothrombin, Factor I, Factor V, Factor X, Factor VII, Factor VIII, Factor XI, Factor XIII, Protein C, Platelets, Thromboplastin, and Co-factor of Vila.

Examples of Cytokines include, but are not limited to: Lymphokines, Interleukins, Chemokines, Monokines, Interferons, and Colony stimulating factors.

Examples of Epigenetic protein families include, but are not limited to: ATPase family AAA domain-containing protein 2 (ATAD2A), ATPase family-AAA domain containing 2B (ATAD2B), ATPase family AAA domain containing-2B (ATAD2B), bromodomain adjacent to zinc finger domain-1A (BAZ1A), bromodomain adjacent to zinc finger domain-1B (BAZ1B), bromodomain adjacent to zinc finger domain-2A (BAZ2A), bromodomain adjacent to zinc finger domain-2A (BAZ2A), bromodomain adjacent to zinc finger domain-2B (BAZ2B), bromodomain-containing protein 1 (BRD1), Bromodomain containing protein 2-1st bromodomain (BRD2), Bromodomain containing protein 2-1st & 2nd bromodomains (BRD2), bromodomain-containing protein 2 isoform 1-bromodomain 2 (BRD2(2)), bromodomain-containing protein 3-bromodomain 1 (BRD3(1)), Bromodomain-containing protein 3-1st bromodomain (BRD3), Bromodomain-containing protein 3-1st & 2nd bromodomains (BRD3), bromodomain-containing protein 3-bromodomain 2 (BRD3(2)), Bromodomain containing protein 4-1st bromodomain (BRD4), bromodomain-containing protein 4 isoform long-bromodomains 1 and 2 (BRD4(1-2)), bromodomain-containing protein 4 isoform long-bromodomain 2 (BRD4(2)), bromodomain-containing protein 4 isoform short (BRD4(full-length-short-iso.)), Bromodomain containing protein 7 (BRD7), bromodomain containing 8-bromodomain 1 (BRD8(1)), bromodomain containing 8-bromodomain 2 (BRD8(2)), bromodomain-containing protein 9 isoform 1 (BRD9), Bromodomain containing testis-specific-1st bromodomain (BRDT), Bromodomain containing testis-specific-1st & 2nd bromodomains (BRDT), bromodomain testis-specific protein isoform b-bromodomain 2 (BRDT(2)), bromodomain and PHD finger containing-1 (BRPF1), bromodomain and PHD finger containing-3 (BRPF3), bromodomain and PHD finger containing-3 (BRPF3), Bromodomain and WD repeat-containing 3-2nd bromodomain (BRWD3(2)), Cat eye syndrome critical region protein 2 (CECR2), CREB binding protein (CREBBP), E1A binding protein p300 (EP300), EP300 (EP300), nucleosome-remodeling factor subunit BPTF isoform 1 (FALZ), Nucleosome-remodeling factor subunit BPT (FALZ), Euchromatic histone-lysine N-methyltransferase 2 (EHMT2), Histone Acetyltransferase-KAT2A (GCN5L2), Euchromatic histone-lysine N-methyltransferase 1 (EHMT1), Histone-lysine N-methyltransferase MLL (MLL), Polybromo 1-1st bromodomain (PB1(1)), Polybromo 1-2nd bromodomain (PB1(2)), polybromo 1-bromodomain 2 (PBRM1(2)), polybromo 1-bromodomain 5 (PBRM1(5)), Histone acetyltransferase KAT2B (PCAF), PH-interacting protein-1st bromodomain (PHIP(1)), PH-interacting protein-2nd bromodomain (PHIP(2)), Protein kinase C-binding protein 1 (PRKCBP1), Protein arginine N-methyltransferase 3 (PRMT3), SWI/SNF related-matrix associated-actin dependent regulator of chromatin-subfamily a-member 2 (SMARCA2), SWI/SNF related-matrix associated-actin dependent regulator of chromatin-subfamily a-member 4 (SMARCA4), Nuclear body protein-SP110 (SP110), Nuclear body protein-SP140 (SP140), Transcription initiation factor TFIID subunit 1 (TAF1(1-2)), TAF1 RNA polymerase II-TATA box binding protein (TBP)-associated factor-250 kDa-bromodomain 2 (TAF1(2)), Transcription initiation factor TFIID subunit 1-like-1st bromodomain (TAF1L(1)), Transcription initiation factor TFIID subunit 1-like-2nd bromodomain (TAF1 L(2)), tripartite motif containing 24 (TRIM24(Bromo.)), tripartite motif containing 24 (TRIM24(PHD-Bromo.)), E3 ubiquitin-protein ligase TRIM33 (TRIM33), tripartite motif containing 33 (TRIM33(PHD-Bromo.)), WD repeat 9-1st bromodomain (WDR9(1)), and WD repeat 9-2nd bromodomain (WDR9(2)).

Examples of growth factors include, but are not limited to: nerve growth factor (NGF), vascular endothelial growth factor (VEGF), platelet-derived growth factor (PDGF), C-fos-induced growth factor (FIGF), platelet-activating factor (PAF), transforming growth factor beta (TGF-β), bone morphogenetic proteins (BMPs), Activin, inhibin, fibroblast growth factors (FGFs), granulocyte-colony stimulating factor (G-CSF), granulocyte-macrophage colony stimulating factor (GM-CSF), glial cell line-derived neurotrophic factor (GDNF), growth differentiation factor-9 (GDF9), epidermal growth factor (EGF), transforming growth factor-α (TGF-α), growth factor (KGF), migration-stimulating factor (MSF), hepatocyte growth factor-like protein (HGFLP), hepatocyte growth factor (HGF), hepatoma-derived growth factor (HDGF), and Insulin-like growth factors.

Examples of Hormones include, but are not limited to: Amino acid derived (such as melatonin and thyroxine), Thyrotropin-releasing hormone, Vasopressin, Insulin, Growth Hormones, Glycoprotein Hormones, Luteinizing Hormone, Follicle-stimulating Hormone, Thyroid-stimulating hormone, Eicosanoids, Arachidonic acid, Lipoxins, Prostaglandins, Steroid, Estrogens, Testosterone, Cortisol, and Progestogens.

Examples of Proteins and Peptides and Signal Transduction molecules include, but are not limited to: Ataxia Telangiectasia Mutated, Tumor Protein p53, Checkpoint kinase 2, breast cancer susceptibility protein, Double-strand break repair protein, DNA repair protein RAD50, Nibrin, p53-binding protein, Mediator of DNA damage checkpoint protein, H2A histone family member X, Microcephalin, C-terminal-binding protein 1, Structural maintenance of chromosomes protein 1A, Cell division cycle 25 homolog A (CDC25A), forkhead box 03 (forkhead box 03), nuclear factor of kappa light polypeptide gene enhancer in B-cells inhibitor, alpha (NFKBIA), nuclear factor (erythroid-derived 2)-like 2 (NFE2L2), Natriuretic peptide receptor A (NPR1), Tumor necrosis factor receptor superfamily, member 11a (TNFRSF11A), v-rel reticuloendotheliosis viral oncogene homolog A (avian) (RELA), Sterol regulatory element binding transcription factor 2 (SREBF2), CREB regulated transcription coactivator 1 (CRTC1), CREB regulated transcription coactivator 2 (CRTC2), X-box binding protein 1 (XBP1), and Catenin beta 1 (cadherin-associated protein or CTNNB1).

Examples of G Protein-Coupled Receptors (GPCR) include, but are not limited to: Adenosine receptor family, Adrenergic receptor family, Angiotensin II receptor, Apelin receptor, Vasopressin receptor family, Brain-specific angiogenesis inhibitor family, Bradykinin receptor family, Bombesin receptor family, Complement component 3a receptor 1, Complement component 5a receptor 1, Calcitonin receptor family, Calcitonin receptor-like family, Calcium-sensing receptor, Cholecystokinin A receptor (CCK1), Cholecystokinin B receptor (CCK2), Chemokine (C-C motif) receptor family, Sphingosine 1-phosphate receptor family, Succinic receptor, Cholinergic receptor family. Chemokine-like receptor family, Cannabinoid receptor family, Corticotropin releasing hormone receptor family, prostaglandin D2 receptor, Chemokine C-X3-C receptor family, Chemokine (C-X-C motif) receptor family, Burkitt lymphoma receptor, Chemokine (C-X-C motif) receptor family, Cysteinyl leukotriene receptor 2 (CYSLT2), chemokine receptor (FY), Dopamine receptor family, G protein-coupled receptor 183 (GPR183), Lysophosphatidic acid receptor family, Endothelin receptor family, Coagulation factor II (thrombin) receptor family, Free fatty acid receptor family, Formylpeptide receptor family, Follicle stimulating hormone receptor (FSHR), gamma-aminobutyric acid (GABA) B receptor, Galanin receptor family, Glucagon receptor, Growth hormone releasing hormone receptor (GHRH), Ghrelin receptor (ghrelin), Growth hormone secretagogue receptor 1b (GHSR1b), Gastric inhibitory polypeptide receptor (GIP), Glucagon-like peptide receptor family, Gonadotropin-releasing hormone receptor (GnRH), pyroglutamylated RFamide peptide receptor (QRFPR), G protein-coupled bile acid receptor 1 (GPBA), Hydroxycarboxylic acid receptor family, Lysophosphatidic acid receptor 4 (LPA4) Lysophosphatidic acid receptor 5 (GPR92), G protein-coupled receptor 79 pseudogene (GPR79), Hydroxycarboxylic acid receptor 1 (HCA1), G-protein coupled receptor (C5L2, FFA4, FFA4, FFA4, GPER, GPR1, GPR101, GPR107, GPR119, GPR12, GPR123, GPR132, GPR135, GPR139, GPR141, GPR142, GPR143, GPR146, GPR148, GPR149, GPR15, GPR150, GPR151, GPR152, GPR157, GPR161, GPR162, GPR17, GPR171, GPR173, GPR176, GPR18, GPR182, GPR20, GPR22, GPR25, GPR26, GPR27, GPR3, GPR31, GPR32, GPR35, GPR37L1, GPR39, GPR4, GPR45, GPR50, GPR52, GPR55, GPR6, GPR61, GPR65, GPR75, GPR78, GPR83, GPR84, GPR85, GPR88, GPR97, TM7SF1), Metabotropic glutamate receptor family, Gastrin releasing peptide receptor (BB2), Orexin receptor family, Histamine receptor family, 5-hydroxytryptamine receptor family, KISS1-derived peptide receptor (kisspeptin), Leucine-rich repeat-containing G protein-coupled receptor family, horiogonadotropin receptor (LH), Leukotriene B4 receptor (BLT1), Adenylate Cyclase Activating Polypeptide 1 Receptor 1 (mPAC1), Motilin receptor, Melanocortin receptor family, Melanin concentrating hormone receptor 1 (MCH1), Neuropeptide Y1 receptor (Y1), Neuropeptide Y2 receptor (NPY2R), Opioid receptor family, Oxytocin recepter (OT), P2Y Purinoceptor 12 (mP2Y12), P2Y Purinoceptor 6 (P2Y6), Pancreatic polypeptide receptor family, Platelet-activating factor receptor family, Prostaglandin E receptor family, Prostanoid IP1 receptor (IP1), MAS-related GPR, member family, Rhodopsin (Rhodopsin), Relaxin family peptide receptor family, Somatostatin receptor family, Tachykinin receptor family, Melatonin receptor family, Urotensin receptor family, Vasoactive intestinal peptide receptor 1 (mVPAC1), Neuromedin B Receptor (BB1), Neuromedin U receptor 1 (NMU1), Neuropeptides B/W receptor family, Neuropeptide FF receptor 1 (NPFF1), neuropeptide S receptor 1 (NPS receptor), Neuropeptide Y receptor family, Neurotensin receptor 1 (NTS1), Opsin 5 (OPN5), Opioid receptor-like receptor (NOP), Oxoeicosanoid (OXE) receptor 1 (OXE), Oxoglutarate (alpha-ketoglutarate) receptor 1 (OXGR1), Purinergic receptor family, Pyrimidinergic receptor family, Prolactin releasing hormone receptor (PRRP), Prokineticin receptor family, Platelet activating receptor (PAF), Prostaglandin F receptor family, Prostaglandin I2 (prostacyclin) receptor family, Parathyroid hormone receptor family, muscarinic acetylcholine receptors (such as rM4), Prostanoid DP2 receptor (rGPR44), Prokineticin receptor family, Relaxin family peptide receptor family, Secretin receptor (secretin), Frizzled class receptor (Smoothened), trace amine associated receptor family, Tachykinin family, Thromboxane A2 receptor (TP), Thyrotropin-releasing hormone receptor (TRH1), and Thyroid Stimulating Hormone Receptor (TSH).

Examples of nuclear hormone receptors include, but are not limited to: Androgen receptor (AR), Estrogen related receptor alpha (ESRRA), Estrogen receptor 1 (ESR1), Nuclear receptor subfamily 1-group H-member 4 (NR1H4), Nuclear receptor subfamily 3-group C-member 1 (glucocorticoid receptor) (NR3C1), Nuclear receptor subfamily 1-group H-member 3 (Liver X receptor α) (NR1H3), Nuclear receptor subfamily 1-group H-member 2 (Liver X receptor β) (NR1H2), Nuclear receptor subfamily 1-group H-member 2 (Liver X receptor β) (NR1H2), Nuclear receptor subfamily 3-group C-member 2 (Mineralcorticoid receptor) (NR3C2), Peroxisome Proliferator Activated Receptor alpha (PPARA), Peroxisome Proliferator Activated Receptor gamma (PPARG), Peroxisome Proliferator Activated Receptor delta (PPARD), Progesterone receptor α (PGR), Progesterone receptor β (PGR), Retinoic acid receptor-alpha (RARA), Retinoic acid receptor-beta (RARB), Retinoid X receptor-alpha (RXRA), Retinoid X receptor-gamma (RXRG), Thyroid hormone receptor-alpha (THRA), Thyroid hormone receptor-beta (THRB), Retinoic acid-related orphan receptor, Liver X receptor, Farnesoid X receptor, Vitamin D receptor, Pregnane X receptor, Constitutive androstane receptor, Hepatocyte nuclear factor 4, Oestrogen receptor, Oestrogen-related receptor, Glucocortioic receptor, and Nerve growth factor-induced-B, Germ cell nuclear factor.

Examples of membrane transport proteins include, but are not limited to: ATP-binding cassette (ABC) superfamily, solute carrier (SLC) superfamily, multidrug resistance protein 1 (P-glycoprotein), organic anion transporter 1, and proteins such as EAAT3, EAAC1, EAAT1, GLUT1, GLUT2, GLUT9, GLUT10, rBAT, AE1, NBC1, KNBC, CHED2, BTR1, NABC1, CDPD, SGLT1, SGLT2, NIS, CHT1, NET, DAT, GLYT2, CRTR, BOAT1, SIT1, XT3, y+LAT1, BAT1, NHERF1, NHE6, ASBT, DMT1, DCT1, NRAMP2, NKCC2, NCC, KCC3, NACT, MCT1, MCT8, MCT12, SLD, VGLUT3, THTR1, THTR2, PIT2, GLVR2, OCTN2, URAT1, NCKX1, NCKX5, CIC, PiC, ANT1, ORNT1, AGC1, ARALAR, Citrin, STLN2, aralar2, TPC, MUP1, MCPHA, CACT, GC1, PHC, DTD, CLD, DRA, PDS, Prestin, TAT1, FATP4, ENT3, ZnT2, ZnT10, AT1, NPT2A, NPT2B, HHRH, CST, CDG2F, UGAT, UGTL, UGALT, UGT1, UGT2, FUCT1, CDG2C, NST, PAT2, G6PT1, SPX4, ZIP4, LIV4, ZIP13, LZT-Hs9, FPN1, MTP1, IREG1, RHAG, AIM1, PCFT, FLVCR1, FLVCR2, RFT1, RFT2, RFT3, OATP1B1, OATP1B3, and OATP2A1.

Examples of structural proteins include, but are not limited to: tubulin, heat shock protein, Microtubule-stabilizing proteins, Oncoprotein 18, stathmin, kinesin-8 and kinesin-14 family, Kip3, and Kif18A.

Examples of proteases include, but are not limited to ADAM (a disintegrin and metalloprotease) family.

Examples of Protein kinases include, but are not limited to: AP2 associated kinase, *Homo sapiens* ABL proto-oncogene 1-non-receptor tyrosine-protein kinase family, c-abl oncogene 1 receptor tyrosine kinase family, v-abl Abelson murine leukemia viral oncogene homolog 2, activin A receptor family, chaperone-ABC1 activity of bc1 complex homolog (*S. pombe*) (ADCK3), aarF domain containing kinase 4 (ADCK4), v-akt murine thymoma viral oncogene homolog family, anaplastic lymphoma receptor tyrosine kinase family, protein kinase A family, protein kinase B family, ankyrin repeat and kinase domain containing 1 (ANKK1), NUAK family-SNF1-like kinase, mitogen-activated protein kinase kinase kinase family aurora kinase A (AURKA), aurora kinase B (AURKB), aurora kinase C (AURKC), AXL receptor tyrosine kinase (AXL), BMP2 inducible kinase (BIKE), B lymphoid tyrosine kinase (BLK), bone morphogenetic protein receptor family, BMX non-receptor tyrosine kinase (BMX), v-raf murine sarcoma viral oncogene homolog B1 (BRAF), protein tyrosine kinase 6 (BRK), BR serine/threonine kinase family, Bruton agammaglobulinemia tyrosine kinase (BTK), calcium/calmodulin-dependent protein kinase family, cyclin-dependent kinase family, cyclin-dependent kinase-like family, CHK1 checkpoint homolog (*S. pombe*) (CHEK1), CHK2 checkpoint homolog (*S. pombe*) (CHEK2), Insulin receptor, isoform A (INSR), Insulin receptor, isoform B (INSR), rho-interacting serine/threonine kinase (CIT), v-kit Hardy-Zuckerman 4 feline sarcoma viral oncogene homolog (KIT), CDC-Like Kinase family-Hepatocyte growth factor receptor (MET), Proto-oncogene tyrosine-protein kinase receptor, colony-stimulating factor family receptor, c-src tyrosine kinase (CSK), casein kinase family, megakaryocyte-associated tyrosine kinase (CTK), death-associated protein kinase family, doublecortin-like kinase family, discoidin domain receptor tyrosine kinase, dystrophia myotonica-protein kinase (DMPK), dual-specificity tyrosine-(Y)-phosphorylation regulated kinase family, epidermal growth factor receptor family, eukaryotic translation initiation factor 2-alpha kinase 1 (EIF2AK1), EPH receptor family, Ephrin type-A receptor family, Ephrin type-B receptor family, v-erb-b2 erythroblastic leukemia viral oncogene homolog family, mitogen-activated protein kinase family, endoplasmic reticulum to nucleus signaling 1 (ERN1), PTK2 protein tyrosine kinase 2 (FAK), fer (fps/fes related) tyrosine kinase (FER), feline sarcoma oncogene (FES), Fibroblast growth factor receptor family, Gardner-Rasheed feline sarcoma viral (v-fgr) oncogene homolog (FGR), fms-related tyrosine kinase family, Fms-related tyrosine kinase family, fyn-related kinase (FRK), FYN oncogene related to SRC, cyclin G associated kinase (GAK), eukaryotic translation initiation factor 2 alpha kinase, Growth hormone receptor. G protein-coupled receptor kinase 1 (GRK1), G protein-coupled receptor kinase family, glycogen synthase kinase family, germ cell associated 2 (haspin) (HASP IN), Hemopoietic cell kinase (HCK), homeodomain interacting protein kinase family, mitogen-activated protein kinase kinase kinase kinase family, hormonally up-regulated Neu-associated kinase (HUNK), intestinal cell (MAK-like) kinase (ICK), Insulin-like growth factor 1 receptor (IGF1R), conserved helix-loop-helix ubiquitous kinase (IKK-alpha), inhibitor of kappa light polypeptide gene enhancer in B-cells-kinase beta family, insulin receptor (INSR), insulin receptor-related receptor (INSRR), interleukin-1 receptor-associated kinase family, IL2-inducible T-cell kinase (ITK), Janus kinase family, Kinase Insert Domain Receptor, v-kit Hardy-Zuckerman 4 feline sarcoma viral oncogene homolog, lymphocyte-specific protein tyrosine kinase (LCK), LIM domain kinase family, serine/threonine kinase family leucine-rich repeat kinase family, v-yes-1 Yamaguchi sarcoma viral related oncogene homolog (LYN), male germ cell-associated kinase (MAK); MAP/microtubule affinity-regulating kinase family such as microtubule associated serine/threonine kinase family, maternal embryonic leucine zipper kinase, c-mer proto-oncogene tyrosine kinase (MERTK), met proto-oncogene (hepatocyte growth factor receptor), MAP kinase interacting serine/threonine kinase family, myosin light chain kinase family, mixed lineage kinase domain-like protein isoform, CDC42 binding protein kinase family, serine/threonine kinase family, macrophage stimulating 1 receptor (c-met-related tyrosine kinase) (MST1R), mechanistic target of rapamycin (serine/threonine kinase) (MTOR), muscle-skeletal-receptor tyrosine kinase (MUSK), myosin light chain kinase family, NIMA (never in mitosis gene a)-related kinase family, serine/threonine-protein kinase NIM1 (NIM1), nemo-like kinase (NLK), oxidative-stress responsive 1 (OSR1), p21 protein (Cdc42/Rac)-activated kinase family, PAS domain containing serine/threonine kinase, Platelet-derived growth factor receptor family, 3-phosphoinositide dependent protein kinase-1 (PDPK1), Calcium-dependent protein kinase 1, phosphorylase kinase gamma family, Phosphatidylinositol 4, 5-bisphosphate 3-kinase, phosphoinositide-3-kinase family, phosphatidylinositol 4-kinase family. phosphoinositide kinase, FYVE finger containing, Pim-1 oncogene (PIM1), pim-2 oncogene (PIM2), pim-3 oncogene (PIM3), phosphatidylinositol-4-phosphate 5-kinase family, phosphatidylinositol-5-phosphate 4-kinase family protein kinase, membrane associated tyrosine/threonine 1 (PKMYT1), protein kinase N family, polo-like kinase family, protein kinase C family, protein kinase D family, cGMP-dependent protein kinase family, eukaryotic translation initiation factor 2-alpha kinase 2 (PRKR), X-linked protein kinase (PRKX), Prolactin receptor (PRLR), PRP4 pre-mRNA processing factor 4 homolog B (yeast) (PRP4), PTK2B protein tyrosine kinase 2 beta (PTK2B), SIK family kinase 3 (QSK), v-raf-1 murine leukemia viral oncogene homolog 1 (RAF1), Neurotrophic tyrosine kinase receptor type family, receptor (TNFRSF)-interacting serine-threonine kinase family, dual serine/threonine and tyrosine protein kinase (RIPK5), Rho-associated, coiled-coil containing protein kinase family, c-ros oncogene 1, receptor tyrosine kinase (ROS1), ribosomal protein S6 kinase family, SH3-binding domain kinase 1 (SBK1), serum/glucocorticoid regulated kinase family, Putative uncharacterized serine/threonine-protein kinase (Sugen kinase 110) (SgK110), salt-inducible kinase family, SNF related kinase (SNRK), src-related kinase, SFRS protein kinase family; Spleen tyrosine kinase (SYK) such as TAO kinase family; TANK-binding kinase 1 (TBK1) such as tec protein tyrosine kinase (TEC), testis-specific kinase 1 (TESK1), transforming growth factor, beta receptor family, tyrosine kinase with immunoglobulin-like and EGF-like domains 1 (TIE1), TEK tyrosine kinase, endothelial (TIE2), Angiopoietin-1 receptor (Tie2), tousled-like kinase family, TRAF2 and NCK interacting kinase (TNIK), non-receptor tyrosine kinase family, TNNI3 interacting kinase (TNNI3K), transient receptor potential cation channel, testis-specific serine kinase family, TTK protein kinase (TTK), TXK tyrosine kinase (TXK), Tyrosine kinase 2 (TYK2), TYRO3 protein tyrosine kinase (TYRO3), unc-51-like kinase family, phosphatidylinositol 3-kinase, vaccinia related kinase 2 (VRK2), WEE1 homolog family, WNK lysine deficient protein kinase family, v-yes-1 Yamaguchi sarcoma viral oncogene homolog 1 (YES), sterile alpha motif and leucine zipper containing kinase AZK (ZAK), and zeta-chain (TCR) associated protein kinase 70 kDa (ZAP70).

Cell therapy using cells that are derived primarily from: endoderm such as Exocrine secretory epithelial cells and Hormone-secreting cells; ectoderm such as Keratinizing epithelial cells, Wet stratified barrier epithelial cells, Sensory transducer cells, Autonomic neuron cells, Sense organ and peripheral neuron supporting cells, Central nervous system neurons and glial cells, Lens cells; mesoderm such as Metabolism and storage cells, Barrier function cells (lung, gut, exocrine glands and urogenital tract), Extracellular matrix cells, Contractile cells, Blood and immune system cells, Germ cells, Nurse cell, Interstitial cells and combinations thereof. Additionally in the scope of the invention are cells that are genetically, chemically or physically altered or otherwise modified.

Examples of Exocrine secretory epithelial cells include but are not limited to: Salivary gland mucous cell, Salivary gland number 1, Von Ebner's gland cell in tongue, Mammary gland cell, Lacrimal gland cell, Ceruminous gland cell in ear, Eccrine sweat gland dark cell, Eccrine sweat gland clear cell, Apocrine sweat gland cell, Gland of Moll cell in eyelid, Sebaceous gland cell, Bowman's gland cell in nose, Brunner's gland cell in duodenum, Seminal vesicle cell, Prostate gland cell, Bulbourethral gland cell, Bartholin's gland cell, Gland of Littre cell, Uterus endometrium cell, Isolated goblet cell of respiratory and digestive tracts, Stomach lining mucous cell, Gastric gland zymogenic cell, Gastric gland oxyntic cell, Pancreatic acinar cell, Paneth cell of small intestine, Type II pneumocyte of lung, and Clara cell of lung; Hormone-secreting cells including, but not limited to: Anterior pituitary cells, Intermediate pituitary cell, Magnocellular neurosecretory cells, Gut and respiratory tract cells, Thyroid gland cells, Parathyroid gland cells, Adrenal gland cells, Leydig cell of testes secreting testosterone, Theca interna cell of ovarian follicle secreting estrogen, Corpus luteum cell of ruptured ovarian follicle secreting progesterone, Juxtaglomerular cell, Macula densa cell of kidney, Peripolar cell of kidney, Mesangial cell of kidney, and Pancreatic islets; Keratinizing epithelial cells including, but not limited to: Epidermal keratinocyte, Epidermal basal cell, Keratinocyte of fingernails and toenails, Nail bed basal cell, Medullary hair shaft cell, Cortical hair shaft cell, Cuticular hair shaft cell, Cuticular hair root sheath cell, Hair root sheath cell of Huxley's layer, Hair root sheath cell of Henle's layer, External hair root sheath cell, and Hair matrix cell; Wet stratified barrier epithelial cells including, but not limited to: Surface epithelial cell of stratified squamous epithelium and basal cell of epithelia of cornea, tongue, oral cavity, esophagus, anal canal, distal urethra and vagina, and Urinary epithelium cell; Sensory transducer cells including, but not limited to: Auditory inner hair cell of organ of Corti, Auditory outer hair cell of organ of Corti, Basal cell of olfactory epithelium, Cold-sensitive primary sensory neurons, Heat-sensitive primary sensory neurons, Merkel cell of epidermis, Olfactory receptor neuron, Pain-sensitive primary sensory neurons, Photoreceptor cells of retina in eye, Proprioceptive primary sensory neurons, Touch-sensitive primary sensory neurons, Type I carotid body cell, Type II carotid body cell, Type I hair cell of vestibular system of ear, Type II hair cell of vestibular system of ear, and Type I taste bud cell; Autonomic neuron cells including, but not limited to: Cholinergic neural cell, Adrenergic neural cell, and Peptidergic neural cell; Sense organ and peripheral neuron supporting cells including, but not limited to: Inner pillar cell of organ of Corti, Outer pillar cell of organ of Corti, Inner phalangeal cell of organ of Corti, Outer phalangeal cell of organ of Corti, Border cell of organ of Corti, Hensen cell of organ of Corti, Vestibular apparatus supporting cell, Taste bud supporting cell, Olfactory epithelium supporting cell, Schwann cell, Satellite glial cell, and Enteric glial cell; Central nervous system neurons and glial cells including, but not limited to: Astrocyte, Neuron cells, Oligodendrocyte, and Spindle neuron; Lens cells including, but not limited to: Anterior lens epithelial cell, and Crystallin-containing lens fiber cell; Metabolism and storage cells including, but not limited to: Adipocytes, and Liver lipocyte; Barrier function cells including, but not limited to: Kidney parietal cell, Kidney glomerulus podocyte, Kidney proximal tubule brush border cell, Loop of Henle thin segment cell, Kidney distal tubule cell, Kidney collecting duct cell, Principal cells, Intercalated cells, Type I pneumocyte, Pancreatic duct cell, Nonstriated duct cell, Principal cell, Intercalated cell, Duct cell, Intestinal brush border cell, Exocrine gland striated duct cell, Gall bladder epithelial cell, Ductulus efferens nonciliated cell, Epididymal principal cell, and Epididymal basal cell; Extracellular matrix cells including, but not limited to: Ameloblast epithelial cell, Planum semilunatum epithelial cell of vestibular system of ear, Organ of Corti interdental epithelial cell, Loose connective tissue fibroblasts, Corneal fibroblasts, Tendon fibroblasts, Bone marrow reticular tissue fibroblasts, Other nonepithelial fibroblasts, Pericyte, Nucleus pulposus cell of intervertebral disc, Cementoblast/cementocyte, Odontoblast/odontocyte, Hyaline cartilage chondrocyte, Fibrocartilage chondrocyte, Elastic cartilage chondrocyte, Osteoblast/osteocyte, Osteoprogenitor cell, Hyalocyte of vitreous body of eye, Stellate cell of perilymphatic space of ear, Hepatic stellate cell, and Pancreatic stelle cell; Contractile cells including, but not limited to: Skeletal muscle cell, Satellite cell, Heart muscle cells, Smooth muscle cell, Myoepithelial cell of iris, and Myoepithelial cell of exocrine glands; Blood and immune system cells including, but not limited to: Erythrocyte, Megakaryocyte, Monocyte, Connective tissue macrophage, Epidermal Langerhans cell, Osteoclast, Dendritic cell, Microglial cell, Neutrophil granulocyte, Eosinophil granulocyte, Basophil granulocyte, Hybridoma cell, Mast cell, Helper T cell, Suppressor T cell, Cytotoxic T cell, Natural Killer T cell, B cell, Natural killer cell, Reticulocyte, Stem cells, and committed progenitors for the blood and immune system; Germ cells including, but not limited to: Oogonium/Oocyte, Spermatid, Spermatocyte, Spermatogonium cell, and Spermatozoon; Nurse cell including, but not limited to: Ovarian follicle cell, and Sertoli cell, Thymus epithelial cell; Interstitial cells including, but not limited to: Interstitial kidney cells and any combination of the foregoing.

Non-limiting examples of other known biologics include, but are not limited to: Abbosynagis, Abegrin, Actemra, AFP-Cide, Antova, Arzerra, Aurexis, Avastin, Benlysta, Bexxar, Blontress, Bosatria, Campath, CEA-Cide, CEA-Scan, Cimzia, Cyramza, Ektomab, Erbitux, FibriScint, Gazyva, Herceptin, hPAM4-Cide, HumaSPECT, HuMax-CD4, HuMax-EGFr, Humira, HuZAF, Hybri-ceaker, Ilaris, Indimacis-125, Kadcyla, Lemtrada, LeukArrest, Leuko-Scan, Lucentis, Lymphomun, LymphoScan, LymphoStat-B, MabThera, Mycograb, Mylotarg, Myoscint, NeutroSpec, Numax, Nuvion, Omnitarg, Opdivo, Orthoclone OKT3, OvaRex, Panorex, Prolia, Prostascint, Raptiva, Remicade, Removab, Rencarex, ReoPro, Rexomun, Rituxan, RoActemra, Scintimun, Simponi, Simulect, Soliris, Stelara, Synagis, Tactress, Theracim, Theragyn, Theraloc, Tysabri, Vectibix, Verluma, Xolair, Yervoy, Zenapax, and Zevalin and combinations thereof.

Non-limiting examples of known Monoclonal antibodies include, but are not limited to: 3F8, 8H9, Abagovomab, Abciximab, Abituzumab, Abrilumab, Actoxumab, Adalimumab, Adecatumumab, Aducanumab, Afasevikumab, Afelimomab, Afutuzumab, Alacizumab pegol, ALD518, ALD403, Alemtuzumab, Alirocumab, Altumomab pentetate, Amatuximab, AMG 334, Anatumomab mafenatox, Anetumab ravtansine, Anifrolumab, Anrukinzumab, Apolizumab, Arcitumomab, Ascrinvacumab, Aselizumab, Atezolizumab, Atinumab, Atlizumab, Atorolimumab, Avelumab, Bapineuzumab, Basiliximab, Bavituximab, Bectumomab, Begelomab, Belimumab, Benralizumab, Bertilimumab, Besilesomab, Bevacizumab, Bezlotoxumab, Biciromab, Bimagrumab, Bimekizumab, Bivatuzumab mertansine, Bleselumab, Blinatumomab, Blontuvetmab, Blosozumab, Bococizumab, Brazikumab, Brentuximab vedotin, Briakinumab, Brodalumab, Brolucizumab, Brontictuzumab, Burosumab, Cabiralizumab, Canakinumab, Cantuzumab mertansine, Cantuzumab ravtansine, Caplacizumab, Capromab pendetide, Carlumab, Carotuximab, Catumaxomab, cBR96-doxorubicin immunoconjugate, Cedelizumab, Cergutuzumab amunaleukin, Certolizumab pegol, Cetuximab, Citatuzumab bogatox, Cixutumumab, Clazakizumab, Clenoliximab, Clivatuzumab tetraxetan, Codrituzumab, Coltuximab ravtansine, Conatumumab, Concizumab, CR6261, Crenezumab, Crotedumab, Dacetuzumab, Daclizumab, Dalotuzumab, Dapirolizumab pegol, Daratumumab, Dectrekumab, Demcizumab, Denintuzumab mafodotin, Denosumab, Depatuxizumab mafodotin, Derlotuximab biotin, Detumomab, Dinutuximab, Diridavumab, Domagrozumab, Dorlimomab aritox, Drozitumab, Duligotumab, Dupilumab, Durvalumab, Dusigitumab, Ecromeximab, Eculizumab, Edobacomab, Edrecolomab, Efalizumab, Efungumab, Eldelumab, Elgemtumab, Elotuzumab, Elsilimomab, Emactuzumab, Emibetuzumab, Emicizumab, Enavatuzumab, Enfortumab vedotin, Enlimomab pegol, Enoblituzumab, Enokizumab, Enoticumab, Ensituximab, Epitumomab cituxetan, Epratuzumab, Erenumab, Erlizumab, Ertumaxomab, Etaracizumab, Etrolizumab, Evinacumab, Evolocumab, Exbivirumab, Fanolesomab, Faralimomab, Farletuzumab, Fasinumab, FBTA05, Felvizumab, Fezakinumab, Fibatuzumab, Ficlatuzumab, Figitumumab, Firivumab, Flanvotumab, Fletikumab, Fontolizumab, Foralumab, Foravirumab, Fresolimumab, Fulranumab, Futuximab, Galcanezumab, Galiximab, Ganitumab, Gantenerumab, Gavilimomab, Gemtuzumab ozogamicin, Gevokizumab, Girentuximab, Glembatumumab vedotin, Golimumab, Gomiliximab, Guselkumab, Ibalizumab, Ibritumomab tiuxetan, Icrucumab, Idarucizumab, Igovomab, IMA-638, IMAB362, Imalumab, Imciromab, Imgatuzumab, Inclacumab, Indatuximab ravtansine, Indusatumab vedotin, Inebilizumab, Infliximab, Inolimomab, Inotuzumab ozogamicin, Intetumumab, Ipilimumab, Iratumumab, Isatuximab, Itolizumab, Ixekizumab, Keliximab, Labetuzumab, Lambrolizumab, Lampalizumab, Lanadelumab, Landogrozumab, Laprituximab emtansine, LBR-101/PF0442g7429, Lebrikizumab, Lemalesomab, Lendalizumab, Lenzilumab, Lerdelimumab, Lexatumumab, Libivirumab, Lifastuzumab vedotin, Ligelizumab, Lilotomab satetraxetan, Lintuzumab, Lirilumab, Lodelcizumab, Lokivetmab, Lorvotuzumab mertansine, Lucatumumab, Lulizumab pegol, Lumiliximab, Lumretuzumab, LY2951742, Mapatumumab, Margetuximab, Maslimomab, Matuzumab, Mavrilimumab, Mepolizumab, Metelimumab, Milatuzumab, Minretumomab, Mirvetuximab soravtansine, Mitumomab, Mogamulizumab, Monalizumab, Morolimumab, Motavizumab, Moxetumomab pasudotox, Muromonab-CD3, Nacolomab tafenatox, Namilumab, Naptumomab estafenatox, Naratuximab emtansine, Narnatumab, Natalizumab, Navicixizumab, Navivumab, Nebacumab, Necitumumab, Nemolizumab, Nerelimomab, Nesvacumab, Nimotuzumab, Nivolumab, Nofetumomab merpentan, Obiltoxaximab, Obinutuzumab, Ocaratuzumab, Ocrelizumab, Odulimomab, Ofatumumab, Olaratumab, Olokizumab, Omalizumab, Onartuzumab, Ontuxizumab, Opicinumab, Oportuzumab monatox, Oregovomab, Orticumab, Otelixizumab, Otlertuzumab, Oxelumab, Ozanezumab, Ozoralizumab, Pagibaximab, Palivizumab, Pamrevlumab, Panitumumab, Pankomab, Panobacumab, Parsatuzumab, Pascolizumab, Pasotuxizumab, Pateclizumab, Patritumab, Pembrolizumab, Pemtumomab, Perakizumab, Pertuzumab, Pexelizumab, Pidilizumab, Pinatuzumab vedotin, Pintumomab, Placulumab, Plozalizumab, Pogalizumab, Polatuzumab vedotin, Ponezumab, Prezalizumab, Priliximab, Pritoxaximab, Pritumumab, PRO 140, Quilizumab, Racotumomab, Radretumab, Rafivirumab, Ralpancizumab, Ramucirumab, Ranibizumab, Raxibacumab, Refanezumab, Regavirumab, Reslizumab, Rilotumumab, Rinucumab, Risankizumab, Rituximab, Rivabazumab pegol, Robatumumab, Roledumab, Romosozumab, Rontalizumab, Rovalpituzumab tesirine, Rovelizumab, Ruplizumab, Sacituzumab govitecan, Samalizumab, Sapelizumab, Sarilumab, Satumomab pendetide, Secukinumab, Seribantumab, Setoxaximab, Sevirumab, SGN-CD19A, SGN-CD33A, Sibrotuzumab, Sifalimumab, Siltuximab, Simtuzumab, Siplizumab, Sirukumab, Sofituzumab vedotin, Solanezumab, Solitomab, Sonepcizumab, Sontuzumab, Stamulumab, Sulesomab, Suvizumab, Tabalumab, Tacatuzumab tetraxetan, Tadocizumab, Talizumab, Tamtuvetmab, Tanezumab, Taplitumomab paptox, Tarextumab, Tefibazumab, Telimomab aritox, Tenatumomab, Teneliximab, Teplizumab, Teprotumumab, Tesidolumab, Tetulomab, Tezepelumab, TGN1412, Ticilimumab, Tigatuzumab, Tildrakizumab, Timolumab, Tisotumab vedotin, TNX-650, Tocilizumab, Toralizumab, Tosatoxumab, Tositumomab, Tovetumab, Tralokinumab, Trastuzumab, Trastuzumab emtansine, TRBSO7, Tregalizumab, Tremelimumab, Trevogrumab, Tucotuzumab celmoleukin, Tuvirumab, Ublituximab, Ulocuplumab, Urelumab, Urtoxazumab, Ustekinumab, Utomilumab, Vadastuximab talirine, Vandortuzumab vedotin, Vantictumab, Vanucizumab, Vapaliximab, Varlilumab, Vatelizumab, Vedolizumab, Veltuzumab, Vepalimomab, Vesencumab, Visilizumab, Vobarilizumab, Volociximab, Vorsetuzumab mafodotin, Votumumab, Xentuzumab, Zalutumumab, Zanolimumab, Zatuximab, Ziralimumab, and Zolimomab aritox and combinations thereof.

Examples of vaccines developed for viral diseases include, but are not limited to: Hepatitis A vaccine, Hepatitis B vaccine, Hepatitis E vaccine, HPV vaccine, Influenza vaccine, Japanese encephalitis vaccine, MMR vaccine, MMRV vaccine, Polio vaccine, Rabies vaccine, Rotavirus vaccine, Varicella vaccine, Shingles vaccine, Smallpox vaccine, Yellow Fever vaccine, Adenovirus vaccine, Coxsackie B virus vaccine, Cytomegalovirus vaccine, Dengue vaccine for humans, Eastern Equine encephalitis virus vaccine for humans, Ebola vaccine, Enterovirus 71 vaccine, Epstein-Barr vaccine, Hepatitis C vaccine, HIV vaccine, HTLV-1 T-lymphotropic leukemia vaccine for humans, Marburg virus disease vaccine, Norovirus vaccine, Respiratory syncytial virus vaccine for humans, Severe acute respiratory syndrome (SARS) vaccine, West Nile virus vaccine for humans; Examples of bacterial diseases include but are not limited to: Anthrax vaccines, DPT vaccine, Q fever vaccine, Hib vaccine, Tuberculosis (BCG) vaccine, Meningococcal vaccine, Typhoid vaccine, Pneumococcal conjugate vaccine, Pneumococcal polysaccharide vaccine, Cholera vaccine, Caries vaccine, Ehrlichiosis vaccine, Leprosy vaccine, Lyme disease vaccine, *Staphylococcus aureus* vaccine, *Streptococcus pyogenes* vaccine, Syphilis vaccine, Tularemia vaccine, and *Yersinia pestis* vaccine; Examples of parasitic diseases include, but are not limited to: Malaria vaccine, Schistosomiasis vaccine, Chagas disease vaccine, Hookworm vaccine, Onchocerciasis river blindness vaccine for humans, Trypanosomiasis vaccine, and Visceral leishmaniasis vaccine; Examples of non-infectious diseases include, but are not limited to: Alzheimer's disease amyloid protein vaccine, mRNA vaccine, Breast cancer vaccine, Ovarian cancer vaccine, Prostate cancer vaccine, and Talimogene laherparepvec (T-VEC); also vaccines including, but not limited to the following trade names: ACAM2000, ActHIB, Adacel, Afluria, AFLURIA QUADRIVALENT, Agriflu, BCG Vaccine, BEXSERO, Biothrax, Boostrix, Cervarix, Comvax, DAPTACEL, DECAVAC, Engerix-B, FLUAD, Fluarix, Fluarix Quadrivalent, Flublok, Flucelvax, Flucelvax Quadrivalent, FluLaval, FluMist, FluMist Quadrivalent, Fluvirin, Fluzone Quadrivalent, Fluzone, Fluzone High-Dose and Fluzone Intradermal, Gardasil, Gardasil 9, Havrix, Hiberix, Imovax, Infanrix, IPOL, Ixiaro, JE-Vax, KINRIX, Menactra, MenHibrix, Menomune-A/C/W-135, Menveo, M-M-R II, M-M-Vax, Pediarix, PedvaxHIB, Pentacel, Pneumovax 23, Poliovax, Prevnar, Prevnar 13, ProQuad, Quadracel, Quadrivalent, RabAvert, Recombivax HB, ROTARIX, RotaTeq, TENIVAC, TICE BCG, Tripedia, TRUMENBA, Twinrix, TYPHIM Vi, VAQTA, Varivax, Vaxchora, Vivotif, YF-Vax, Zostavax, and combinations thereof.

Examples of injectable drugs include, but are not limited to: Ablavar (Gadofosveset Trisodium Injection), Abarelix Depot, Abobotulinumtoxin A Injection (Dysport), ABT-263, ABT-869, ABX-EFG, Accretropin (Somatropin Injection), Acetadote (Acetylcysteine Injection), Acetazolamide Injection (Acetazolamide Injection), Acetylcysteine Injection (Acetadote), Actemra (Tocilizumab Injection), Acthrel (Corticorelin Ovine Triflutate for Injection), Actummune, Activase, Acyclovir for Injection (Zovirax Injection), Adacel, Adalimumab, Adenoscan (Adenosine Injection), Adenosine Injection (Adenoscan), Adrenaclick, AdreView (lobenguane 1123 Injection for Intravenous Use), Afluria, Ak-Fluor (Fluorescein Injection), Aldurazyme (Laronidase), Alglucerase Injection (Ceredase), Alkeran Injection (Melphalan Hcl Injection), Allopurinol Sodium for Injection (Aloprim), Aloprim (Allopurinol Sodium for Injection), Alprostadil, Alsuma (Sumatriptan Injection), ALTU-238, Amino Acid Injections, Aminosyn, Apidra, Apremilast, Alprostadil Dual Chamber System for Injection (Caverject Impulse), AMG 009, AMG 076, AMG 102, AMG 108, AMG 114, AMG 162, AMG 220, AMG 221, AMG 222, AMG 223, AMG 317, AMG 379, AMG 386, AMG 403, AMG 477, AMG 479, AMG 517, AMG 531, AMG 557, AMG 623, AMG 655, AMG 706, AMG 714, AMG 745, AMG 785, AMG 811, AMG 827, AMG 837, AMG 853, AMG 951, Amiodarone HCI Injection (Amiodarone HCI Injection), Amobarbital Sodium Injection (Amytal Sodium), Amytal Sodium (Amobarbital Sodium Injection), Anakinra, Anti-Abeta, Anti-Beta7, Anti-Beta20, Anti-CD4, Anti-CD20, Anti-CD40, Anti-IFNalpha, Anti-IL13, Anti-OX4OL, Anti-oxLDS, Anti-NGF, Anti-NRP1, Arixtra, Amphadase (Hyaluronidase Inj), Ammonul (Sodium Phenylacetate and Sodium Benzoate Injection), Anaprox, Anzemet Injection (Dolasetron Mesylate Injection), Apidra (Insulin Glulisine [rDNA origin] Inj), Apomab, Aranesp (darbepoetin alfa), Argatroban (Argatroban Injection), Arginine Hydrochloride Injection (R-Gene 10, Aristocort, Aristospan, Arsenic Trioxide Injection (Trisenox), Articane HCI and Epinephrine Injection (Septocaine), Arzerra (Ofatumumab Injection), Asclera (Polidocanol Injection), Ataluren, Ataluren-DMD, Atenolol Inj (Tenorm in I.V. Injection), Atracurium Besylate Injection (Atracurium Besylate Injection), Avastin, Azactam Injection (Aztreonam Injection), Azithromycin (Zithromax Injection), Aztreonam Injection (Azactam Injection), Baclofen Injection (Lioresal Intrathecal), Bacteriostatic Water (Bacteriostatic Water for Injection), Baclofen Injection (Lioresal Intrathecal), Bal in Oil Ampules (Dimercarprol Injection), BayHepB, BayTet, Benadryl, Bendamustine Hydrochloride Injection (Treanda), Benztropine Mesylate Injection (Cogentin), Betamethasone Injectable Suspension (Celestone Soluspan), Bexxar, Bicillin C-R 900/300 (Penicillin G Benzathine and Penicillin G Procaine Injection), Blenoxane (Bleomycin Sulfate Injection), Bleomycin Sulfate Injection (Blenoxane), Boniva Injection (Ibandronate Sodium Injection), Botox Cosmetic (OnabotulinumtoxinA for Injection), BR3-FC, Bravelle (Urofollitropin Injection), Bretylium (Bretylium Tosylate Injection), Brevital Sodium (Methohexital Sodium for Injection), Brethine, Briobacept, BTT-1023, Bupivacaine HCl, Byetta, Ca-DTPA (Pentetate Calcium Trisodium Inj), Cabazitaxel Injection (Jevtana), Caffeine Alkaloid (Caffeine and Sodium Benzoate Injection), Calcijex Injection (Calcitrol), Calcitrol (Calcijex Injection), Calcium Chloride (Calcium Chloride Injection 10%), Calcium Disodium Versenate (Edetate Calcium Disodium Injection), Campath (Altemtuzumab), Camptosar Injection (Irinotecan Hydrochloride), Canakinumab Injection (Ilaris), Capastat Sulfate (Capreomycin for Injection), Capreomycin for Injection (Capastat Sulfate), Cardiolite (Prep kit for Technetium Tc99 Sestamibi for Injection), Carticel, Cathflo, Cefazolin and Dextrose for Injection (Cefazolin Injection), Cefepime Hydrochloride, Cefotaxime, Ceftriaxone, Cerezyme, Carnitor Injection, Caverject, Celestone Soluspan, Celsior, Cerebyx (Fosphenytoin Sodium Injection), Ceredase (Alglucerase Injection), Ceretec (Technetium Tc99m Exametazime Injection), Certolizumab, CF-101, Chloramphenicol Sodium Succinate (Chloramphenicol Sodium Succinate Injection), Chloramphenicol Sodium Succinate Injection (Chloramphenicol Sodium Succinate), Cholestagel (Colesevelam HCL), Choriogonadotropin Alfa Injection (Ovidrel), Cimzia, Cisplatin (Cisplatin Injection), Clolar (Clofarabine Injection), Clomiphine Citrate, Clonidine Injection (Duraclon), Cogentin (Benztropine Mesylate Injection), Colistimethate Injection (Coly-Mycin M), Coly-Mycin M (Colistimethate Injection), Compath, Conivaptan Hcl Injection (Vaprisol), Conjugated Estrogens for Injection (Premarin Injection), Copaxone, Corticorelin Ovine Triflutate for Injection (Acthrel), Corvert (Ibutilide Fumarate Injection), Cubicin (Daptomycin Injection), CF-101, Cyanokit (Hydroxocobalamin for Injection), Cytarabine Liposome Injection (DepoCyt), Cyanocobalamin, Cytovene (ganciclovir), D.H.E. 45, Dacetuzumab, Dacogen (Decitabine Injection), Dalteparin, Dantrium IV (Dantrolene Sodium for Injection), Dantrolene Sodium for Injection (Dantrium IV), Daptomycin Injection (Cubicin), Darbepoietin Alfa, DDAVP Injection (Desmopressin Acetate Injection), Decavax, Decitabine Injection (Dacogen), Dehydrated Alcohol (Dehydrated Alcohol Injection), Denosumab Injection (Prolia), Delatestryl, Delestrogen, Delteparin Sodium, Depacon (Valproate Sodium Injection), Depo Medrol (Methylprednisolone Acetate Injectable Suspension), Depo-Cyt (Cytarabine Liposome Injection), DepoDur (Morphine Sulfate XR Liposome Injection), Desmopressin Acetate Injection (DDAVP Injection), Depo-Estradiol, Depo-Provera 104 mg/ml, Depo-Provera 150 mg/ml, Depo-Testosterone, Dexrazoxane for Injection, Intravenous Infusion Only (Totect), Dextrose/Electrolytes, Dextrose and Sodium Chloride Inj (Dextrose 5% in 0.9% Sodium Chloride), Dextrose, Diazepam Injection (Diazepam Injection), Digoxin Injection (Lanoxin Injection), Dilaudid-HP (Hydromorphone Hydrochloride Injection), Dimercarprol Injection (Bal in Oil Ampules), Diphenhydramine Injection (Benadryl Injection), Dipyridamole Injection (Dipyridamole Injection), DMOAD, Docetaxel for Injection (Taxotere), Dolasetron Mesylate Injection (Anzemet Injection), Doribax (Doripenem for Injection), Doripenem for Injection (Doribax), Doxercalciferol Injection (Hectorol Injection), Doxil (Doxorubicin Hcl Liposome Injection), Doxorubicin Hcl Liposome Injection (Doxil), Duraclon (Clonidine Injection), Duramorph (Morphine Injection), Dysport (Abobotulinumtoxin A Injection), Ecallantide Injection (Kalbitor), EC-Naprosyn (naproxen), Edetate Calcium Disodium Injection (Calcium Disodium Versenate), Edex (Alprostadil for Injection), Engerix, Edrophonium Injection (Enlon), Eliglustat Tartate, Eloxatin (Oxaliplatin Injection), Emend Injection (Fosaprepitant Dimeglumine Injection), Enalaprilat Injection (Enalaprilat Injection), Enlon (Edrophonium Injection), Enoxaparin Sodium Injection (Lovenox), Eovist (Gadoxetate Disodium Injection), Enbrel (etanercept), Enoxaparin, Epicel, Epinepherine, Epipen, Epipen Jr., Epratuzumab, Erbitux, Ertapenem Injection (Invanz), Erythropoieten, Essential Amino Acid Injection (Nephramine), Estradiol Cypionate, Estradiol Valerate, Etanercept, Exenatide Injection (Byetta), Evlotra, Fabrazyme (Adalsidase beta), Famotidine Injection, FDG (Fludeoxyglucose F 18 Injection), Feraheme (Ferumoxytol Injection), Feridex I.V. (Ferumoxides Injectable Solution), Fertinex, Ferumoxides Injectable Solution (Feridex I.V.), Ferumoxytol Injection (Feraheme), Flagyl Injection (Metronidazole Injection), Fluarix, Fludara (Fludarabine Phosphate), Fludeoxyglucose F 18 Injection (FDG), Fluorescein Injection (Ak-Fluor), Follistim AQ Cartridge (Follitropin Beta Injection), Follitropin Alfa Injection (Gonal-f RFF), Follitropin Beta Injection (Follistim AQ Cartridge), Folotyn (Pralatrexate Solution for Intravenous Injection), Fondaparinux, Forteo (Teriparatide (rDNA origin) Injection), Fostamatinib, Fosaprepitant Dimeglumine Injection (Emend Injection), Foscarnet Sodium Injection (Foscavir), Foscavir (Foscarnet Sodium Injection), Fosphenytoin Sodium Injection (Cerebyx), Fospropofol Disodium Injection (Lusedra), Fragm in, Fuzeon (enfuvirtide), GA101, Gadobenate Dimeglumine Injection (Multihance), Gadofosveset Trisodium Injection (Ablavar), Gadoteridol Injection Solution (ProHance), Gadoversetamide Injection (OptiMARK), Gadoxetate Disodium Injection (Eovist), Ganirelix (Ganirelix Acetate Injection), Gardasil, GC1008, GDFD, Gemtuzumab Ozogamicin for Injection (Mylotarg), Genotropin, Gentamicin Injection, GENZ-112638, Golimumab Injection (Simponi Injection), Gonal-f RFF (Follitropin Alfa Injection), Granisetron Hydrochloride (Kytril Injection), Gentamicin Sulfate, Glatiramer Acetate, Glucagen, Glucagon, HAE1, Haldol (Haloperidol Injection), Havrix, Hectorol Injection (Doxercalciferol Injection), Hedgehog Pathway Inhibitor, Heparin, Herceptin, hG-CSF, Humalog, Human Growth Hormone, Humatrope, HuMax, Humegon, Humira, Humulin, Ibandronate Sodium Injection (Boniva Injection), Ibuprofen Lysine Injection (NeoProfen), Ibutilide Fumarate Injection (Corvert), Idamycin PFS (Idarubicin Hydrochloride Injection), Idarubicin Hydrochloride Injection (Idamycin PFS), Ilaris (Canakinumab Injection), Imipenem and Cilastatin for Injection (Primaxin I.V.), Imitrex, lncobotulinumtoxin A for Injection (Xeomin), Increlex (Mecasermin [rDNA origin] Injection), Indocin IV (Indomethacin Inj), Indomethacin Inj (Indocin IV), Infanrix, Innohep, Insulin, Insulin Aspart [rDNA origin] Inj (NovoLog), Insulin Glargine [rDNA origin] Injection (Lantus), Insulin Glulisine [rDNA origin] Inj (Apidra), Interferon alfa-2b, Recombinant for Injection (Intron A), Intron A (Interferon alfa-2b, Recombinant for Injection), Invanz (Ertapenem Injection), Invega Sustenna (Paliperidone Palm itate Extended-Release Injectable Suspension), Invirase (saquinavir mesylate), lobenguane 1123 Injection for Intravenous Use (AdreView), Iopromide Injection (Ultravist), Ioversol Injection (Optiray Injection), Iplex (Mecasermin Rinfabate [rDNA origin] Injection), Iprivask, Irinotecan Hydrochloride (Camptosar Injection), Iron Sucrose Injection (Venofer), Istodax (Romidepsin for Injection), Itraconazole Injection (Sporanox Injection), Jevtana (Cabazitaxel Injection), Jonexa, Kalbitor (Ecallantide Injection), KCL in D5NS (Potassium Chloride in 5% Dextrose and Sodium Chloride Injection), KCL in D5W, KCL in NS, Kenalog 10 Injection (Triamcinolone Acetonide Injectable Suspension), Kepivance (Paliferm in), Keppra Injection (Levetiracetam), Keratinocyte, KFG, Kinase Inhibitor, Kineret (Anakinra), Kinlytic (Urokinase Injection), Kinrix, Klonopin (clonazepam), Kytril Injection (Granisetron Hydrochloride), lacosamide Tablet and Injection (Vimpat), Lactated Ringer's, Lanoxin Injection (Digoxin Injection), Lansoprazole for Injection (Prevacid I.V.), Lantus, Leucovorin Calcium (Leucovorin Calcium Injection), Lente (L), Leptin, Levemir, Leukine Sargramostim, Leuprolide Acetate, Levothyroxine, Levetiracetam (Keppra Injection), Lovenox, Levocarnitine Injection (Carnitor Injection), Lexiscan (Regadenoson Injection), Lioresal Intrathecal (Baclofen Injection), Liraglutide [rDNA] Injection (Victoza), Lovenox (Enoxaparin Sodium Injection), Lucentis (Ranibizumab Injection), Lumizyme, Lupron (Leuprolide Acetate Injection), Lusedra (Fospropofol Disodium Injection), Maci, Magnesium Sulfate (Magnesium Sulfate Injection), Mannitol Injection (Mannitol IV), Marcaine (Bupivacaine Hydrochloride and Epinephrine Injection), Maxipime (Cefepime Hydrochloride for Injection), MDP Multidose Kit of Technetium Injection (Technetium Tc99m Medronate Injection), Mecasermin [rDNA origin] Injection (Increlex), Mecasermin Rinfabate [rDNA origin] Injection (Iplex), Melphalan Hcl Injection (Alkeran Injection), Methotrexate, Menactra, Menopur (Menotropins Injection), Menotropins for Injection (Repronex), Methohexital Sodium for Injection (Brevital Sodium), Methyldopate Hydrochloride Injection, Solution (Methyldopate Hcl), Methylene Blue (Methylene Blue Injection), Methylprednisolone Acetate Injectable Suspension (Depo Medrol), MetMab, Metoclopramide Injection (Reglan Injection), Metrodin (Urofollitropin for Injection), Metronidazole Injection (Flagyl Injection), Miacalcin, Midazolam (Midazolam Injection), Mimpara (Cinacalet), Minocin Injection (Minocycline Inj), Minocycline Inj (Minocin Injection), Mipomersen, Mitoxantrone for Injection Concentrate (Novantrone), Morphine Injection (Duramorph), Morphine Sulfate XR Liposome Injection (DepoDur), Morrhuate Sodium (Morrhuate Sodium Injection), Motesanib, Mozobil (Plerixafor Injection), Multihance (Gadobenate Dimeglumine Injection), Multiple Electrolytes and Dextrose Injection, Multiple Electrolytes Injection, Mylotarg (Gemtuzumab Ozogamicin for Injection), Myozyme (Alglucosidase alfa), Nafcillin Injection (Nafcillin Sodium), Nafcillin Sodium (Nafcillin Injection), Naltrexone XR Inj (Vivitrol), Naprosyn (naproxen), NeoProfen (Ibuprofen Lysine Injection), Nandrol Decanoate, Neostigmine Methylsulfate (Neostigmine Methylsulfate Injection), NEO-GAA, NeoTect (Technetium Tc 99m Depreotide Injection), Nephramine (Essential Amino Acid Injection), Neulasta (pegfilgrastim), Neupogen (Filgrastim), Novolin, Novolog, NeoRecormon, Neutrexin (Trimetrexate Glucuronate Inj), NPH (N), Nexterone (Amiodarone HCI Injection), Norditropin (Somatropin Injection), Normal Saline (Sodium Chloride Injection), Novantrone (Mitoxantrone for Injection Concentrate), Novolin 70/30 Innolet (70% NPH, Human Insulin Isophane Suspension and 30% Regular, Human Insulin Injection), NovoLog (Insulin Aspart [rDNA origin] Inj), Nplate (romiplostim), Nutropin (Somatropin (rDNA origin) for Inj), Nutropin AQ, Nutropin Depot (Somatropin (rDNA origin) for Inj), Octreotide Acetate Injection (Sandostatin LAR), Ocrelizumab, Ofatumumab Injection (Arzerra), Olanzapine Extended Release Injectable Suspension (Zyprexa Relprevv), Omnitarg, Omnitrope (Somatropin [rDNA origin] Injection), Ondansetron Hydrochloride Injection (Zofran Injection), OptiMARK (Gadoversetamide Injection), Optiray Injection (Ioversol Injection), Orencia, Osmitrol Injection in Aviva (Mannitol Injection in Aviva Plastic Vessel 250), Osmitrol Injection in Viaflex (Mannitol Injection in Viaflex Plastic Vessel 250), Osteoprotegrin, Ovidrel (Choriogonadotropin Alfa Injection), Oxacillin (Oxacillin for Injection), Oxaliplatin Injection (Eloxatin), Oxytocin Injection (Pitocin), Paliperidone Palm itate Extended-Release Injectable Suspension (Invega Sustenna), Pamidronate Disodium Injection (Pam idronate Disodium Injection), Panitumumab Injection for Intravenous Use (Vectibix), Papaverine Hydrochloride Injection (Papaverine Injection), Papaverine Injection (Papaverine Hydrochloride Injection), Parathyroid Hormone, Paricalcitol Injection Fliptop Vial (Zemplar Injection), PARP Inhibitor, Pediarix, PEGIntron, Peginterferon, Pegfilgrastim, Penicillin G Benzathine and Penicillin G Procaine, Pentetate Calcium Trisodium Inj (Ca-DTPA), Pentetate Zinc Trisodium Injection (Zn-DTPA), Pepcid Injection (Famotidine Injection), Pergonal, Pertuzumab, Phentolamine Mesylate (Phentolamine Mesylate for Injection), Physostigmine Salicylate (Physostigmine Salicylate (injection)), Physostigmine Salicylate (injection) (Physostigmine Salicylate), Piperacillin and Tazobactam Injection (Zosyn), Pitocin (Oxytocin Injection), Plasma-Lyte 148 (Multiple Electrolytes Inj), Plasma-Lyte 56 and Dextrose (Multiple Electrolytes and Dextrose Injection in Viaflex, Plastic Vessel 250), PlasmaLyte, Plerixafor Injection (Mozobil), Polidocanol Injection (Asclera), Potassium Chloride, Pralatrexate Solution for Intravenous Injection (Folotyn), Pramlintide Acetate Injection (Symlin), Premarin Injection (Conjugated Estrogens for Injection), Prep kit for Technetium Tc99 Sestamibi for Injection (Cardiolite), Prevacid I.V. (Lansoprazole for Injection), Primaxin I.V. (Imipenem and Cilastatin for Injection), Prochymal, Procrit, Progesterone, ProHance (Gadoteridol Injection Solution), Prolia (Denosumab Injection), Promethazine HCl Injection (Promethazine Hydrochloride Injection), Propranolol Hydrochloride Injection (Propranolol Hydrochloride Injection), Quinidine Gluconate Injection (Quinidine Injection), Quinidine Injection (Quinidine Gluconate Injection), R-Gene 10 (Arginine Hydrochloride Injection), Ranibizumab Injection (Lucentis), Ranitidine Hydrochloride Injection (Zantac Injection), Raptiva, Reclast (Zoledronic Acid Injection), Recombivarix HB, Regadenoson Injection (Lexiscan), Reglan Injection (Metoclopramide Injection), Remicade, Renagel, Renvela (Sevelamer Carbonate), Repronex (Menotropins for Injection), Retrovir IV (Zidovudine Injection), rhApo2L/TRAIL, Ringer's and 5% Dextrose Injection (Ringers in Dextrose), Ringer's Injection (Ringers Injection), Rituxan, Rituximab, Rocephin (ceftriaxone), Rocuronium Bromide Injection (Zemuron), Roferon-A (interferon alfa-2a), Romazicon (flumazenil), Romidepsin for Injection (Istodax), Saizen (Somatropin Injection), Sandostatin LAR (Octreotide Acetate Injection), Sclerostin Ab, Sensipar (cinacalcet), Sensorcaine (Bupivacaine HCl Injections), Septocaine (Articane HCl and Epinephrine Injection), Serostim LQ (Somatropin (rDNA origin) Injection), Simponi Injection (Golimumab Injection), Sodium Acetate (Sodium Acetate Injection), Sodium Bicarbonate (Sodium Bicarbonate 5% Injection), Sodium Lactate (Sodium Lactate Injection in AVIVA), Sodium Phenylacetate and Sodium Benzoate Injection (Ammonul), Somatropin (rDNA origin) for Inj (Nutropin), Sporanox Injection (Itraconazole Injection), Stelara Injection (Ustekinumab), Stemgen, Sufenta (Sufentanil Citrate Injection), Sufentanil Citrate Injection (Sufenta), Sumavel, Sumatriptan Injection (Alsuma), Symlin, Symlin Pen, Systemic Hedgehog Antagonist, Synvisc-One (Hylan G-F 20 Single Intra-articular Injection), Tarceva, Taxotere (Docetaxel for Injection), Technetium Tc 99m, Telavancin for Injection (Vibativ), Temsirolimus Injection (Torisel), Tenorm in I.V. Injection (Atenolol Inj), Teriparatide (rDNA origin) Injection (Forteo), Testosterone Cypionate, Testosterone Enanthate, Testosterone Propionate, Tev-Tropin (Somatropin, rDNA Origin, for Injection), tgAAC94, Thallous Chloride, Theophylline, Thiotepa (Thiotepa Injection), Thymoglobulin (Anti-Thymocyte Globulin (Rabbit), Thyrogen (Thyrotropin Alfa for Injection), Ticarcillin Disodium and Clavulanate Potassium Galaxy (Timentin Injection), Tigan Injection (Trimethobenzamide Hydrochloride Injectable), Timentin Injection (Ticarcillin Disodium and Clavulanate Potassium Galaxy), TNKase, Tobramycin Injection (Tobramycin Injection), Tocilizumab Injection (Actemra), Torisel (Temsirolimus Injection), Totect (Dexrazoxane for Injection, Intravenous Infusion Only), Trastuzumab-DM1, Travasol (Amino Acids (Injection)), Treanda (Bendamustine Hydrochloride Injection), Trelstar (Triptorelin Pamoate for Injectable Suspension), Triamcinolone Acetonide, Triamcinolone Diacetate, Triamcinolone Hexacetonide Injectable Suspension (Aristospan Injection 20 mg), Triesence (Triamcinolone Acetonide Injectable Suspension), Trimethobenzamide Hydrochloride Injectable (Tigan Injection), Trimetrexate Glucuronate Inj (Neutrexin), Triptorelin Pamoate for Injectable Suspension (Trelstar), Twinject, Trivaris (Triamcinolone Acetonide Injectable Suspension), Trisenox (Arsenic Trioxide Injection), Twinrix, Typhoid Vi, Ultravist (Iopromide Injection), Urofollitropin for Injection (Metrodin), Urokinase Injection (Kinlytic), Ustekinumab (Stelara Injection), Ultralente (U), Valium (diazepam), Valproate Sodium Injection (Depacon), Valtropin (Somatropin Injection), Vancomycin Hydrochloride (Vancomycin Hydrochloride Injection), Vancomycin Hydrochloride Injection (Vancomycin Hydrochloride), Vaprisol (Conivaptan Hcl Injection), VAQTA, Vasovist (Gadofosveset Trisodium Injection for Intravenous Use), Vectibix (Panitumumab Injection for Intravenous Use), Venofer (Iron Sucrose Injection), Verteporfin Inj (Visudyne), Vibativ (Telavancin for Injection), Victoza (Liraglutide [rDNA] Injection), Vimpat (lacosamide Tablet and Injection), Vinblastine Sulfate (Vinblastine Sulfate Injection), Vincasar PFS (Vincristine Sulfate Injection), Victoza, Vincristine Sulfate (Vincristine Sulfate Injection), Visudyne (Verteporfin Inj), Vitamin B-12, Vivitrol (Naltrexone XR Inj), Voluven (Hydroxyethyl Starch in Sodium Chloride Injection), Xeloda, Xenical (orlistat), Xeomin (Incobotulinumtoxin A for Injection), Xolair, Zantac Injection (Ranitidine Hydrochloride Injection), Zemplar Injection (Paricalcitol Injection Fliptop Vial), Zemuron (Rocuronium Bromide Injection), Zenapax (daclizumab), Zevalin, Zidovudine Injection (Retrovir IV), Zithromax Injection (Azithromycin), Zn-DTPA (Pentetate Zinc Trisodium Injection), Zofran Injection (Ondansetron Hydrochloride Injection), Zingo, Zoledronic Acid for Inj (Zometa), Zoledronic Acid Injection (Reclast), Zometa (Zoledronic Acid for Inj), Zosyn (Piperacillin and Tazobactam Injection), Zyprexa Relprevv (Olanzapine Extended Release Injectable Suspension) and combinations thereof.

At least some aspects of the present disclosure will now be described with reference to the following numbered clauses.

1. A storage bag comprising:
   a main tube extending longitudinally from a first end to a second end, the main tube defining a first inner surface and a first outer surface,
      wherein the first inner surface comprises a first higher melting polymer and the first outer surface comprises a first lower melting polymer,
      wherein a portion of the first inner surface overlaps and is sealed to a portion of the first outer surface to form a first lap seam;
      wherein the main tube comprises a first angled edge and a second angled edge extending from the first end of the main tube, forming a first angled interface,
   a port tube extending from a first end to a second end, the port tube defining a second inner surface and a second outer surface,
      wherein the second inner surface comprises a second lower melting polymer and the second outer surface comprises a second higher melting polymer;
      wherein a portion of the second inner surface overlaps and is sealed to a portion of the second outer surface to form a second lap seam;
      wherein the port tube comprises a third angled edge and a fourth angled edge extending from the second end of the port tube, forming a second angled interface;
      wherein the second angled interface of the port tube is positioned over the first angled interface of the main tube such that the third angled edge overlaps the first angled edge, and the fourth angled edge overlaps the second angled edge, with the second inner surface engaging the first outer surface; and
      wherein at least a portion of the port tube not overlapping the main tube is sealed to itself such that at least a portion of the port tube, the main tube, or both the port tube and the main tube is shaped so as to form an angled drainage area.

2. The storage bag as defined in clause 1, wherein the first angled edge extends from the first end to a first lateral side of the main tube and the second angled edge extends from the first end to a second lateral side of the main tube.

3. The storage bag as defined in clause 1 wherein said storage bag is a cryopreservation bag.

4. The storage bag as defined in clause 1, further comprising:
   an end tube extending from a first end to a second end, the end tube defining a third inner surface and a third outer surface;
      wherein the third inner surface comprises a lower melting polymer and the third outer surface comprises a higher melting polymer;
      wherein the first end of the end tube is positioned over the second end of the main tube with the third inner surface engaging the first outer surface;
      wherein a portion of the end tube not overlapping the main tube is sealed to itself to seal the storage bag.

5. The storage bag as defined in clause 1, further comprising a port at the first end of the port tube.

6. The storage bag as defined in clause 1, wherein the higher melting polymer is a non-melt-processable polymer.

7. The storage bag as defined in clause 1, wherein (a) the higher melting polymer is a fluoropolymer, (b) the lower melting polymer is a fluoropolymer, or (c) both the higher melting polymer and the lower melting polymer are fluoropolymers.

8. The storage bag as defined in clause 1, wherein the higher melting polymer is polytetrafluoroethylene.

9. The storage bag as defined in clause 1, wherein the higher melting polymer is a polyimide.

10. The storage bag as defined in clause 1, wherein the lower melting polymer is a melt-processable polymer.

11. The storage bag as defined in clause 1, wherein the lower melting polymer is fluorinated ethylene-propylene.

12. The storage bag as defined in clause 1, wherein the end tube comprises a label compartment.

13. A storage bag comprising:
   a main tube extending longitudinally from a first end to a second end, the main tube defining a first inner surface and a first outer surface,
      wherein the first inner surface comprises a first lower melting polymer and the first outer surface comprises a first higher melting polymer,
      wherein a portion of the first inner surface overlaps and is sealed to a portion of the first outer surface to form a first lap seam;
      wherein the main tube comprises a first angled edge extending from the first end of the main tube, forming a first angled interface,
   a port tube extending from a first end to a second end, the port tube defining a second inner surface and a second outer surface,
      wherein the second inner surface comprises a second higher melting polymer and the second outer surface comprises a second higher melting polymer;
      wherein a portion of the second inner surface overlaps and is sealed to a portion of the second outer surface to form a second lap seam;
      wherein the port tube comprises a second angled edge extending from the second end of the port tube, forming a second angled interface;
      wherein the second angled interface of the port tube is positioned over the first angled interface of the main tube such that the second angled edge overlaps the first angled edge, with the second inner surface engaging the first outer surface; and
      wherein at least a portion of the port tube not overlapping the main tube is sealed to itself such that at least a portion of the port tube, the main tube, or both the port tube and the main tube is shaped so as to form an angled drainage area.

14. A storage bag comprising:
   a composite tube comprising:
      a first composite sheet extending from a first end to a second end and from a first side to a second side, the first composite sheet comprising a first lower melting polymer layer and a first higher melting polymer layer;
         wherein the first composite sheet is folded along a first fold line extending perpendicularly from the first end to the second end and positioned intermediate the first side and the second side so as to define a first folded side;
         wherein the first composite sheet is folded along a second fold line extending perpendicularly from the first end to the second end and positioned proximate to the first side so as to define a second folded side;
         wherein the folding along the first fold line and the second fold line forms a folded first composite sheet;

wherein the first end of the folded first composite sheet abuts the second end;
wherein the first higher melting polymer layer defines an outer surface of the folded first composite sheet and the first lower melting polymer layer defines an inner surface of the folded first composite sheet;
an insert extending from a first end to a second end and a first lateral side to a second lateral side, the insert comprising:
a second composite sheet comprising a second lower melting polymer layer and a second higher melting polymer layer;
wherein the second composite sheet is folded along a third fold line to define an inner surface of the insert and an outer surface of the insert;
wherein the outer surface of the insert comprises the second lower melting polymer and the inner surface of the insert comprises the second higher melting polymer;
wherein the insert comprises a first angled edge extending from one of the first lateral side of the insert or the second lateral side of the insert to the first end of the insert;
wherein the angled edge and the first end of the insert form an angled interface;
wherein the insert is positioned within the composite tube such that:
i) the first folded side of the first composite sheet is adjacent to and encloses the second lateral side of the insert;
ii) the second folded side of the first composite sheet is adjacent to and encloses the first lateral side of the insert;
iii) the second lower melting polymer layer of the second composite sheet engages the first lower melting polymer layer of the first composite sheet;
wherein the composite tube comprises a first extension portion that extends past the angled interface of the insert;
wherein the first extension portion is at least partially sealed to itself around the angled interface of the insert so as to form an angled drainage area;
wherein the composite tube comprises a second extension portion that extends past the second end of the insert;
wherein the second extension portion is sealed to itself to seal a second end of the storage bag.

15. A storage bag comprising:
a composite tube extending from a first end to a second end, the composite tube defining a first inner surface and a first outer surface,
wherein the first inner surface comprises a first lower melting polymer and the first outer surface comprises a first higher melting polymer,
wherein a portion of the first inner surface overlaps and is sealed to a portion of the first outer surface to form a first lap seam;
an insert extending from a first end to a second end and a first lateral side to a second lateral side, the insert comprising:
a composite sheet comprising a second lower melting polymer layer and a second higher melting polymer layer;
wherein the composite sheet is folded along a first fold line to define an inner surface of the insert and an outer surface of the insert;
wherein outer surface of the insert comprises the second lower melting polymer layer and the inner surface of the insert comprises the second higher melting polymer layer;
wherein the insert comprises an angled edge extending from one of the first lateral side of the insert or the second lateral side of the insert to the first end of the insert;
wherein the angled edge and the first end of the insert form an angled interface;
wherein the insert is positioned within the composite tube such that the second lower melting polymer layer of the composite sheet engages the first higher melting polymer layer of the composite tube;
wherein the composite tube comprises a first extension portion that extends past the angled interface of the insert;
wherein the first extension portion is at least partially sealed to itself around the angled interface of the insert so as to form an angled drainage area;
wherein the composite tube comprises a second extension portion that extends past the second end of the insert;
wherein the second extension portion is sealed to itself to seal a second end of the storage bag.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:
1. A storage bag comprising:
a main tube extending longitudinally from a first end to a second end, the main tube defining a first inner surface and a first outer surface,
wherein the first inner surface comprises a first higher melting polymer and the first outer surface comprises a first lower melting polymer,
wherein a portion of the first inner surface overlaps and is sealed to a portion of the first outer surface to form a first lap seam;
wherein the main tube comprises a first angled edge and a second angled edge extending from the first end of the main tube, forming a first angled interface,
a port tube extending from a first end to a second end, the port tube defining a second inner surface and a second outer surface,
wherein the second inner surface comprises a second lower melting polymer and the second outer surface comprises a second higher melting polymer;
wherein a portion of the second inner surface overlaps and is sealed to a portion of the second outer surface to form a second lap seam;
wherein the port tube comprises a third angled edge and a fourth angled edge extending from the second end of the port tube, forming a second angled interface;
wherein the second angled interface of the port tube is positioned over the first angled interface of the main tube such that the third angled edge overlaps the first angled edge, and the fourth angled edge overlaps the second angled edge, with the second inner surface engaging the first outer surface; and wherein at least a portion of the port tube not overlapping the main tube is sealed to itself such that at least a portion of the port tube, the main tube, or both the port tube and the main tube is shaped so as to form an angled drainage area.

2. The storage bag as defined in claim 1, wherein the first angled edge extends from the first end to a first lateral side of the main tube and the second angled edge extends from the first end to a second lateral side of the main tube.

3. The storage bag as defined in claim 1 wherein said storage bag is a cryopreservation bag.

4. The storage bag as defined in claim 1, further comprising:
 an end tube extending from a first end to a second end, the end tube defining a third inner surface and a third outer surface;
  wherein the third inner surface comprises a lower melting polymer and the third outer surface comprises a higher melting polymer;
  wherein the first end of the end tube is positioned over the second end of the main tube with the third inner surface engaging the first outer surface;
  wherein a portion of the end tube not overlapping the main tube is sealed to itself to seal the storage bag.

5. The storage bag as defined in claim 1, further comprising a port at the first end of the port tube.

6. The storage bag as defined in claim 1, wherein the higher melting polymer is a non-melt-processable polymer.

7. The storage bag as defined in claim 1, wherein (a) the higher melting polymer is a fluoropolymer, (b) the lower melting polymer is a fluoropolymer, or (c) both the higher melting polymer and the lower melting polymer are fluoropolymers.

8. The storage bag as defined in claim 1, wherein the higher melting polymer is polytetrafluoroethylene.

9. The storage bag as defined in claim 1, wherein the higher melting polymer is a polyimide.

10. The storage bag as defined in claim 1, wherein the lower melting polymer is a melt-processable polymer.

11. The storage bag as defined in claim 1, wherein the lower melting polymer is fluorinated ethylene-propylene.

12. The storage bag as defined in claim 1, wherein the end tube comprises a label compartment.

\* \* \* \* \*